US009447620B2

(12) United States Patent
Park et al.

(10) Patent No.: US 9,447,620 B2
(45) Date of Patent: Sep. 20, 2016

(54) HINGE MECHANISM WITH MULTIPLE PRESET POSITIONS

(71) Applicant: Microsoft Technology Licensing, LLC, Redmond, WA (US)

(72) Inventors: Daniel C. Park, Woodinville, WA (US); Yi-Min Huang, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 14/502,867

(22) Filed: Sep. 30, 2014

(65) Prior Publication Data
US 2016/0090767 A1   Mar. 31, 2016

(51) Int. Cl.
*E05D 1/04* (2006.01)
*E05D 11/10* (2006.01)
*G06F 1/16* (2006.01)
*H04M 1/04* (2006.01)

(52) U.S. Cl.
CPC ............... *E05D 11/10* (2013.01); *E05D 1/04* (2013.01); *G06F 1/166* (2013.01); *G06F 1/1679* (2013.01); *G06F 1/1681* (2013.01); *H04M 1/04* (2013.01); *E05Y 2900/606* (2013.01); *Y10T 16/54035* (2015.01); *Y10T 16/54038* (2015.01); *Y10T 16/54044* (2015.01); *Y10T 16/54048* (2015.01)

(58) Field of Classification Search
CPC .............. E05D 11/10; E05D 11/1028; E05D 11/1042; E05D 11/105; E05D 11/1064; E05D 2011/1035; E05D 1/04; E05D 2001/045; H04M 1/04; Y10T 16/54035; Y10T 16/54038; Y10T 16/5404; Y10T 16/54044; Y10T 16/54048
See application file for complete search history.

(56) References Cited

U.S. PATENT DOCUMENTS 375,394 A * 12/1887 Strachan ................... E05D 1/04
16/355
457,824 A * 8/1891 Curtis ....................... E05D 1/04
16/355
578,325 A    3/1897 Fleming
(Continued)

FOREIGN PATENT DOCUMENTS

CA           990023      6/1976
CN          102112947    6/2011
(Continued)

OTHER PUBLICATIONS

"International Search Report and Written Opinion", Application No. PCT/US2015/031271, Sep. 2, 2015, 10 pages.
(Continued)

*Primary Examiner* — Jeffrey O Brien
(74) *Attorney, Agent, or Firm* — Qudus Olaniran; Judy Yee; Micky Minhas

(57) ABSTRACT

A hinge mechanism with multiple preset positions is described. According to various embodiments, the hinge mechanism enables a support component to be adjustably attached to an apparatus, such as a computing device. In at least some embodiments, the hinge mechanism utilizes preset hinge positions that enable the support component to be placed at different preset positions. For instance, the hinge mechanism is configured such that an attached support component tends to "snap" into various preset positions. In at least some embodiments, the hinge mechanism includes an emergency escape position that enables the support component to be rotated beyond normal operating positions without damaging the support component.

15 Claims, 31 Drawing Sheets

(56) References Cited

U.S. PATENT DOCUMENTS

| | | | |
|---|---|---|---|
| 2,056,805 A * | 10/1936 | Reichard | E05D 1/04 16/355 |
| 2,770,834 A * | 11/1956 | Saverio | E05D 1/04 16/250 |
| 4,046,975 A | 9/1977 | Seeger, Jr. | |
| 4,065,649 A | 12/1977 | Carter et al. | |
| 4,243,861 A | 1/1981 | Strandwitz | |
| 4,302,648 A | 11/1981 | Sado et al. | |
| 4,317,011 A | 2/1982 | Mazurk | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,577,822 A | 3/1986 | Wilkerson | |
| 4,588,187 A | 5/1986 | Dell | |
| 4,607,147 A | 8/1986 | Ono et al. | |
| 4,651,133 A | 3/1987 | Ganesan et al. | |
| 4,735,394 A | 4/1988 | Facco | |
| 4,990,900 A | 2/1991 | Kikuchi | |
| 5,008,497 A | 4/1991 | Asher | |
| 5,107,401 A * | 4/1992 | Youn | G06F 1/1616 16/357 |
| 5,128,829 A | 7/1992 | Loew | |
| 5,220,521 A | 6/1993 | Kikinis | |
| 5,235,495 A | 8/1993 | Blair et al. | |
| 5,283,559 A | 2/1994 | Kalendra et al. | |
| 5,331,443 A | 7/1994 | Stanisci | |
| 5,375,076 A | 12/1994 | Goodrich et al. | |
| 5,480,118 A | 1/1996 | Cross | |
| 5,546,271 A | 8/1996 | Gut et al. | |
| 5,548,477 A | 8/1996 | Kumar et al. | |
| 5,558,577 A | 9/1996 | Kato | |
| 5,666,694 A | 9/1997 | Slow et al. | |
| 5,681,220 A | 10/1997 | Bertram et al. | |
| 5,737,183 A | 4/1998 | Kobayashi et al. | |
| 5,745,376 A | 4/1998 | Barker et al. | |
| 5,748,114 A | 5/1998 | Koehn | |
| 5,781,406 A | 7/1998 | Hunte | |
| 5,807,175 A | 9/1998 | Davis et al. | |
| 5,818,361 A | 10/1998 | Acevedo | |
| 5,828,770 A | 10/1998 | Leis et al. | |
| 5,842,027 A | 11/1998 | Oprescu et al. | |
| 5,861,990 A | 1/1999 | Tedesco | |
| 5,874,697 A | 2/1999 | Selker et al. | |
| 5,905,485 A | 5/1999 | Podoloff | |
| 5,926,170 A | 7/1999 | Oba | |
| 5,971,635 A | 10/1999 | Wise | |
| 6,002,389 A | 12/1999 | Kasser | |
| 6,002,581 A | 12/1999 | Lindsey | |
| 6,005,209 A | 12/1999 | Burleson et al. | |
| 6,012,714 A | 1/2000 | Worley et al. | |
| 6,040,823 A | 3/2000 | Seffernick et al. | |
| 6,044,717 A | 4/2000 | Biegelsen et al. | |
| 6,061,644 A | 5/2000 | Leis | |
| 6,108,200 A | 8/2000 | Fullerton | |
| 6,112,797 A | 9/2000 | Colson et al. | |
| 6,128,007 A | 10/2000 | Seybold | |
| 6,141,388 A | 10/2000 | Servais et al. | |
| 6,178,085 B1 | 1/2001 | Leung | |
| 6,178,443 B1 | 1/2001 | Lin | |
| 6,233,138 B1 | 5/2001 | Osgood | |
| 6,254,105 B1 | 7/2001 | Rinde et al. | |
| 6,279,060 B1 | 8/2001 | Luke et al. | |
| 6,292,981 B1 * | 9/2001 | Ford | E05D 1/04 16/357 |
| 6,329,617 B1 | 12/2001 | Burgess | |
| 6,344,791 B1 | 2/2002 | Armstrong | |
| 6,366,440 B1 | 4/2002 | Kung | |
| 6,380,497 B1 | 4/2002 | Hashimoto et al. | |
| 6,437,682 B1 | 8/2002 | Vance | |
| 6,511,378 B1 | 1/2003 | Bhatt et al. | |
| 6,532,147 B1 | 3/2003 | Christ, Jr. | |
| 6,543,949 B1 | 4/2003 | Ritchey et al. | |
| 6,565,439 B2 | 5/2003 | Shinohara et al. | |
| 6,597,347 B1 | 7/2003 | Yasutake | |
| 6,600,121 B1 | 7/2003 | Olodort et al. | |
| 6,603,408 B1 | 8/2003 | Gaba | |
| 6,608,664 B1 | 8/2003 | Hasegawa | |
| 6,617,536 B2 | 9/2003 | Kawaguchi | |
| 6,651,943 B2 | 11/2003 | Cho et al. | |
| 6,685,369 B2 | 2/2004 | Lien | |
| 6,695,273 B2 | 2/2004 | Iguchi | |
| 6,704,864 B1 | 3/2004 | Philyaw | |
| 6,721,019 B2 | 4/2004 | Kono et al. | |
| 6,725,318 B1 | 4/2004 | Sherman et al. | |
| 6,774,888 B1 | 8/2004 | Genduso | |
| 6,776,546 B2 | 8/2004 | Kraus et al. | |
| 6,781,819 B2 | 8/2004 | Yang et al. | |
| 6,784,869 B1 | 8/2004 | Clark et al. | |
| 6,813,143 B2 | 11/2004 | Makela | |
| 6,819,316 B2 | 11/2004 | Schulz et al. | |
| 6,856,506 B2 | 2/2005 | Doherty et al. | |
| 6,856,789 B2 | 2/2005 | Pattabiraman et al. | |
| 6,861,961 B2 | 3/2005 | Sandbach et al. | |
| 6,914,197 B2 | 7/2005 | Doherty et al. | |
| 6,950,950 B2 | 9/2005 | Sawyers et al. | |
| 6,970,957 B1 | 11/2005 | Oshins et al. | |
| 6,976,799 B2 | 12/2005 | Kim et al. | |
| 7,007,238 B2 | 2/2006 | Glaser | |
| 7,051,149 B2 | 5/2006 | Wang et al. | |
| 7,083,295 B1 | 8/2006 | Hanna | |
| 7,091,436 B2 | 8/2006 | Serban | |
| 7,099,149 B2 | 8/2006 | Krieger et al. | |
| 7,106,222 B2 | 9/2006 | Ward et al. | |
| 7,123,292 B1 | 10/2006 | Seeger et al. | |
| 7,152,985 B2 | 12/2006 | Benitez et al. | |
| D535,292 S | 1/2007 | Shi et al. | |
| 7,192,105 B2 * | 3/2007 | Jung | E05D 11/1064 312/405 |
| 7,194,662 B2 | 3/2007 | Do et al. | |
| 7,213,991 B2 | 5/2007 | Chapman et al. | |
| 7,232,098 B2 | 6/2007 | Rawlings et al. | |
| 7,239,505 B2 | 7/2007 | Keely et al. | |
| 7,260,221 B1 | 8/2007 | Atsmon | |
| 7,277,087 B2 | 10/2007 | Hill et al. | |
| 7,301,759 B2 | 11/2007 | Hsiung | |
| 7,447,934 B2 | 11/2008 | Dasari et al. | |
| 7,469,386 B2 | 12/2008 | Bear et al. | |
| 7,486,165 B2 | 2/2009 | Ligtenberg et al. | |
| 7,499,037 B2 | 3/2009 | Lube | |
| 7,502,803 B2 | 3/2009 | Culter et al. | |
| 7,542,052 B2 | 6/2009 | Solomon et al. | |
| 7,558,594 B2 | 7/2009 | Wilson | |
| 7,559,834 B1 | 7/2009 | York | |
| RE40,891 E | 9/2009 | Yasutake | |
| 7,594,638 B2 | 9/2009 | Chan et al. | |
| 7,636,921 B2 | 12/2009 | Louie | |
| 7,639,876 B2 | 12/2009 | Clary et al. | |
| 7,656,392 B2 | 2/2010 | Bolender | |
| 7,729,493 B2 | 6/2010 | Krieger et al. | |
| 7,731,147 B2 | 6/2010 | Rha | |
| 7,733,326 B1 | 6/2010 | Adiseshan | |
| 7,761,119 B2 | 7/2010 | Patel | |
| 7,777,972 B1 | 8/2010 | Chen et al. | |
| 7,782,342 B2 | 8/2010 | Koh | |
| 7,813,715 B2 | 10/2010 | McKillop et al. | |
| 7,822,338 B2 | 10/2010 | Wernersson | |
| 7,865,639 B2 | 1/2011 | McCoy et al. | |
| 7,884,807 B2 | 2/2011 | Hovden et al. | |
| 7,913,357 B2 | 3/2011 | Peng et al. | |
| D636,397 S | 4/2011 | Green | |
| 7,928,964 B2 | 4/2011 | Kolmykov-Zotov et al. | |
| 7,944,520 B2 | 5/2011 | Ichioka et al. | |
| 7,945,717 B2 | 5/2011 | Rivalsi | |
| 7,967,462 B2 | 6/2011 | Ogiro et al. | |
| 7,973,771 B2 | 7/2011 | Geaghan | |
| 7,978,281 B2 | 7/2011 | Vergith et al. | |
| 8,016,255 B2 | 9/2011 | Lin | |
| 8,018,714 B2 | 9/2011 | Luke et al. | |
| 8,053,688 B2 | 11/2011 | Conzola et al. | |
| 8,065,624 B2 | 11/2011 | Morin et al. | |
| 8,069,356 B2 | 11/2011 | Rathi et al. | |
| 8,074,956 B2 | 12/2011 | Wang et al. | |

(56) References Cited

U.S. PATENT DOCUMENTS

| | | | |
|---|---|---|---|
| 8,090,885 B2 | 1/2012 | Callaghan et al. | |
| 8,098,233 B2 | 1/2012 | Hotelling et al. | |
| 8,115,499 B2 | 2/2012 | Osoinach et al. | |
| 8,117,362 B2 | 2/2012 | Rodriguez et al. | |
| 8,118,274 B2 * | 2/2012 | McClure | A47B 23/042 |
| | | | 248/455 |
| 8,130,203 B2 | 3/2012 | Westerman | |
| 8,154,524 B2 | 4/2012 | Wilson et al. | |
| 8,162,282 B2 | 4/2012 | Hu et al. | |
| D659,139 S | 5/2012 | Gengler | |
| 8,169,421 B2 | 5/2012 | Wright et al. | |
| 8,224,405 B2 | 7/2012 | Lombardi et al. | |
| 8,229,509 B2 | 7/2012 | Paek et al. | |
| 8,229,522 B2 | 7/2012 | Kim et al. | |
| 8,230,992 B2 | 7/2012 | Law et al. | |
| 8,231,099 B2 | 7/2012 | Chen | |
| 8,240,007 B2 | 8/2012 | Duan et al. | |
| 8,243,432 B2 * | 8/2012 | Duan | H04M 1/04 |
| | | | 248/188.8 |
| 8,245,354 B2 | 8/2012 | Duan et al. | |
| 8,248,791 B2 * | 8/2012 | Wang | F16M 11/10 |
| | | | 248/188.8 |
| 8,255,708 B1 | 8/2012 | Zhang | |
| 8,264,310 B2 | 9/2012 | Lauder et al. | |
| 8,267,368 B2 * | 9/2012 | Torii | F16M 13/00 |
| | | | 248/188.8 |
| 8,274,784 B2 | 9/2012 | Franz et al. | |
| 8,279,589 B2 | 10/2012 | Kim | |
| 8,322,290 B1 | 12/2012 | Mignano | |
| 8,387,078 B2 | 2/2013 | Memmott | |
| 8,387,938 B2 | 3/2013 | Lin | |
| 8,403,288 B2 * | 3/2013 | Cheng | F16M 11/10 |
| | | | 248/673 |
| 8,416,559 B2 | 4/2013 | Agata et al. | |
| 8,424,160 B2 | 4/2013 | Chen | |
| 8,498,100 B1 | 7/2013 | Whitt, III et al. | |
| 8,514,568 B2 | 8/2013 | Qiao et al. | |
| 8,520,371 B2 | 8/2013 | Peng et al. | |
| 8,523,131 B2 | 9/2013 | Derry et al. | |
| 8,543,227 B1 | 9/2013 | Perek et al. | |
| 8,548,608 B2 | 10/2013 | Perek et al. | |
| 8,564,944 B2 | 10/2013 | Whitt, III et al. | |
| 8,570,725 B2 | 10/2013 | Whitt, III et al. | |
| 8,599,542 B1 | 12/2013 | Healey et al. | |
| 8,610,015 B2 | 12/2013 | Whitt et al. | |
| 8,614,666 B2 | 12/2013 | Whitman et al. | |
| 8,646,999 B2 | 2/2014 | Shaw et al. | |
| 8,699,215 B2 | 4/2014 | Whitt, III et al. | |
| 8,719,603 B2 | 5/2014 | Belesiu | |
| 8,724,302 B2 | 5/2014 | Whitt et al. | |
| 8,744,070 B2 | 6/2014 | Zhang et al. | |
| 8,744,391 B2 | 6/2014 | Tenbrook et al. | |
| 8,767,388 B2 | 7/2014 | Ahn et al. | |
| 8,797,765 B2 | 8/2014 | Lin et al. | |
| 8,891,232 B2 | 11/2014 | Wang | |
| 8,908,858 B2 | 12/2014 | Chiu et al. | |
| 8,922,996 B2 | 12/2014 | Yeh et al. | |
| 8,934,221 B2 | 1/2015 | Guo | |
| 8,939,422 B2 | 1/2015 | Liu et al. | |
| 8,964,376 B2 | 2/2015 | Chen | |
| 9,304,549 B2 * | 4/2016 | Siddiqui | E05D 7/00 |
| 9,317,072 B2 * | 4/2016 | Park | G06F 1/1681 |
| 2002/0044216 A1 | 4/2002 | Cha | |
| 2002/0134828 A1 | 9/2002 | Sandbach et al. | |
| 2003/0160712 A1 | 8/2003 | Levy | |
| 2003/0163611 A1 | 8/2003 | Nagao | |
| 2003/0197687 A1 | 10/2003 | Shetter | |
| 2003/0222848 A1 | 12/2003 | Solomon et al. | |
| 2004/0056843 A1 | 3/2004 | Lin et al. | |
| 2004/0156168 A1 | 8/2004 | LeVasseur et al. | |
| 2004/0212601 A1 | 10/2004 | Cake et al. | |
| 2004/0258924 A1 | 12/2004 | Berger et al. | |
| 2004/0268000 A1 | 12/2004 | Barker et al. | |
| 2005/0030728 A1 | 2/2005 | Kawashima et al. | |
| 2005/0052831 A1 | 3/2005 | Chen | |
| 2005/0055498 A1 | 3/2005 | Beckert et al. | |
| 2005/0057515 A1 | 3/2005 | Bathiche | |
| 2005/0059489 A1 | 3/2005 | Kim | |
| 2005/0099400 A1 | 5/2005 | Lee | |
| 2005/0134717 A1 | 6/2005 | Misawa | |
| 2005/0146512 A1 | 7/2005 | Hill et al. | |
| 2005/0264653 A1 | 12/2005 | Starkweather et al. | |
| 2005/0264988 A1 | 12/2005 | Nicolosi | |
| 2006/0085658 A1 | 4/2006 | Allen et al. | |
| 2006/0125799 A1 | 6/2006 | Hillis et al. | |
| 2006/0154725 A1 | 7/2006 | Glaser et al. | |
| 2006/0156415 A1 | 7/2006 | Rubinstein et al. | |
| 2006/0181514 A1 | 8/2006 | Newman | |
| 2006/0187216 A1 | 8/2006 | Trent, Jr. et al. | |
| 2006/0195522 A1 | 8/2006 | Miyazaki | |
| 2006/0227393 A1 | 10/2006 | Herloski | |
| 2006/0272128 A1 | 12/2006 | Rude | |
| 2007/0003267 A1 | 1/2007 | Shibutani | |
| 2007/0056385 A1 | 3/2007 | Lorenz | |
| 2007/0062089 A1 | 3/2007 | Homer et al. | |
| 2007/0069153 A1 | 3/2007 | Pai-Paranjape et al. | |
| 2007/0072474 A1 | 3/2007 | Beasley et al. | |
| 2007/0145945 A1 | 6/2007 | McGinley et al. | |
| 2007/0164191 A1 | 7/2007 | Kim | |
| 2007/0176902 A1 | 8/2007 | Newman et al. | |
| 2007/0182663 A1 | 8/2007 | Biech | |
| 2007/0182722 A1 | 8/2007 | Hotelling et al. | |
| 2007/0185590 A1 | 8/2007 | Reindel et al. | |
| 2007/0200830 A1 | 8/2007 | Yamamoto | |
| 2007/0220708 A1 | 9/2007 | Lewis | |
| 2007/0234420 A1 | 10/2007 | Novotney et al. | |
| 2007/0236408 A1 | 10/2007 | Yamaguchi et al. | |
| 2007/0236475 A1 | 10/2007 | Wherry | |
| 2007/0236873 A1 | 10/2007 | Yukawa et al. | |
| 2007/0247432 A1 | 10/2007 | Oakley | |
| 2007/0260892 A1 | 11/2007 | Paul et al. | |
| 2007/0283179 A1 | 12/2007 | Burnett et al. | |
| 2008/0005423 A1 | 1/2008 | Jacobs et al. | |
| 2008/0053222 A1 | 3/2008 | Ehrensvard et al. | |
| 2008/0059888 A1 | 3/2008 | Dunko | |
| 2008/0104437 A1 | 5/2008 | Lee | |
| 2008/0151478 A1 | 6/2008 | Chern | |
| 2008/0158185 A1 | 7/2008 | Westerman | |
| 2008/0174570 A1 | 7/2008 | Jobs et al. | |
| 2008/0186660 A1 | 8/2008 | Yang | |
| 2008/0228969 A1 | 9/2008 | Cheah et al. | |
| 2008/0238884 A1 | 10/2008 | Harish | |
| 2008/0253822 A1 | 10/2008 | Matias | |
| 2008/0309636 A1 | 12/2008 | Feng et al. | |
| 2008/0316002 A1 | 12/2008 | Brunet et al. | |
| 2008/0320190 A1 | 12/2008 | Lydon et al. | |
| 2009/0009476 A1 | 1/2009 | Daley, III | |
| 2009/0073957 A1 | 3/2009 | Newland et al. | |
| 2009/0083562 A1 | 3/2009 | Park et al. | |
| 2009/0140985 A1 | 6/2009 | Liu | |
| 2009/0195497 A1 | 8/2009 | Fitzgerald et al. | |
| 2009/0231275 A1 | 9/2009 | Odgers | |
| 2009/0244872 A1 | 10/2009 | Yan | |
| 2009/0251008 A1 | 10/2009 | Sugaya | |
| 2009/0259865 A1 | 10/2009 | Sheynblat et al. | |
| 2009/0262492 A1 | 10/2009 | Whitchurch et al. | |
| 2009/0265670 A1 | 10/2009 | Kim et al. | |
| 2009/0285491 A1 | 11/2009 | Ravenscroft et al. | |
| 2009/0296331 A1 | 12/2009 | Choy | |
| 2009/0303204 A1 | 12/2009 | Nasiri et al. | |
| 2009/0320244 A1 | 12/2009 | Lin | |
| 2009/0321490 A1 | 12/2009 | Groene et al. | |
| 2010/0001963 A1 | 1/2010 | Doray et al. | |
| 2010/0013319 A1 | 1/2010 | Kamiyama et al. | |
| 2010/0026656 A1 | 2/2010 | Hotelling et al. | |
| 2010/0038821 A1 | 2/2010 | Jenkins et al. | |
| 2010/0045633 A1 | 2/2010 | Gettemy | |
| 2010/0051432 A1 | 3/2010 | Lin et al. | |
| 2010/0053534 A1 | 3/2010 | Hsieh et al. | |
| 2010/0072334 A1 | 3/2010 | Le Gette et al. | |
| 2010/0077237 A1 | 3/2010 | Sawyers | |
| 2010/0085321 A1 | 4/2010 | Pundsack | |
| 2010/0102182 A1 | 4/2010 | Lin | |
| 2010/0103112 A1 | 4/2010 | Yoo et al. | |

(56) References Cited

U.S. PATENT DOCUMENTS

| | | |
|---|---|---|
| 2010/0123686 A1 | 5/2010 | Klinghult et al. |
| 2010/0133398 A1 | 6/2010 | Chiu et al. |
| 2010/0133414 A1* | 6/2010 | Lee .................... F16M 13/00 248/686 |
| 2010/0142130 A1* | 6/2010 | Wang .................. F16M 13/00 361/679.01 |
| 2010/0149111 A1 | 6/2010 | Olien |
| 2010/0149377 A1 | 6/2010 | Shintani et al. |
| 2010/0154171 A1 | 6/2010 | Lombardi et al. |
| 2010/0161522 A1 | 6/2010 | Tirpak et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0231556 A1 | 9/2010 | Mines et al. |
| 2010/0235546 A1 | 9/2010 | Terlizzi et al. |
| 2010/0238620 A1 | 9/2010 | Fish |
| 2010/0250988 A1 | 9/2010 | Okuda et al. |
| 2010/0259876 A1* | 10/2010 | Kim .................... F16M 11/10 361/679.01 |
| 2010/0271771 A1 | 10/2010 | Wu et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0295812 A1 | 11/2010 | Burns et al. |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0321877 A1 | 12/2010 | Moser |
| 2010/0324457 A1 | 12/2010 | Bean et al. |
| 2010/0325155 A1 | 12/2010 | Skinner et al. |
| 2011/0012873 A1 | 1/2011 | Prest et al. |
| 2011/0019123 A1 | 1/2011 | Prest et al. |
| 2011/0025176 A1* | 2/2011 | McClure ............. A47B 23/042 312/223.2 |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0055407 A1 | 3/2011 | Lydon et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0102326 A1 | 5/2011 | Casparian et al. |
| 2011/0102752 A1 | 5/2011 | Chen et al. |
| 2011/0115713 A1 | 5/2011 | Altman et al. |
| 2011/0134032 A1 | 6/2011 | Chiu et al. |
| 2011/0157046 A1 | 6/2011 | Lee et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169762 A1 | 7/2011 | Weiss |
| 2011/0170289 A1 | 7/2011 | Allen et al. |
| 2011/0176035 A1 | 7/2011 | Poulsen |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0231682 A1 | 9/2011 | Kakish et al. |
| 2011/0248152 A1 | 10/2011 | Svajda et al. |
| 2011/0248920 A1 | 10/2011 | Larsen |
| 2011/0261001 A1 | 10/2011 | Liu |
| 2011/0265287 A1 | 11/2011 | Li et al. |
| 2011/0267272 A1 | 11/2011 | Meyer et al. |
| 2011/0290686 A1 | 12/2011 | Huang |
| 2011/0295697 A1 | 12/2011 | Boston et al. |
| 2011/0297566 A1 | 12/2011 | Gallagher et al. |
| 2011/0298919 A1 | 12/2011 | Maglaque |
| 2011/0304577 A1 | 12/2011 | Brown |
| 2011/0316807 A1 | 12/2011 | Corrion |
| 2012/0007821 A1 | 1/2012 | Zaliva |
| 2012/0020019 A1 | 1/2012 | Chen et al. |
| 2012/0023459 A1 | 1/2012 | Westerman |
| 2012/0024682 A1 | 2/2012 | Huang et al. |
| 2012/0032891 A1 | 2/2012 | Parivar |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0068919 A1 | 3/2012 | Lauder et al. |
| 2012/0069540 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0113579 A1 | 5/2012 | Agata et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0161406 A1 | 6/2012 | Mersky |
| 2012/0162693 A1 | 6/2012 | Ito |
| 2012/0175487 A1 | 7/2012 | Goto |
| 2012/0176741 A1 | 7/2012 | Wu et al. |
| 2012/0182242 A1 | 7/2012 | Lindahl et al. |
| 2012/0182743 A1 | 7/2012 | Chou |
| 2012/0194448 A1 | 8/2012 | Rothkopf |
| 2012/0194972 A1 | 8/2012 | Bohn et al. |
| 2012/0215284 A1 | 8/2012 | Berg et al. |
| 2012/0224073 A1 | 9/2012 | Miyahara |
| 2012/0229634 A1 | 9/2012 | Laett et al. |
| 2012/0246377 A1 | 9/2012 | Bhesania |
| 2012/0249443 A1 | 10/2012 | Anderson et al. |
| 2012/0256959 A1 | 10/2012 | Ye et al. |
| 2012/0274811 A1 | 11/2012 | Bakin |
| 2012/0300275 A1 | 11/2012 | Vilardell et al. |
| 2012/0312955 A1 | 12/2012 | Randolph |
| 2012/0326003 A1 | 12/2012 | Solow et al. |
| 2013/0009413 A1 | 1/2013 | Chiu et al. |
| 2013/0015311 A1 | 1/2013 | Kim |
| 2013/0027867 A1 | 1/2013 | Lauder et al. |
| 2013/0044074 A1 | 2/2013 | Park et al. |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0088431 A1 | 4/2013 | Ballagas et al. |
| 2013/0100597 A1 | 4/2013 | Berg et al. |
| 2013/0106766 A1 | 5/2013 | Yilmaz et al. |
| 2013/0162554 A1 | 6/2013 | Lauder et al. |
| 2013/0172906 A1 | 7/2013 | Olson et al. |
| 2013/0193292 A1 | 8/2013 | Hsu et al. |
| 2013/0217451 A1 | 8/2013 | Komiyama et al. |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228439 A1 | 9/2013 | Whitt, III |
| 2013/0229100 A1 | 9/2013 | Siddiqui et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229363 A1 | 9/2013 | Whitman |
| 2013/0229366 A1 | 9/2013 | Dighde |
| 2013/0229380 A1 | 9/2013 | Lutz, III |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III et al. |
| 2013/0229760 A1 | 9/2013 | Whitt, III |
| 2013/0229761 A1 | 9/2013 | Shaw |

(56) References Cited

U.S. PATENT DOCUMENTS

| | | |
|---|---|---|
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0262886 A1 | 10/2013 | Nishimura |
| 2013/0300590 A1 | 11/2013 | Dietz |
| 2013/0300647 A1 | 11/2013 | Drasnin |
| 2013/0301199 A1 | 11/2013 | Whitt |
| 2013/0301206 A1 | 11/2013 | Whitt |
| 2013/0304941 A1 | 11/2013 | Drasnin |
| 2013/0321992 A1 | 12/2013 | Liu et al. |
| 2013/0322000 A1 | 12/2013 | Whitt |
| 2013/0322001 A1 | 12/2013 | Whitt |
| 2013/0329360 A1 | 12/2013 | Aldana |
| 2013/0332628 A1 | 12/2013 | Panay |
| 2013/0335891 A1 | 12/2013 | Chen et al. |
| 2013/0339757 A1 | 12/2013 | Reddy |
| 2013/0342976 A1 | 12/2013 | Chung |
| 2014/0012401 A1 | 1/2014 | Perek et al. |
| 2014/0021727 A1 | 1/2014 | Mai et al. |
| 2014/0029180 A1 | 1/2014 | Nishimura et al. |
| 2014/0036429 A1 | 2/2014 | Bryan et al. |
| 2014/0036430 A1 | 2/2014 | Wroblewski et al. |
| 2014/0043275 A1 | 2/2014 | Whitman |
| 2014/0047672 A1 | 2/2014 | Saito et al. |
| 2014/0048399 A1 | 2/2014 | Whitt, III |
| 2014/0076748 A1 | 3/2014 | Padilla et al. |
| 2014/0083883 A1 | 3/2014 | Elias |
| 2014/0085814 A1 | 3/2014 | Kielland |
| 2014/0119802 A1 | 5/2014 | Shaw |
| 2014/0132550 A1 | 5/2014 | McCracken et al. |
| 2014/0167585 A1 | 6/2014 | Kuan et al. |
| 2014/0174960 A1* | 6/2014 | Zhu ................ H04M 1/04 206/45.24 |
| 2014/0263939 A1 | 9/2014 | Rinner |
| 2014/0293534 A1* | 10/2014 | Siddiqui ............ E05D 7/00 361/679.55 |
| 2014/0317882 A1 | 10/2014 | Chen et al. |
| 2014/0376179 A1 | 12/2014 | Jenkins et al. |
| 2015/0022961 A1 | 1/2015 | Jenkins et al. |
| 2015/0212553 A1* | 7/2015 | Park ................ G06F 1/1681 361/679.27 |
| 2015/0311014 A1 | 10/2015 | Shaw et al. |
| 2015/0342067 A1 | 11/2015 | Gault et al. |

FOREIGN PATENT DOCUMENTS

| | | |
|---|---|---|
| CN | 202441167 | 9/2012 |
| CN | 103455149 | 12/2013 |
| DE | 10116556 | 10/2002 |
| DE | 202010005274 | 7/2010 |
| EP | 1223722 | 7/2002 |
| EP | 1591891 | 11/2005 |
| EP | 1983411 | 10/2008 |
| EP | 2353978 | 8/2011 |
| GB | 2068643 | 8/1981 |
| GB | 2123213 | 1/1984 |
| JP | 56108127 | 8/1981 |
| JP | 10326124 | 12/1998 |
| JP | 1173239 | 3/1999 |
| JP | 2006294361 | 10/2006 |
| KR | 1020110087178 | 8/2011 |
| WO | WO-9845769 | 10/1998 |
| WO | WO-9919995 | 4/1999 |
| WO | WO-2005064436 | 7/2005 |
| WO | WO-2006044818 | 4/2006 |
| WO | WO-2009034484 | 3/2009 |

OTHER PUBLICATIONS

"Non-Final Office Action", U.S. Appl. No. 13/780,228, Sep. 18, 2015, 19 pages.

"Supplementary European Search Report", EP Application No. 13728568.0, Oct. 30, 2015, 7 pages.

"Notice of Allowance", U.S. Appl. No. 14/166,596, Dec. 4, 2015, 15 pages.

Park,"Hinge Mechanism with Multiple Preset", U.S. Appl. No. 14/502,867, filed Sep. 30, 2014., 71 pages.

Siddiqui,"Multistage Friction Hinge", U.S. Appl. No. 14/755,734, filed Jun. 30, 2015, 50 pages.

"Corrected Notice of Allowance", U.S. Appl. No. 13/852,848, Jan. 29, 2016, 2 pages.

"Final Office Action", U.S. Appl. No. 14/281,905, Dec. 8, 2015, 6 pages.

"International Search Report and Written Opinion", Application No. PCT/US2015/052757, Dec. 4, 2015, 12 pages.

"Notice of Allowance", U.S. Appl. No. 13/852,848, Nov. 19, 2015, 4 pages.

"New Friction Hinge for iPad Flip Stands", Retrieved From: http://www.nclosures.com/new-friction-hinge-design/, Jun. 18, 2013, 2 Pages.

"Non-Final Office Action", U.S. Appl. No. 14/281,905, Jul. 10, 2015, 6 pages.

"International Preliminary Report on Patentability", Application No. PCT/US2014/031531, Jun. 9, 2015, 7 pages.

"Final Office Action", U.S. Appl. No. 13/852,848, Jul. 20, 2015, 9 pages.

Kraus,"HumanToolz Mobile Stand: A new iPad kickstand on Kickstarter", Retrieved From: www.technologytell.com/apple/100699/humantoolz-mobile-stand-a-new-ipad-kickstand-on-kickstarter, Jul. 31, 2012, 9 Pages.

Smith,"Quirky Cloak iPad Case Review", Retrieved From: http://notebooks.com/2011/02/03/quirky-cloak-ipad-case-review/, Feb. 3, 2011, 5 Pages.

"Accessing Device Sensors", retrieved from <https://developer.palm.com/content/api/dev-guide/pdk/accessing-device-sensors.html> on May 25, 2012, 2011, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Advanced Configuration and Power Management Specification", Intel Corporation, Microsoft Corporation, Toshiba Corp. Revision 1, Dec. 22, 1996, 364 pages.

"Advisory Action", U.S. Appl. No. 13/939,032, Feb. 24, 2014, 2 pages.

"Advisory Action", U.S. Appl. No. 14/199,924, May 28, 2014, 2 pages.

"Basic Cam Motion Curves", Retrieved From: <http://ocw.metu.edu.tr/pluginfile.php/6886/mod_resource/content/1/ch8/8-3.htm> Nov. 22, 2013, Middle East Technical University,1999, 14 Pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, Apr. 9, 2013, 2 pages.

"Corrected Notice of Allowance", U.S. Appl. No. 13/470,633, Jul. 2, 2013, 2 pages.

"Corrected Notice of Allowance", U.S. Appl. No. 13/563,435, Jan. 14, 2014, 2 pages.

"Corrected Notice of Allowance", U.S. Appl. No. 13/563,435, Mar. 20, 2014, 2 pages.

"Corrected Notice of Allowance", U.S. Appl. No. 13/563,435, Jan. 22, 2014, 2 pages.

(56) References Cited

OTHER PUBLICATIONS

"Corrected Notice of Allowance", U.S. Appl. No. 13/565,124, Apr. 3, 2014, 4 pages.
"Corrected Notice of Allowance", U.S. Appl. No. 13/565,124, Mar. 10, 2014, 2 pages.
"Corrected Notice of Allowance", U.S. Appl. No. 13/565,124, Apr. 14, 2014, 2 pages.
"Corrected Notice of Allowance", U.S. Appl. No. 13/651,327, Sep. 12, 2013, 2 pages.
"Corrected Notice of Allowance", U.S. Appl. No. 13/651,327, Sep. 23, 2013, 2 pages.
"Corrected Notice of Allowance", U.S. Appl. No. 13/651,726, Sep. 17, 2013, 2 pages.
"Corrected Notice of Allowance", U.S. Appl. No. 13/938,930, May 6, 2014, 2 pages.
"Corrected Notice of Allowance", U.S. Appl. No. 13/938,930, Jun. 6, 2014, 2 pages.
"Corrected Notice of Allowance", U.S. Appl. No. 13/939,002, May 22, 2014, 2 pages.
"Corrected Notice of Allowance", U.S. Appl. No. 13/939,002, May 5, 2014, 2 pages.
"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.
"Final Office Action", U.S. Appl. No. 13/471,001, Jul. 25, 2013, 20 pages.
"Final Office Action", U.S. Appl. No. 13/471,139, Sep. 16, 2013, 13 pages.
"Final Office Action", U.S. Appl. No. 13/471,336, Aug. 28, 2013, 18 pages.
"Final Office Action", U.S. Appl. No. 13/564,520, Jan. 15, 2014, 7 pages.
"Final Office Action", U.S. Appl. No. 13/651,195, Apr. 18, 2013, 13 pages.
"Final Office Action", U.S. Appl. No. 13/651,232, May 21, 2013, 21 pages.
"Final Office Action", U.S. Appl. No. 13/651,287, May 3, 2013, 16 pages.
"Final Office Action", U.S. Appl. No. 13/651,976, Jul. 25, 2013, 21 pages.
"Final Office Action", U.S. Appl. No. 13/653,321, Aug. 2, 2013, 17 pages.
"Final Office Action", U.S. Appl. No. 13/653,682, Jun. 11, 2014, 11 pages.
"Final Office Action", U.S. Appl. No. 13/653,682, Oct. 18, 2013, 16 pages.
"Final Office Action", U.S. Appl. No. 13/656,055, Oct. 23, 2013, 14 pages.
"Final Office Action", U.S. Appl. No. 13/780,228, Mar. 28, 2014, 13 pages.
"Final Office Action", U.S. Appl. No. 13/938,930, Nov. 8, 2013, 10 pages.
"Final Office Action", U.S. Appl. No. 13/939,002, Nov. 8, 2013, 7 pages.
"Final Office Action", U.S. Appl. No. 13/939,032, Dec. 20, 2013, 5 pages.
"Final Office Action", U.S. Appl. No. 14/063,912, Apr. 29, 2014, 10 pages.
"Final Office Action", U.S. Appl. No. 14/199,924, May 6, 2014, 5 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.

"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.
"Foreign Office Action", CN Application No. 201320097066.8, Oct. 24, 2013, 5 Pages.
"Foreign Office Action", CN Application No. 201320328022.1, Feb. 17, 2014, 4 Pages.
"Foreign Office Action", CN Application No. 201320328022.1, Oct. 18, 2013, 3 Pages.
"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.
"i-Blason Spring Series Premium Flexible KickStand Anti-Slippery TPU Cover Case for iPhone 4 4S (White)", Retrieved From: <http://www.amazon.com/i-Blason-Premium-Flexible-KickStand-Anti-Slippery/dp/B007LCLXLU> Jun. 12, 2014, Nov. 30, 2012, 4 Pages.
"i-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"International Search Report and Written Opinion", Application No. PCT/US2014/031531, Jun. 20, 2014, 10 Pages.
"International Search Report and Written Opinion", Application No. PCT/US2013/028948, Jun. 21, 2013, 11 pages.
"International Search Report and Written Opinion", Application No. PCT/US2013/029461, Jun. 21, 2013, 11 pages.
"International Search Report and Written Opinion", Application No. PCT/US2013/040968, Sep. 5, 2013, 11 pages.
"International Search Report and Written Opinion", Application No. PCT/US2013/042550, Sep. 24, 2013, 14 pages.
"Membrane Keyboards & Membrane Keypads", Retrieved from: <http://www.pannam.com/> on May 9, 2012, Mar. 4, 2009, 2 pages.
"Motion Sensors", Android Developers—retrieved from <http://developer.android.com/guide/topics/sensors/sensors_motion.html> on May 25, 2012, 2012, 7 pages.
"MPC Fly Music Production Controller", Akai Professional, Retrieved from: <http://www.akaiprompc.com/mpc-fly> on Jul. 9, 2012, 4 pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/599,635, Feb. 25, 2014, 13 pages.
"Non-Final Office Action", U.S. Appl. No. 13/468,918, Dec. 26, 2013, 18 pages.
"Non-Final Office Action", U.S. Appl. No. 13/471,001, Feb. 19, 2013, 15 pages.
"Non-Final Office Action", U.S. Appl. No. 13/471,001, Jun. 17, 2014, 23 pages.
"Non-Final Office Action", U.S. Appl. No. 13/471,030, May 15, 2014, 10 pages.
"Non-Final Office Action", U.S. Appl. No. 13/471,054, Jun. 3, 2014, 15 pages.
"Non-Final Office Action", U.S. Appl. No. 13/471,139, Mar. 21, 2013, 12 pages.
"Non-Final Office Action", U.S. Appl. No. 13/471,186, Feb. 27, 2014, 8 pages.
"Non-Final Office Action", U.S. Appl. No. 13/471,202, Feb. 11, 2013, 10 pages.
"Non-Final Office Action", U.S. Appl. No. 13/471,237, Mar. 24, 2014, 7 pages.
"Non-Final Office Action", U.S. Appl. No. 13/471,336, Jan. 18, 2013, 14 pages.
"Non-Final Office Action", U.S. Appl. No. 13/471,336, May 7, 2014, 17 pages.
"Non-Final Office Action", U.S. Appl. No. 13/471,376, Apr. 2, 2014, 17 pages.

(56) References Cited

OTHER PUBLICATIONS

"Non-Final Office Action", U.S. Appl. No. 13/471,405, Feb. 20, 2014, 37 pages.
"Non-Final Office Action", U.S. Appl. No. 13/492,232, Apr. 30, 2014, 9 pages.
"Non-Final Office Action", U.S. Appl. No. 13/527,263, Apr. 3, 2014, 6 pages.
"Non-Final Office Action", U.S. Appl. No. 13/527,263, Jul. 19, 2013, 5 pages.
"Non-Final Office Action", U.S. Appl. No. 13/563,435, Jun. 14, 2013, 6 pages.
"Non-Final Office Action", U.S. Appl. No. 13/564,520, Feb. 14, 2014, 5 pages.
"Non-Final Office Action", U.S. Appl. No. 13/564,520, Jun. 19, 2013, 8 pages.
"Non-Final Office Action", U.S. Appl. No. 13/564,520, Jun. 16, 2014, 5 pages.
"Non-Final Office Action", U.S. Appl. No. 13/565,124, Jun. 17, 2013, 5 pages.
"Non-Final Office Action", U.S. Appl. No. 13/651,195, Jan. 2, 2013, 14 pages.
"Non-Final Office Action", U.S. Appl. No. 13/651,232, Jan. 17, 2013, 15 pages.
"Non-Final Office Action", U.S. Appl. No. 13/651,232, Dec. 5, 2013, 15 pages.
"Non-Final Office Action", U.S. Appl. No. 13/651,272, Feb. 12, 2013, 10 pages.
"Non-Final Office Action", U.S. Appl. No. 13/651,287, Jan. 29, 2013, 13 pages.
"Non-Final Office Action", U.S. Appl. No. 13/651,304, Mar. 22, 2013, 9 pages.
"Non-Final Office Action", U.S. Appl. No. 13/651,327, Mar. 22, 2013, 6 pages.
"Non-Final Office Action", U.S. Appl. No. 13/651,726, Apr. 15, 2013, 6 pages.
"Non-Final Office Action", U.S. Appl. No. 13/651,871, Mar. 18, 2013, 14 pages.
"Non-Final Office Action", U.S. Appl. No. 13/651,871, Jul. 1, 2013, 5 pages.
"Non-Final Office Action", U.S. Appl. No. 13/651,976, Feb. 22, 2013, 16 pages.
"Non-Final Office Action", U.S. Appl. No. 13/651,976, Jun. 16, 2014, 23 pages.
"Non-Final Office Action", U.S. Appl. No. 13/653,321, Feb. 1, 2013, 13 pages.
"Non-Final Office Action", U.S. Appl. No. 13/653,682, Feb. 7, 2013, 11 pages.
"Non-Final Office Action", U.S. Appl. No. 13/653,682, Feb. 26, 2014, 10 pages.
"Non-Final Office Action", U.S. Appl. No. 13/653,682, Jun. 3, 2013, 14 pages.
"Non-Final Office Action", U.S. Appl. No. 13/656,055, Mar. 12, 2014, 17 pages.
"Non-Final Office Action", U.S. Appl. No. 13/656,055, Apr. 23, 2013, 11 pages.
"Non-Final Office Action", U.S. Appl. No. 13/780,228, Oct. 30, 2013, 12 pages.
"Non-Final Office Action", U.S. Appl. No. 13/938,930, Aug. 29, 2013, 9 pages.
"Non-Final Office Action", U.S. Appl. No. 13/939,002, Aug. 28, 2013, 6 pages.
"Non-Final Office Action", U.S. Appl. No. 13/939,002, Dec. 20, 2013, 5 pages.
"Non-Final Office Action", U.S. Appl. No. 13/939,032, Aug. 29, 2013, 7 pages.
"Non-Final Office Action", U.S. Appl. No. 14/063,912, Jan. 2, 2014, 10 pages.
"Non-Final Office Action", U.S. Appl. No. 14/199,924, Apr. 10, 2014, 6 pages.
"Non-Final Office Action", U.S. Appl. No. 14/200,595, Apr. 11, 2014, 4 pages.
"Non-Final Office Action", U.S. Appl. No. 14/225,250, Jun. 17, 2014, 5 pages.
"Non-Final Office Action", U.S. Appl. No. 14/225,276, Jun. 13, 2014, 6 pages.
"Non-Final Office Action", U.S. Appl. No. 14/277,240, Jun. 13, 2014, 6 pages.
"Notice of Allowance", U.S. Appl. No. 13/468,918, Jun. 17, 2014, 5 pages.
"Notice of Allowance", U.S. Appl. No. 13/470,633, Mar. 22, 2013, 7 pages.
"Notice of Allowance", U.S. Appl. No. 13/471,139, Mar. 17, 2014, 4 pages.
"Notice of Allowance", U.S. Appl. No. 13/471,202, May 28, 2013, 7 pages.
"Notice of Allowance", U.S. Appl. No. 13/471,237, May 12, 2014, 8 pages.
"Notice of Allowance", U.S. Appl. No. 13/563,435, Nov. 12, 2013, 5 pages.
"Notice of Allowance", U.S. Appl. No. 13/565,124, Dec. 24, 2013, 6 pages.
"Notice of Allowance", U.S. Appl. No. 13/651,195, Jul. 8, 2013, 9 pages.
"Notice of Allowance", U.S. Appl. No. 13/651,232, Apr. 25, 2014, 9 pages.
"Notice of Allowance", U.S. Appl. No. 13/651,272, May 2, 2013, 7 pages.
"Notice of Allowance", U.S. Appl. No. 13/651,287, May 2, 2014, 6 pages.
"Notice of Allowance", U.S. Appl. No. 13/651,304, Jul. 1, 2013, 5 pages.
"Notice of Allowance", U.S. Appl. No. 13/651,327, Jun. 11, 2013, 7 pages.
"Notice of Allowance", U.S. Appl. No. 13/651,726, May 31, 2013, 5 pages.
"Notice of Allowance", U.S. Appl. No. 13/651,871, Oct. 2, 2013, 7 pages.
"Notice of Allowance", U.S. Appl. No. 13/653,321, Dec. 18, 2013, 4 pages.
"Notice of Allowance", U.S. Appl. No. 13/938,930, Feb. 20, 2014, 4 pages.
"Notice of Allowance", U.S. Appl. No. 13/939,002, Mar. 3, 2014, 4 pages.
"Notice of Allowance", U.S. Appl. No. 13/939,032, Apr. 3, 2014, 4 pages.
"Notice of Allowance", U.S. Appl. No. 14/018,286, May 23, 2014, 8 pages.
"Notice of Allowance", U.S. Appl. No. 14/199,924, Jun. 10, 2014, 4 pages.
"Notice to Grant", CN Application No. 201320097089.9, Sep. 29, 2013, 2 Pages.
"Notice to Grant", CN Application No. 201320097124.7, Oct. 8, 2013, 2 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, Nov. 29, 2013, 6 pages.
"Restriction Requirement", U.S. Appl. No. 13/471,139, Jan. 17, 2013, 7 pages.
"Restriction Requirement", U.S. Appl. No. 13/595,700, May 28, 2014, 6 pages.
"Restriction Requirement", U.S. Appl. No. 13/651,304, Jan. 18, 2013, 7 pages.
"Restriction Requirement", U.S. Appl. No. 13/651,726, Feb. 22, 2013, 6 pages.
"Restriction Requirement", U.S. Appl. No. 13/651,871, Feb. 7, 2013, 6 pages.

(56) References Cited

OTHER PUBLICATIONS

"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.

"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012, 2011, 4 pages.

"Supplemental Notice of Allowance", U.S. Appl. No. 13/653,321, Mar. 28, 2014, 4 pages.

"Supplemental Notice of Allowance", U.S. Appl. No. 14/018,286, Jun. 11, 2014, 5 pages.

"Teach Me Simply", Retrieved From: <http://techmesimply.blogspot.in/2013/05/yugatech_3.html> on Nov. 22, 2013, May 3, 2013, pp. 1-6.

"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.

"The New Lenovo Yoga Tablet 8", Retrieved From:<http://www.pricepanda.co.in/lenovo-yoga-tablet-8-pid1529091/> Jun. 11, 2014, 2014, 2 Pages.

"Tilt Shift Lenses: Perspective Control", retrieved from http://www.cambridgeincolour.com/tutorials/tilt-shift-lenses1.htm, Mar. 28, 2008, 11 Pages.

"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.

"Welcome to Windows 7", Retrieved from: <http://www.microsoft.com/en-us/download/confirmation.aspx?id=4984> on Aug. 1, 2013, Sep. 16, 2009, 3 pages.

"What is Active Alignment?", http://www.kasalis.com/active_alignment.html, retrieved on Nov. 22, 2012, 2 Pages.

Arar, "HP Envy Rove: A Movable (If Underpowered) All-In-One PC", Retrieved From: <http://www.pcworld.com/article/2047032/hp-envy-rove-a-movable-if-underpowered-all-in-one-pc.html> Jun. 11, 2014, Aug. 21, 2013, 6 Pages.

Block, et al., "DeviceOrientation Event Specification", W3C, Editor's Draft, retrieved from <https://developer.palm.com/content/api/dev-guide/pdk/accessing-device-sensors.html> on May 25, 2012,Jul. 12, 2011, 14 pages.

Brown, "Microsoft Shows Off Pressure-Sensitive Keyboard", retrieved from <http://news.cnet.com/8301-17938_105-10304792-1.html> on May 7, 2012, Aug. 6, 2009, 2 pages.

Butler, et al., "SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012,Oct. 19, 2008, 4 pages.

Chavan, et al., "Synthesis, Design and Analysis of a Novel Variable Lift Cam Follower System", In Proceedings: International Journal of Design Engineering, vol. 3, Issue 4, Inderscience Publishers,Jun. 3, 2010, 1 Page.

Crider, "Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.

Das, et al., "Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.

Dietz, et al., "A Practical Pressure Sensitive Computer Keyboard", In Proceedings of UIST 2009, Oct. 2009, 4 pages.

Glatt, "Channel and Key Pressure (Aftertouch).", Retrieved from: <http://home.roadrunner.com/~jgglatt/tutr/touch.htm> on Jul. 11, 2012, 2012, 2 pages.

Hanlon, "ElekTex Smart Fabric Keyboard Goes Wireless", Retrieved from: <http://www.gizmag.com/go/5048/ > on May 7, 2012, Jan. 15, 2006, 5 pages.

Justin, "Seidio Active with Kickstand for the Galaxy SIII", Retrieved From: <http://www.t3chniq.com/seidio-active-with-kickstand-gs3/> on Nov. 22, 2013, Jan. 3, 2013, 5 Pages.

Kaur, "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.

Khuntontong, et al., "Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.

Lahr, "Development of a Novel Cam-based Infinitely Variable Transmission", Proceedings: In Thesis of Master of Science in Mechanical Engineering, Virginia Polytechnic Institute and State University,Nov. 6, 2009, 91 pages.

Lambert, "Cam Design", In Proceedings: Kinematics and dynamics of Machine, University of Waterloo Department of Mechanical Engineering,Jul. 2, 2002, pp. 51-60.

Lee, et al., "LED Light Coupler Design for a Ultra Thin Light Guide", Journal of the Optical Society of Korea, vol. 11, Issue.3, Retrieved from <http://opticslab.kongju.ac.kr/pdf/06.pdf>,Sep. 2007, 5 pages.

Linderholm, "Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.

McLellan, "Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.

Post, et al., "E-Broidery: Design and Fabrication of Textile-Based Computing", IBM Systems Journal, vol. 39, Issue 3 & 4, Jul. 2000, pp. 840-860.

Prospero, "Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.

Purcher, "Apple Designs a Future Built-In Stand for the iPad & More", Retrieved From: <http://www.patentlyapple.com/patently-apple/2011/02/apple-designs-a-future-built-in-stand-for-the-ipad-more.html> Jun. 11, 2014, Feb. 13, 2011, 9 pages.

Purcher, "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012,Jan. 12, 2012, 15 pages.

Qin, et al., "pPen: Enabling Authenticated Pen and Touch Interaction on Tabletop Surfaces", In Proceedings of ITS 2010, Available at <http://www.dfki.de/its2010/papers/pdf/po172.pdf>,Nov. 2010, pp. 283-284.

Sanap, et al., "Design and Analysis of Globoidal Cam Index Drive", Proceedings: In International Journal of Scientific Research Engineering & Technology, Jun. 2013, 6 Pages.

Siddiqui, "Hinge Mechanism for Rotatable Component Attachment", U.S. Appl. No. 13/852,848, Mar. 28, 2013, 51 pages.

Sumimoto, "Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.

Takamatsu, et al., "Flexible Fabric Keyboard with Conductive Polymer-Coated Fibers", In Proceedings of Sensors 2011, Oct. 28, 2011, 4 pages.

Thurrott, "Surface Pro 3: Continuous Kickstand", Retrieved From: <http://winsupersite.com/mobile-devices/surface-pro-3-continuous-kickstand> Jun. 11, 2014, May 21, 2014, 5 Pages.

Valliath, "Design of Hologram for Brightness Enhancement in Color LCDs", Retrieved from <http://www.loreti.it/Download/PDF/LCD/44_05.pdf> on Sep. 17, 2012, May 1998, 5 pages.

(56) References Cited

OTHER PUBLICATIONS

Williams, "A Fourth Generation of LCD Backlight Technology", Retrieved from <http://cds.linear.com/docs/Application%20Note/an65f.pdf>, Nov. 1995, 124 pages.

Zhang, et al., "Model-Based Development of Dynamically Adaptive Software", In Proceedings of ICSE 2006, Available at <http://www.irisa.fr/lande/lande/icse-proceedings/icse/p371.pdf>,May 20, 2006, pp. 371-380.

"Adjustable Kickstand for SecureBack™ M Series Enclosures", Retrieved From: <http://www.kensington.com/ce/ca/4543/8589667786/adjustable-kickstand-for-secureback™-m-series-enclosures#.VQ_Z7_mUdT5> Mar. 25, 2015, 2012, 3 pages.

"Non-Final Office Action", U.S. Appl. No. 13/852,848, Mar. 26, 2015, 7 pages.

Advisory Action, U.S. Appl. No. 14/281,905, Feb. 19, 2016, 3 pages.

Corrected Notice of Allowance, U.S. Appl. No. 13/852,848, Mar. 2, 2016, 2 pages.

Corrected Notice of Allowance, U.S. Appl. No. 14/166,596, Mar. 14, 2016, 2 pages.

Non-Final Office Action, U.S. Appl. No. 14/281,905, Mar. 24, 2016, 5 pages.

Non-Final Office Action, U.S. Appl. No. 14/473,137, Jul. 14, 2016, 23 pages.

Second Written Opinion, Application No. PCT/US2015/031271, May 2, 2016, 5 pages.

\* cited by examiner

HINGE MECHANISM WITH MULTIPLE PRESET POSITIONS

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

Because mobile computing devices are configured to be mobile, the devices are typically designed to be used in a handheld manner. Traditional ways of adapting mobile devices for other uses (e.g., on a table or other surface) tend to be awkward and detract from the mobile aesthetic associated with mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A hinge mechanism with multiple preset positions is described. According to various embodiments, the hinge mechanism enables a support component to be adjustably attached to an apparatus, such as a computing device. In at least some embodiments, the hinge mechanism utilizes preset hinge positions that enable the support component to be placed at different preset positions. For instance, the hinge mechanism is configured such that an attached support component tends to "snap" into various preset positions. In at least some embodiments, the hinge mechanism includes an emergency escape position that enables the support component to be rotated beyond normal operating positions without damaging the support component.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
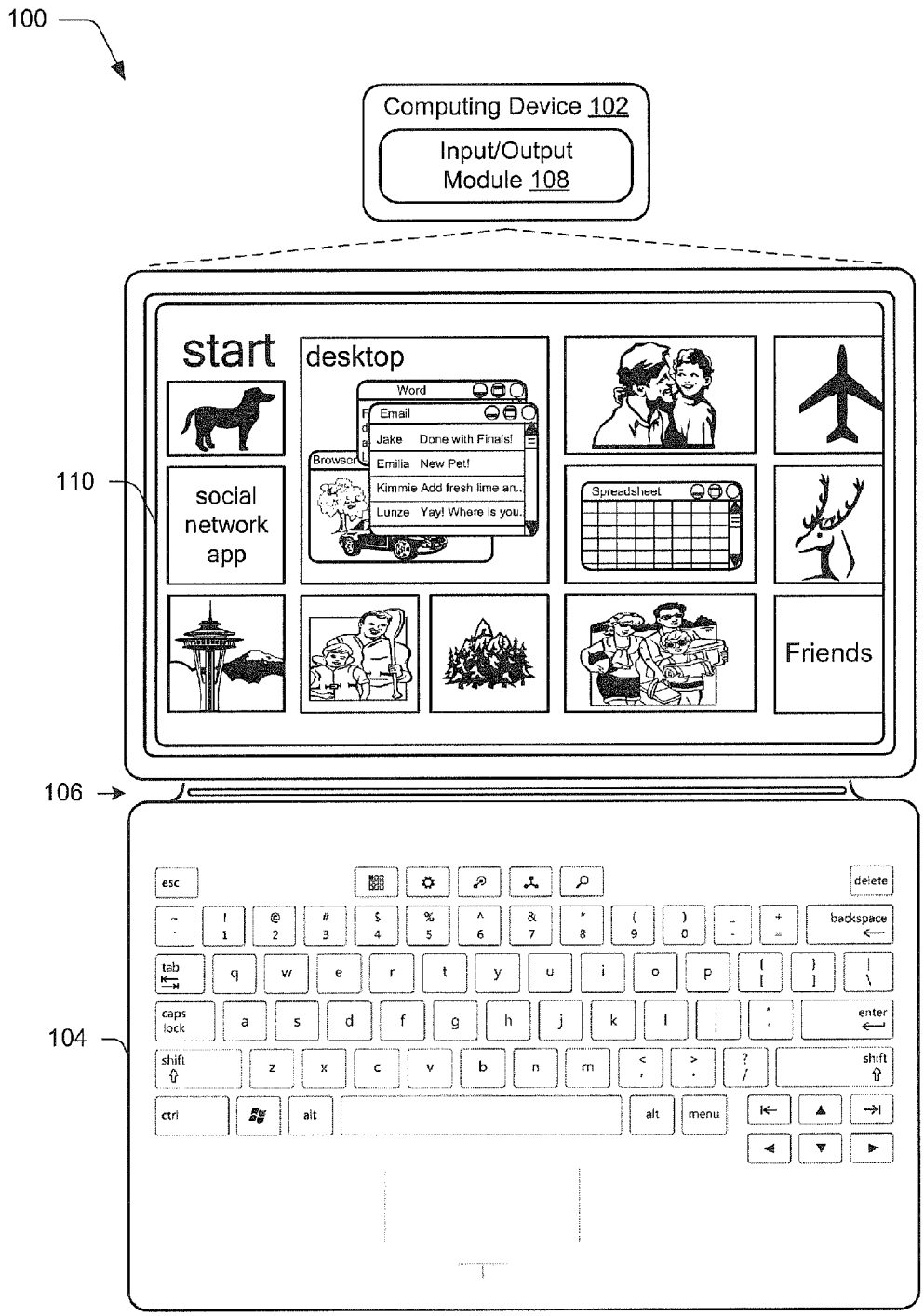
FIG. 1 is an illustration of an environment in an example implementation that is operable to employ the techniques described herein in accordance with one or more embodiments.

A hinge mechanism with multiple preset positions is described. In at least some implementations, the hinge mechanism enables a support component to be adjustably attached to an apparatus, such as a computing device. For example, the hinge mechanism can be employed to rotatably attach a kickstand to a mobile computing device. The kickstand can be rotated via the hinge mechanism to various positions to provide support for different orientations of the computing device. For example, the kickstand can be positioned to support the computing device in a typing orientation such that input can be provided via an associated input device. As another example, the kickstand can be positioned to enable viewing and/or interaction with the computing device, such as in a portrait viewing orientation.

In at least some implementations, a hinge mechanism utilizes preset hinge positions that enable a kickstand to be placed at different preset positions. Further, the hinge mechanism includes a center of rotation that is external to the hinge mechanism. Thus, the kickstand can conform to a contour of the computing device when in a closed position, and maintain a minimal external profile when moving between the different preset positions. According to various implementations, the hinge mechanism includes an emergency escape position that enables the kickstand to be rotated beyond normal operating positions without damaging the kickstand or detaching the kickstand from an associated device.

In at least some implementations, the hinge mechanism discussed herein is configured such that an attached support component tends to "snap" into various preset positions. Generally, snapping refers to movement of the hinge mechanism in response to force generated internally to the hinge mechanism, e.g., via a hinge spring and/or other component that provides elastic force for the hinge mechanism. In at least some implementations, snapping occurs when a user releases a support component, e.g., independent of user-applied force to the support component. For instance, torque forces that apply during movement of the hinge mechanism are such that the hinge mechanism typically does not rest at positions outside of the preset positions unless held there by a user. Thus, torque forces at work during movement of an attached support component provide a form of tactile feedback that indicates to a user whether the support component is positioned in a normal operating position, e.g., at a preset position for the hinge mechanism. Various attributes and components of example hinge mechanisms are presented in detail below.

In the following discussion, an example environment is first described that may employ the techniques described herein. Embodiments discussed herein are not limited to the example environment, and the example environment is not limited to embodiments discussed herein. Next, example device orientations are discussed in accordance with one or more embodiments. Following this, an example kickstand is described in accordance with one or more embodiments. Next, example hinges for kickstand attachment are discussed in accordance with one or more embodiments. Following this, a section entitled "Hinge Responsiveness Profile" discusses an example torque profile for hinge movement in accordance with one or more embodiments. Finally, an example system and device are discussed that may implement various techniques described herein.

Example Environment

FIG. 1 is an illustration of an environment 100 in an example implementation that is operable to employ the techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, a wearable device, and so on.

While embodiments presented herein are discussed in the context of a tablet device, it is to be appreciated that various other types and form factors of devices may be utilized in accordance with the claimed embodiments. Thus, the computing device 102 may range from full resource devices with substantial memory and processor resources, to a low-resource device with limited memory and/or processing resources. An example implementation of the computing device 102 is discussed below with reference to FIG. 36.

The computing device 102 is illustrated as including an input/output module 108, which is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify touch gestures and cause operations to be performed that correspond to the touch gestures that may be recognized through the input device 104 and/or touchscreen functionality of the display device 110, and so forth. Thus, the input/output module 108 may support a variety of different input techniques by recognizing and leveraging a division between types of inputs including key presses, touch gestures, touchless gestures recognized via a camera functionality of the computing device 102, and so on.

In the illustrated example, the input device 104 is configured as having an input portion that includes a keyboard having a QWERTY arrangement of keys and track pad although other arrangements of keys are also contemplated. Further, other non-conventional configurations are also contemplated, such as a game controller, configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one or more directions (e.g., vertically in the figure) yet restrict movement in other directions, such as lateral movement of the input device 104 in relation to the computing device 102. This may be used to support consistent alignment of the input device 104 in relation to the computing device 102, such as to align sensors used to change power states, application states, and so on.

Example Device Orientations

Figure 2:
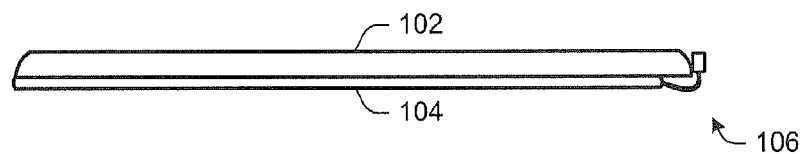
FIG. 2 illustrates an example orientation of the input device in relation to the computing device as covering a display device of the computing device in accordance with one or more embodiments.

According to various embodiments, a variety of different orientations of the computing device 102 are supported. For example, rotational movement may be supported by the flexible hinge 106 such that the input device 104 may be placed against the display device 110 of the computing device 102 and thereby act as a cover as shown in the example orientation 200 of FIG. 2. Thus, the input device 104 may act to protect the display device 110 of the computing device 102 from harm.

Figure 3:
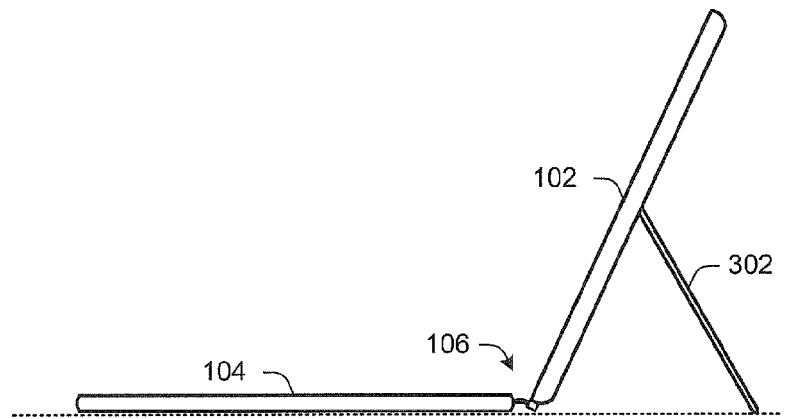
FIG. 3 illustrates an example orientation of the input device in relation to the computing device as assuming a typing orientation in accordance with one or more embodiments.

As shown in the example orientation 300 of FIG. 3, a typing arrangement may be supported. In this orientation, the input device 104 is laid flat against a surface and the computing device 102 is disposed at an angle to permit viewing of the display device 110, e.g., such as through use of a kickstand 302 disposed on a rear surface of the computing device 102.

Naturally, a variety of other orientations other than those expressly illustrated and discussed herein are also supported.

Kickstand

The described kickstand can be employed as a support component to enable a variety of different orientations for the computing device 102. For instance, consider the following implementations of a kickstand in accordance with various embodiments.

Figure 4:
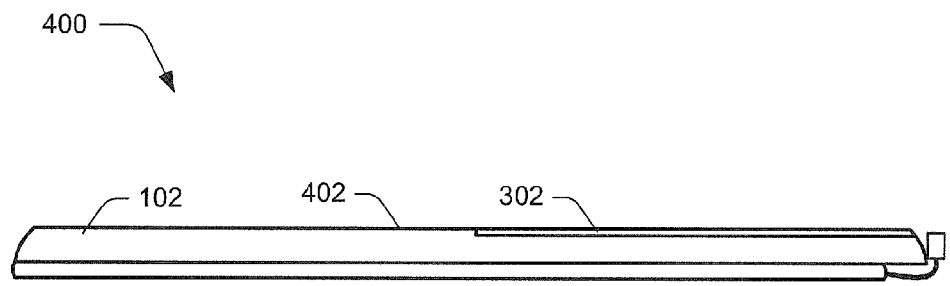
FIG. 4 illustrates an example orientation of a computing device with a support component in accordance with one or more embodiments.

FIG. 4 illustrates an orientation 400, and includes the kickstand 302 in a closed position. In the closed position, the kickstand 302 forms a portion of a rear surface 402 of the computing device 102 such that the kickstand 302 conforms to a surface contour of the computing device 102. For instance, when the kickstand 302 is in the closed position, the kickstand 302 integrates into the computing device 102 and does not protrude from a plane formed by the rear surface 402.

Figure 5:
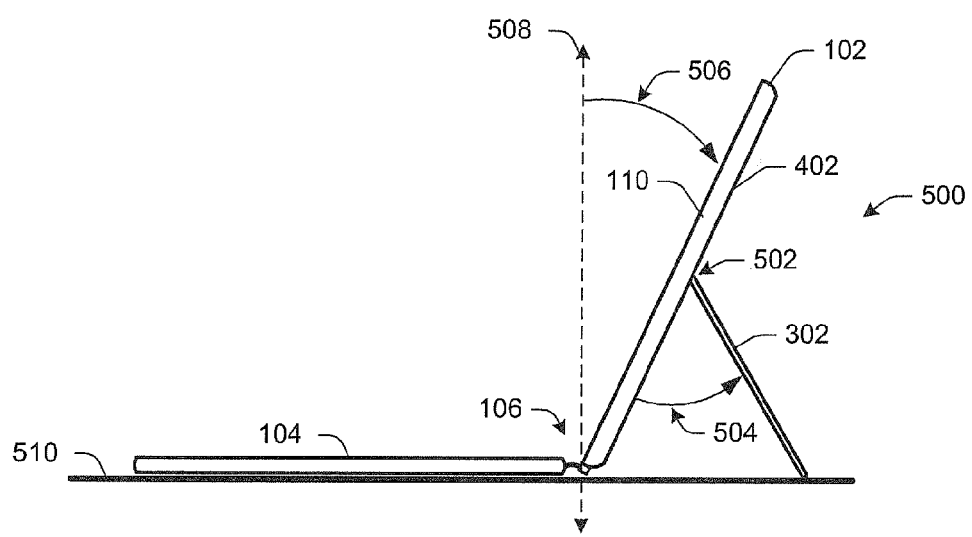
FIG. 5 illustrates an example orientation of a computing device with a support component in accordance with one or more embodiments.

FIG. 5 illustrates that the kickstand 302 can be rotated away from the rear surface 402 of the computing device 102 to a position 500. For instance, the kickstand 302 can be rotatably attached to the computing device 102 along a seam 502 via a hinge mechanism. Examples of such a hinge mechanism are detailed below.

In at least some implementations, the position 500 corresponds to a preset position for the kickstand 302. For instance, when a user applies pressure to the kickstand 302 away from the rear surface 402, the kickstand 302 can snap into the position 500. As detailed below, a hinge mechanism employed to attach the kickstand 302 to the computing device 102 can utilize spring pressure and detent settings to provide preset open positions for the kickstand 302. In this example, the position 500 is associated with an angle 504 between the rear surface of the computing device 102 and the kickstand 302. For instance, the angle 504 can range from 45 degrees (45°) to 55 degrees (55°). The angle 504, for example, is approximately 48°, +/−3°. Any suitable angle and/or range of angles may be employed, however.

According to various implementations, the position 500 places the front surface of the display device 110 at an angle 506 relative to a vertical line 508. The vertical line 508, for instance, is normal (i.e., 90°) to a surface 510 on which the computing device 102 and the kickstand 302 are disposed. In this particular example, the angle 506 is approximately 24°, +/−3°. The angle 506, for instance, is one-half of the angle 504.

As illustrated, the input device 104 can be rotated away from the computing device 102 and supported by the kickstand 302. The position 500, for instance, enables the display device 110 to be viewed and input to be provided to the computing device 102 via the input device 104. Alternatively or additionally, the position 500 enables a user to interact with a touchscreen of the computing device 102.

Figure 6:
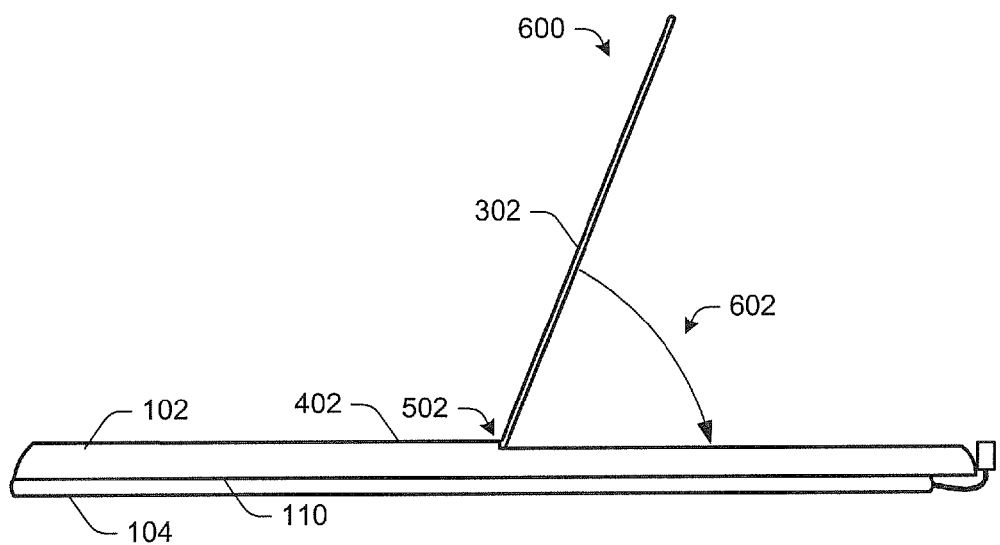
FIG. 6 illustrates an example orientation of a computing device with a support component in accordance with one or more embodiments.

FIG. 6 illustrates that the kickstand 302 can be rotated away from the rear surface 402 of the computing device 102 to a position 600. For instance, the kickstand 302 can be rotated further past the position 500 to the position 600.

In at least some implementations, the position 600 corresponds to a further preset position for the kickstand 302. For example, when a user applies pressure to the kickstand 302 away from the rear surface 402 (e.g., past the position 500), the kickstand 302 can snap into the position 600. In this example, the position 600 is associated with an angle 602 between the rear surface of the computing device 102 and the kickstand 302. For instance, the angle 602 can range from 80 degrees (80°) to 85 degrees (90°). The angle 602, for example, is approximately 84°, +/−4°. Any suitable angle and/or range of angles may be employed, however. Further, the seam 502 can be maintained (e.g., the width of the seam) during rotation to the position 600.

With the kickstand 302 in the position 600, the computing device 102 supports a variety of different usage scenarios. For instance, consider the following two example scenarios.

Figure 7A:
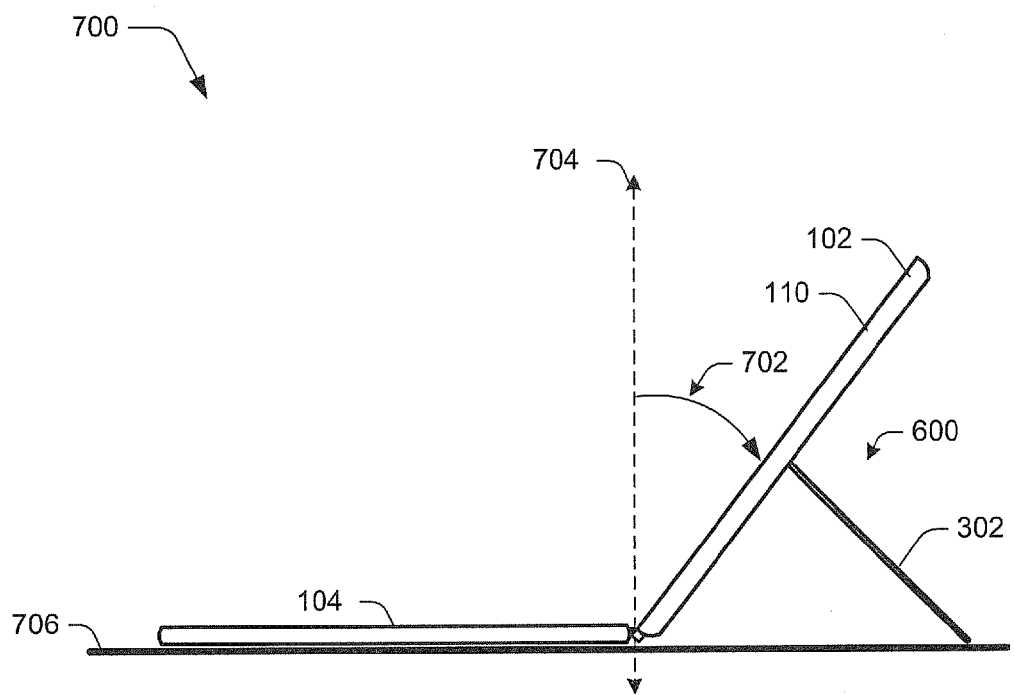
FIG. 7a illustrates an example orientation of a computing device with a support component in accordance with one or more embodiments.

FIG. 7a illustrates a side view of the computing device 102 in an orientation 700 and with the kickstand 302 positioned in the position 600. In the position 700, the computing device is reclined in comparison to previously-discussed orientations, such as the orientation 300 discussed above with reference to FIG. 3. As illustrated, the orientation 700 presents the display device 110 at a more open angle that supports different usage scenarios. For instance, the orientation 700 supports use of the computing device 102 in a user's lap, such as during air travel. A variety of other usage scenarios are supported by the orientation 700, such as for tall users that may have a higher viewing angle, use on a low surface (e.g., a coffee table), and so forth.

According to various implementations, the orientation 700 places the front surface of the display device 110 at an angle 702 relative to a vertical line 704. The vertical line 704, for instance, is normal (i.e., 90°) to a surface 706 on which the computing device 102 and the kickstand 302 are disposed. In this particular example, the angle 702 is approximately 42°, +/−5°. The angle 702, for instance, is one-half of the angle 602.

With the kickstand 302 in the position 600, the computing device 102 can also be rotated sideways (e.g., to a portrait viewing position) and supported via the kickstand 302. For instance, consider an orientation 708 illustrated in FIG. 7b.

Figure 7B:
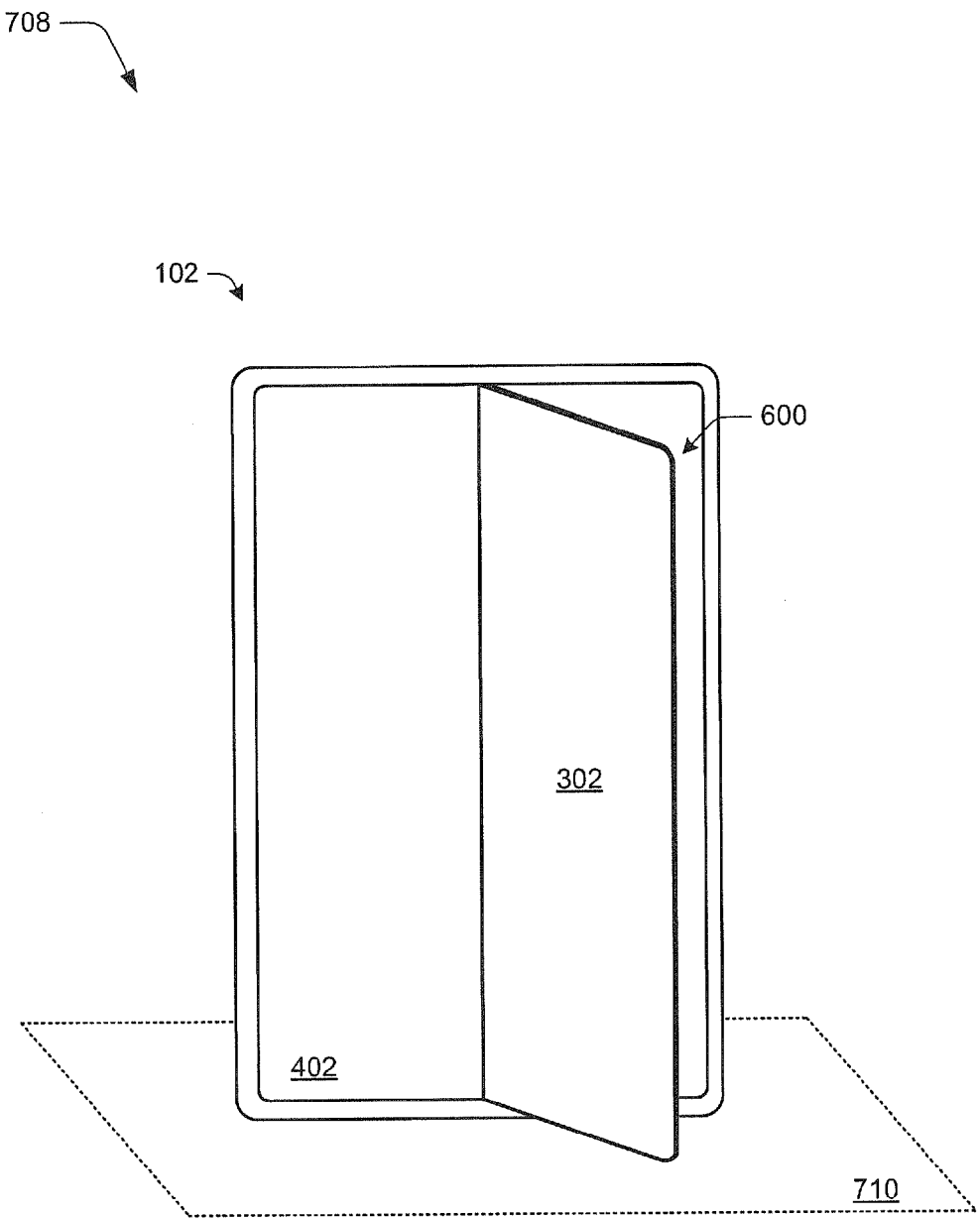
FIG. 7b illustrates a rear view of an example orientation of a computing device with a support component in accordance with one or more embodiments.

FIG. 7b illustrates a rear view of the computing device 102 in the orientation 708, showing that the computing device 102 is rotated to a portrait viewing position, such as 90 degrees (90°) to the orientation illustrated in FIG. 1. Further, the kickstand 302 is positioned in the position 600 such that the computing device 102 reclines back and is supported by the kickstand 302 on a surface 710. According to various implementations, placing the computing device 102 in the orientation 708 can cause a view orientation of the display device 110 to be rotated to a portrait view.

In FIG. 7b, the computing device 102 is illustrated without the input device 104. Thus, in at least some embodiments the input device 104 can be separated from the computing device 102 such that the computing device 102 has functionality independent of the input device 104. For example, the flexible hinge 106 can employ a magnetic attachment mechanism that holds the input device 104 to the computing device 102 via magnetic force. Thus, a user can grasp the computing device 102 and the input device 104, and can pull the two apart by overcoming the magnetic attraction between them.

When separate from the input device 104, the computing device 102 can provide various functionality. For example, a user can view content via the computing device 102, such as movies and/or streaming content. Further, a user can interact with touch screen functionality of the display device 110.

Thus, placing the kickstand 302 in the position 600 can enable a user to place the computing device in a landscape and/or portrait orientation, and to view and/or interact with the computing device in such orientations.

Figure 8:
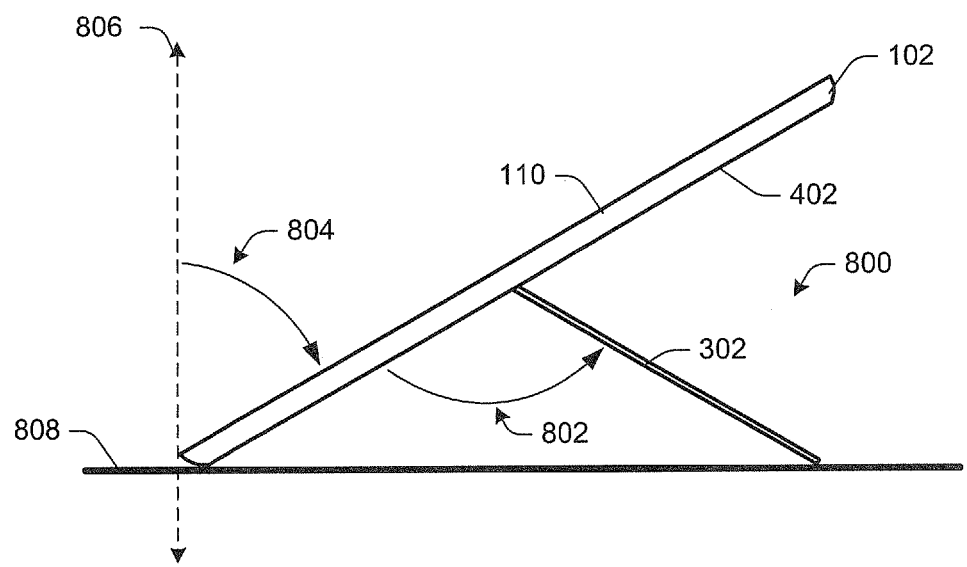
FIG. 8 illustrates an example orientation of a computing device with a support component in accordance with one or more embodiments.

FIG. 8 illustrates that the kickstand 302 can be rotated away from the rear surface 402 of the computing device 102 to a position 800. For instance, the kickstand 302 can be rotated further past the position 600 to the position 800.

In at least some implementations, the position 800 corresponds to a further preset position for the kickstand 302. For example, when a user applies pressure to the kickstand 302 away from the rear surface 402 (e.g., past the position 600), the kickstand 302 can snap into the position 800. In this example, the position 800 is associated with an angle 802 between the rear surface of the computing device 102 and the kickstand 302. For instance, the angle 802 can range from 113 degrees (113°) to 123 degrees (123°). The angle 602, for example, is approximately 118, +/−5°. Any suitable angle and/or range of angles may be employed, however.

According to various implementations, the position 800 places the front surface of the display device 110 at an angle 804 relative to a vertical line 806. The vertical line 806, for instance, is normal (i.e., 90°) to a surface 808 on which the computing device 102 and the kickstand 302 are disposed. In this particular example, the angle 804 is approximately 59°, +/−5°. The angle 804, for instance, is one-half of the angle 802.

Figure 9:
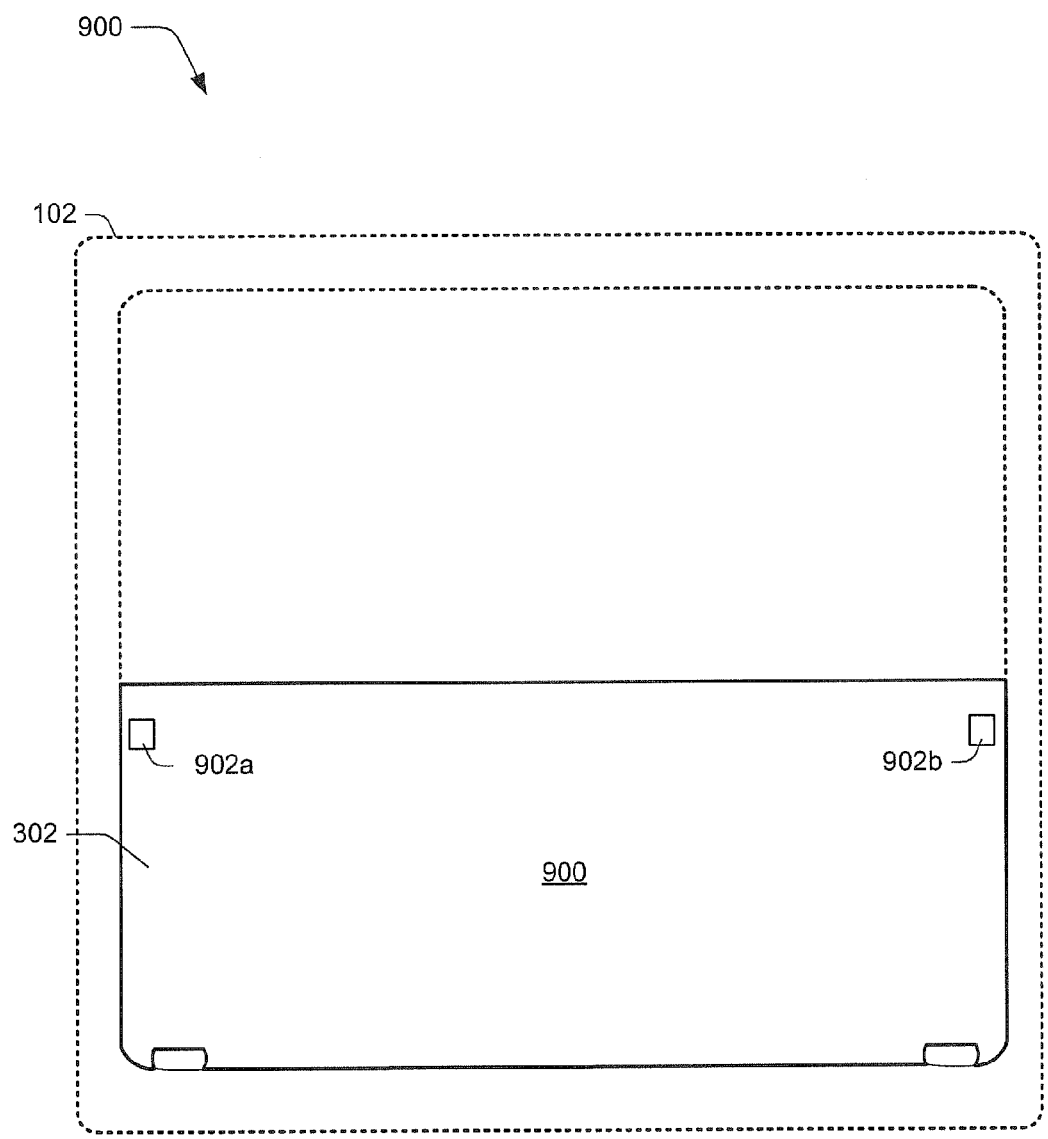
FIG. 9 illustrates an example inner surface of a support component in accordance with one or more embodiments.

FIG. 9 illustrates a view of an inner surface 900 of the kickstand 302 in accordance with one or more embodiments. In this example, the kickstand 302 is illustrated in the context of an outline of a chassis of the computing device 102. The inner surface 900 includes hinge mounts 902a, 902b, which function as mounting points for hinge mechanisms that are employed to attach the kickstand 302 to the computing device 102. Examples of such hinge mechanisms are discussed below.

Hinges for Component Attachment

A variety of different hinge mechanisms can be employed for attaching various components in accordance with various embodiments. Some example hinge mechanisms and hinge arrangements are discussed below.

Figure 10:
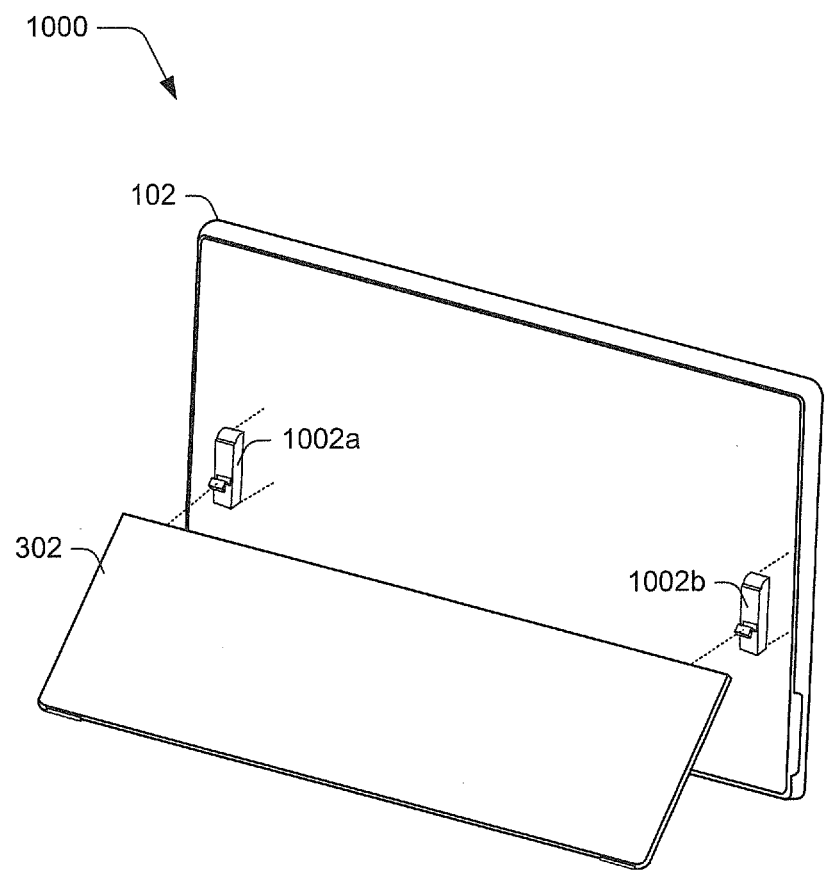
FIG. 10 illustrates an example exploded view of a computing device with a support component in accordance with one or more embodiments.

FIG. 10 illustrates an exploded rear view 1000 of a chassis of the computing device 102 and the kickstand 302. Included in the rear view 1000 are hinges 1002a and 1002b, which are employed to attach the kickstand 302 to the computing device 102. The hinges 1002a, 1002b are configured to be installed internally in the computing device 102, such as via a suitable attachment method and/or device.

The kickstand 302 can be attached to a pivoting portion of the hinges 1002a, 1002b via the hinge mounts 902a, 902b, discussed above with reference to FIG. 9. Thus, attachment to the hinges 1002a, 1002b enables the kickstand 302 to pivot between various positions with reference to the computing device 102.

Figure 11:
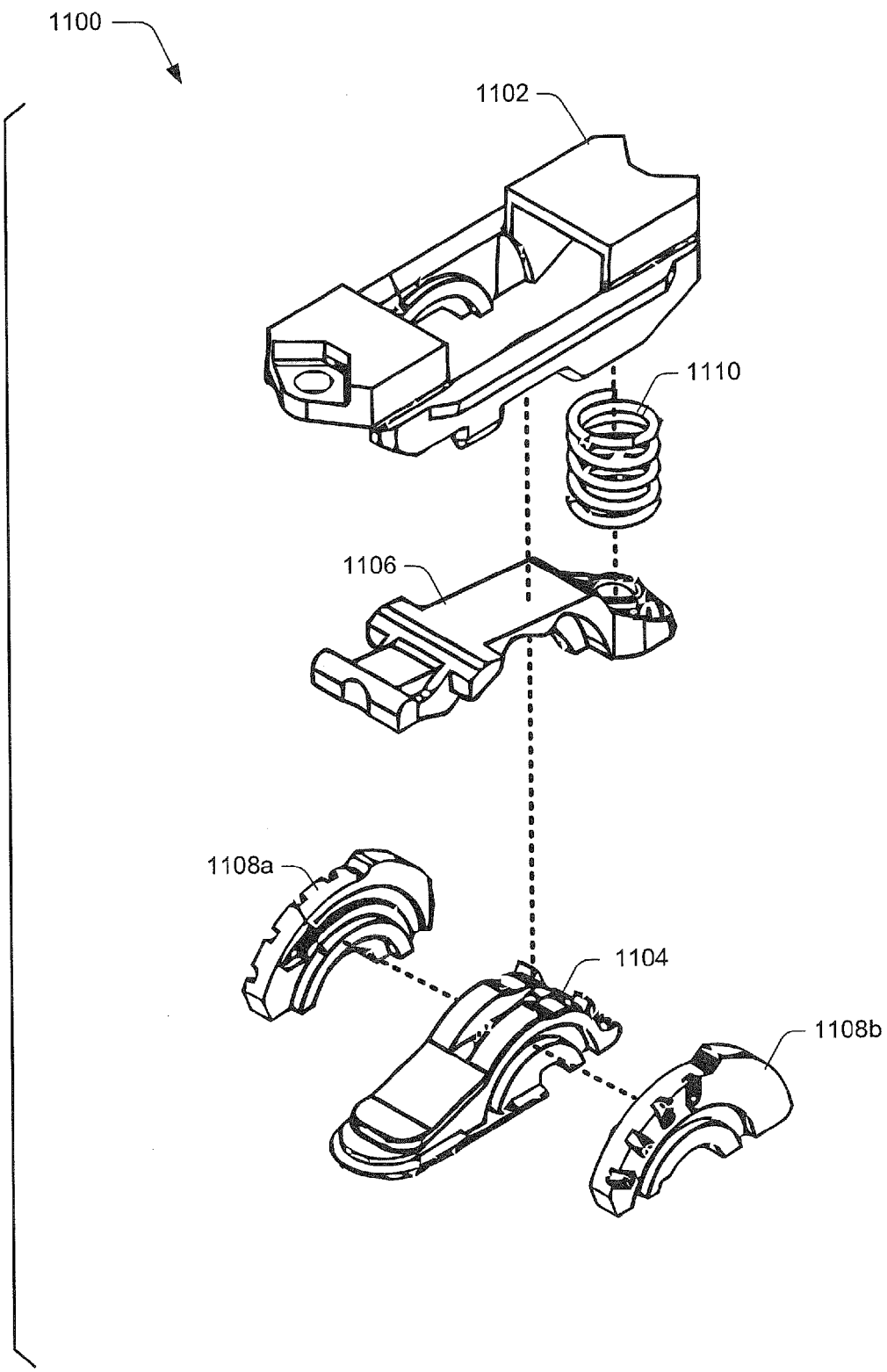
FIG. 11 illustrates components of an example hinge mechanism in accordance with one or more embodiments.

FIG. 11 illustrates components of an example hinge 1100 in accordance with one or more embodiments. The hinge 1100, for instance, can represent an implementation of the hinges 1002a, 1002b discussed above. This is not intended to be limiting, however, and the hinge 1100 can be employed as a hinge mechanism for a variety of different components and in a variety of different attachment scenarios. The hinge 1100 and its various components can be formed using any suitable material and/or combination of materials, such as metals, plastics, polymers, alloys, and so forth.

Components of the hinge 1100 include a hinge frame 1102 in which various other components of the hinge 1100 can be disposed. For example, the hinge frame 1102 can be mounted to and/or within a device (e.g., the computing device 102) and function as a support structure for other components of the hinge 1100.

Further included are a cam 1104, a cam follower 1106, a support plate 1108a, and a support plate 1108b. As detailed elsewhere herein, interaction between the cam 1104 and the cam follower 1106 within the hinge 1100 provides a particular responsiveness profile during user manipulation of a component attached to the hinge 1100, e.g., the kickstand 302. Further, the support plates 1108a, 1108b provide lateral support for the hinge 1100 in various open positions and enable the hinge 1100 to be positioned in various open positions. For purpose of discussion herein, the support plates 1108a, 1108b may be referred to as a support plate 1108.

The hinge 1100 also includes a hinge spring 1110, which applies pressure to the cam follower 1106 when the various components are placed in their respective positions within the hinge frame 1102. Further details concerning components and functionality of the hinge 1100 are now discussed.

Figure 12:
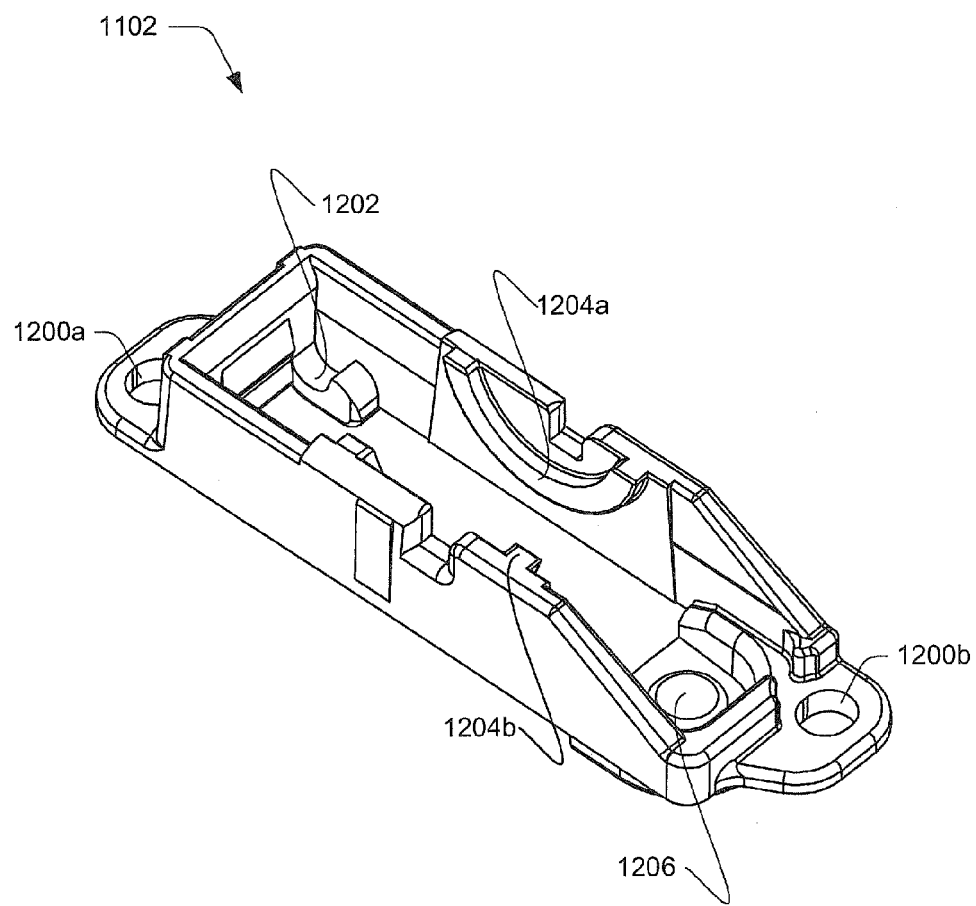
FIG. 12 illustrates a detail of portions of a hinge frame in accordance with one or more embodiments.

FIG. 12 illustrates a detail of portions of the hinge frame 1102. The view of the hinge frame 1102 presented in FIG. 12 is rotated 180 degrees relative to the view illustrated in FIG. 11. The hinge frame 1102 includes hinge mounts 1200a and 1200b by which the hinge frame 1102, and thus the hinge 1100, can be mounted to an apparatus. For instance, the hinge mounts 1200a, 1200b represent apertures through which a fastening mechanism such as a screw or bolt can be positioned and fastened into an apparatus, such as the computing device 102.

The hinge frame 1102 further includes a cam follower mount 1202 into which the cam follower 1106 can be mounted. While not expressly illustrated here, the cam follower mount 1202 includes a similar portion on the opposite inside surface of the hinge frame 1102, thus forming a cradle into which a mounting portion of the cam follower 1106 can be attached.

Plate guides 1204a, 1204b represent raised portions on the inside surface of the hinge frame 1102 which are employed for mounting the support plates 1108a, 1108b into the hinge frame 1102. For instance, the plate guides 1204a, 1204b represent raised portions (e.g., curved rails) that are mirror images of one another on opposite inside surfaces of the hinge frame 1102. Generally, the support plates 1108a, 1108b engage with the plate guides 1204a, 1204b to hold the support plates 1108a, 1108b within the hinge frame 1102. During movement of a component attached to the hinge 1100 between one or more open positions, the plate guides 1204a, 1204b cause rotational movement of the support plates 1108a, 1108b. As further illustrated herein, rotational movement of the support plates 1108a, 1108b enables an attached component to be positioned in various different positions.

The hinge frame 1102 further includes a spring mount 1206, which represents a surface onto which the hinge spring 1110 is placed. As further detailed elsewhere herein, placement of the hinge spring 1110 onto the spring mount 1206 enables the hinge spring 1110 to exert pressure upon the cam follower 1106. Spring pressure on the cam follower 1106 holds the cam follower against the cam 1104 and thus enables the cam 1104 to be held in various preset positions.

Figure 13:
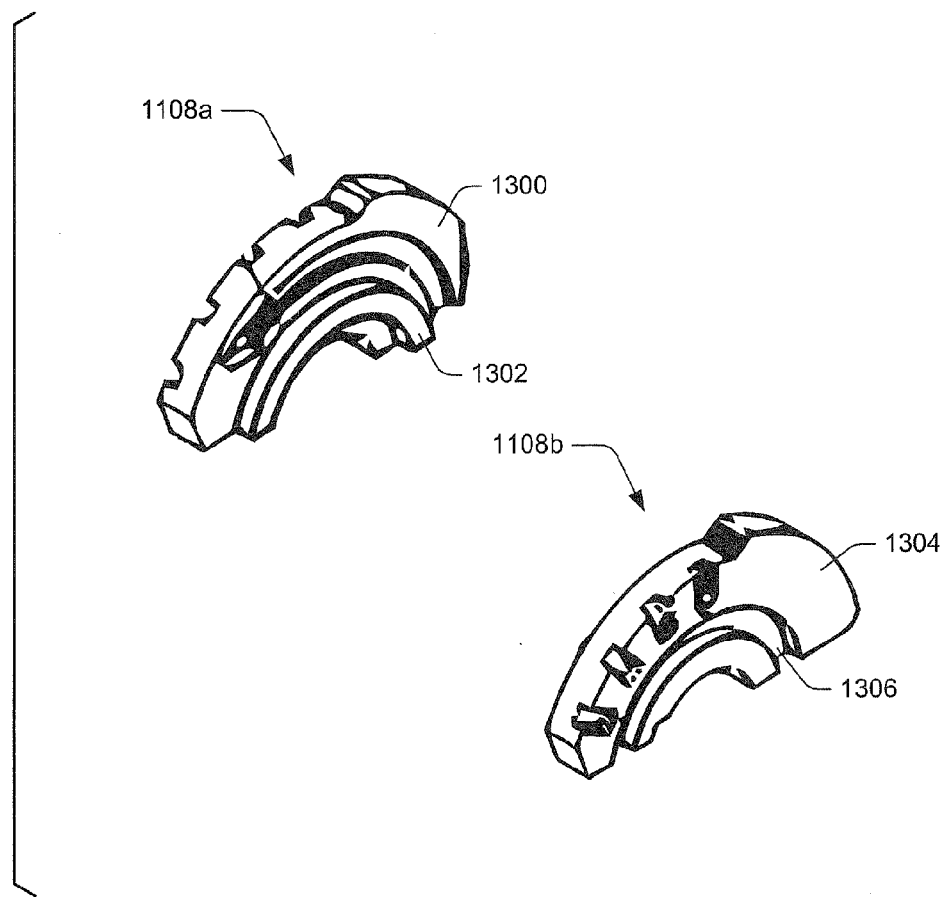
FIG. 13 illustrates a detail of portions of example support plates in accordance with one or more embodiments.

FIG. 13 illustrates a detail of portions of the support plates 1108a, 1108b. Illustrated as part of an inner support surface 1300 of the support plate 1108a is a cam guide 1302. Although not illustrated here, the support plate 1108b similarly includes a respective cam guide 1302 on its inner surface. Generally, the cam guides 1302 protrude from the surfaces of the respective support plates 1108a, 1108b and engage with the cam 1104 to moveably attach the cam 1104 to the hinge 1100. During movement of a component attached to the cam 1104, the cam guides 1302 enable rotational movement of the cam 1104 relative to the hinge frame 1102. As further illustrated herein, rotational movement of the cam 1104 enables an attached component to be placed in various positions.

An outer surface 1304 of the support plate 1108b includes a support channel 1306 that engages with the plate guide 1204b of the hinge frame 1102, introduced above. For instance, the dimensions of the support channel 1306 are such that the plate guide 1204b fits within the support channel 1306 when the support plate 1108b is mounted within the hinge frame 1102. During movement of the support plate 1108b relative to the hinge frame 1102, the support channel 1306 slides relative to the plate guide 1204b to enable rotational movement of the support plate 1108b relative to the hinge frame 1102. Although not illustrated here, an outer surface of the support plate 1108a similarly includes a respective plate channel 1306 that engages with the plate guide 1204a of the hinge frame 1102. Further features of the support plates 1108 are discussed below.

Figure 14:
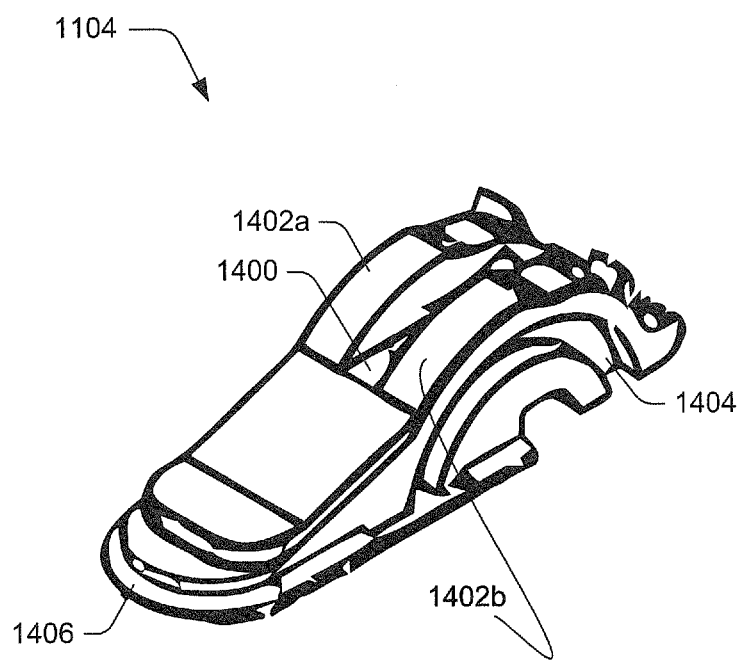
FIG. 14 illustrates a detail of portions of a hinge cam in accordance with one or more embodiments.

FIG. 14 illustrates example details of the cam 1104. The cam 1104 includes an inner cam surface 1400 and outer cam surfaces 1402a, 1402b. As illustrated, the inner cam surface 1400 is recessed in a channel along an inside portion of the cam 1104. The inner cam surface 1400, for instance, is positioned along center lengthwise axis of the cam 1104.

The outer cam surfaces 1402a, 1402b are positioned on either side of the inner cam surface 1400 and protrude above the inner cam surface 1400. According to various implementations, the outer cam surfaces 1402a, 1402b are mirror images of one another, and may be referred to herein as an outer cam surface 1402. As further detailed below, the inner cam surface 1400 and the outer cam surfaces 1402a, 1402b have specific surface profiles that interact with the cam follower 1106 to provide a particular response profile during movement of an attached component.

The cam 1104 further includes a cam channel 1404 and a component mounting portion 1406. The cam channel 1404 is formed such that when the cam 1104 is mounted within the hinge frame 1102 relative to the support plates 1108, the cam channel 1404 engages with the cam guide 1302 of the support plate 1108. Although not illustrated here, the opposite side of the cam 1104 includes a respective cam channel 1404. The dimensions of the cam guide 1302 of the support plate 1108, for instance, are such that the cam guide 1302 fits within the cam channel 1404. During movement of the cam 1104 relative to the hinge frame 1102, the cam channel 1404 slides relative to the cam guide 1302 to enable rotational movement of the cam 1104 relative to the support plates 1108a, 1108b.

The component mounting surface 1406 is representative of a portion of the cam 1104 to which a component (e.g., the kickstand 302) can be mounted. For instance, the component mounting surface 1406 includes surface attributes that engage and/or interlock with a component to stabilize the component relative to the cam 1104. Alternatively or additionally, the component mounting surface 1406 may include one or more apertures through which a fastening device such as a screw or bolt may be placed to fasten the hinge to a component.

Figure 15:
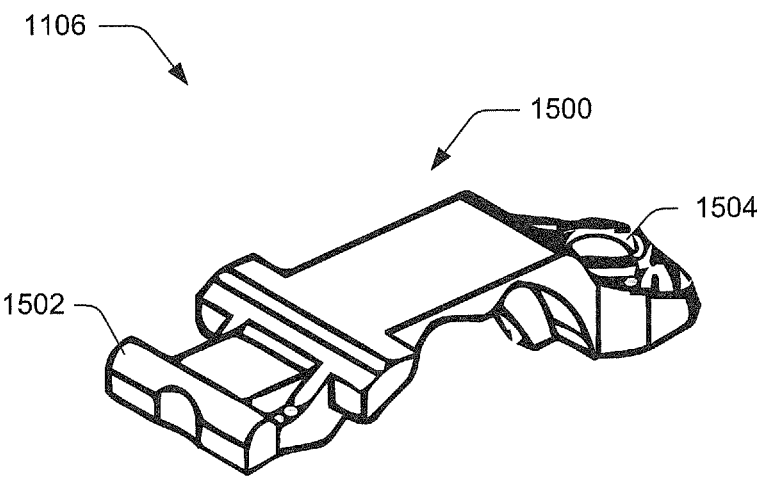
FIG. 15 illustrates a detail of a top surface of a cam follower in accordance with one or more embodiments.

FIG. 15 illustrates a detail of a top surface 1500 of the cam follower 1106. The top surface 1500 includes a follower pivot 1502 which is formed to engage within the cam follower mount 1202 (introduced above) of the hinge frame 1102. For instance, the follower pivot 1502 is fashioned such that the follower pivot 1502 slidably rotates within the cam follower mount 1202 during movement of various components of the hinge 1100.

The top surface 1500 of the cam follower 1106 further includes a spring platform 1504 which is configured to engage with the hinge spring 1110. For example, spring tension from the hinge spring 1110 against the spring platform 1504 holds the cam follower 1106 against the cam 1104. Thus, spring tension against the cam follower 1106 results in a reaction at the cam 1104 that provides a torque response at the cam 1104. As discussed herein, the torque response results at least in part from the shape of the cam 1104 and the cam follower 1106, and the interaction between their respective surfaces.

For instance, depending on the angular position of the cam 1104 and the direction of motion, movement of the cam 1104 may be either resisted (e.g., opposed) or driven. This interaction between the different elements of the hinge 1100 provides for a "snappy" response of an attached component, e.g., the kickstand 302.

Figure 16:
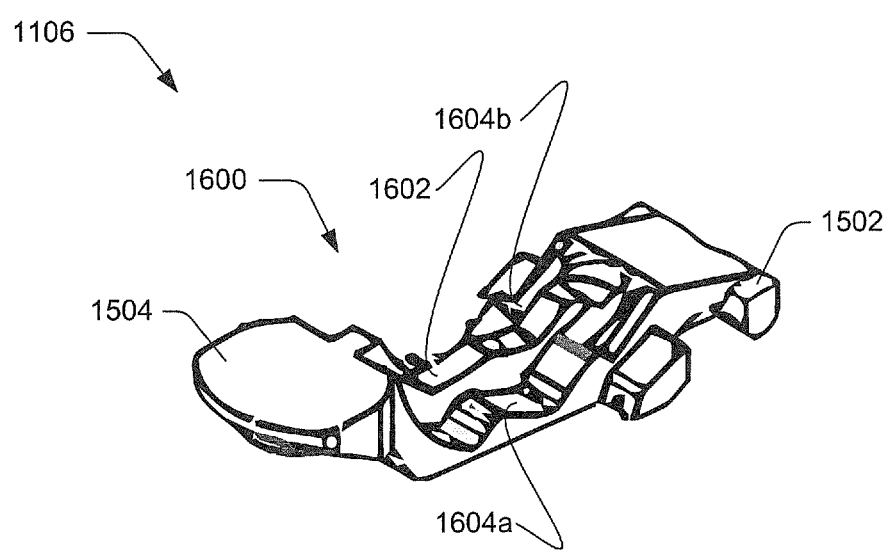
FIG. 16 illustrates a detail of a bottom surface of a cam follower in accordance with one or more embodiments.

FIG. 16 illustrates a detail of a bottom surface 1600 of the cam follower 1106. The bottom surface 1600 includes lower portions of the follower pivot 1502 and the spring platform 1504, introduced above.

The bottom surface 1600 further includes an inner follower surface 1602 and outer follower surfaces 1604a, 1604b. For purpose of discussion, the outer follower surfaces 1604a, 1604b may be referred to as an outer follower surface 1604. The inner follower surface 1602 protrudes from the bottom surface 1600 relative to the outer follower surfaces 1604a, 1604b. As detailed elsewhere herein, the inner follower surface 1602 and the outer follower surfaces 1604a, 1604b interact with surfaces of the cam 1104 to provide a particular torque response for a component attached to the hinge 1100.

Figure 17:
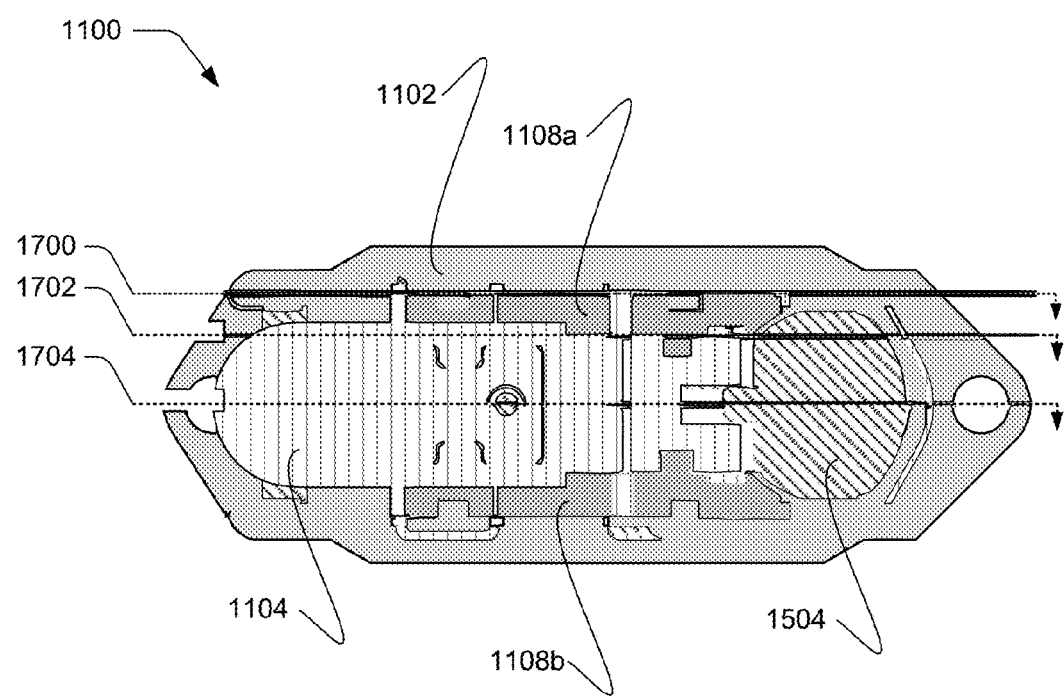
FIG. 17 illustrates example cross-section regions of a hinge mechanism in accordance with one or more embodiments.

FIG. 17 illustrates locations of vertical cross-sections of the hinge 1100 which will be used to describe function and attributes of the hinge 1100 in subsequent figures. Included are a first cross-section 1700, a second cross-section 1702, and a third cross-section 1704. Generally, these cross-sections define respective planes through the hinge 1100. Reference to these different cross-sections will be made in the subsequent discussion. Further illustrated are the hinge frame 1102, the cam 1104, the support plates 1108*a*, 1108*b*, and the bottom portion of the spring platform 1504 of the cam follower 1106.

Figure 18:
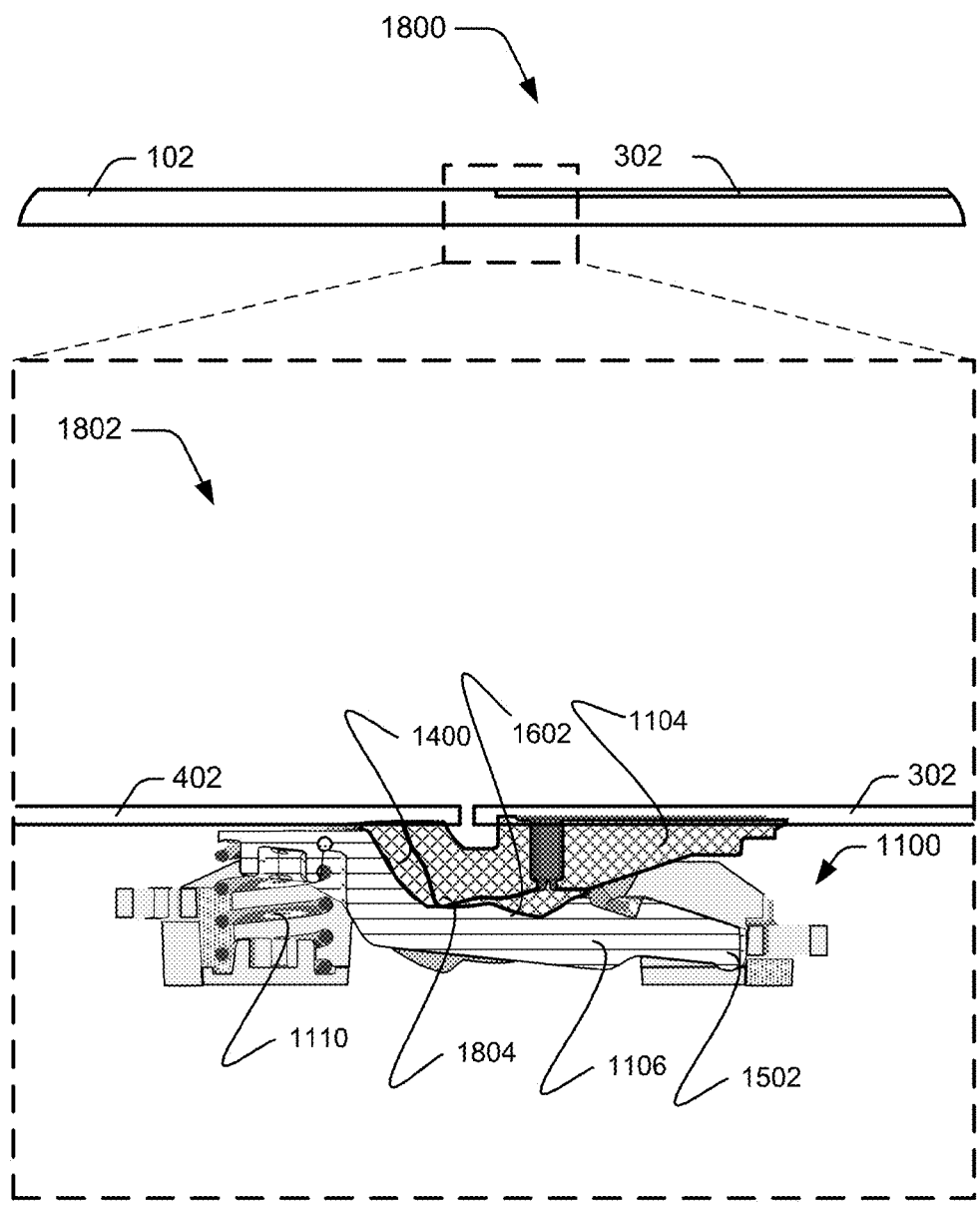
FIG. 18 illustrates a computing device with a support component in a closed position in accordance with one or more embodiments.

FIG. 18 illustrates the computing device 102 with the kickstand 302 in a position 1800. In at least some embodiments, the position 1800 corresponds to a closed position for the kickstand 302, such as discussed above with reference to FIG. 4. Further illustrated is a partial side section view 1802 of the computing device 102, including the kickstand 302 attached to the cam 1104 of the hinge 1100 in a closed position. The section view 1802, for instance, corresponds to the cross-section 1704 illustrated above. In the partial side view 1802 and subsequent views presented in subsequent figures, the hinge 1100 is illustrated with the kickstand 302 and the portions of the rear surface 402 of the computing device 102, but without other portions of the computing device 102.

In the section view 1802, the cam 1104 is sectioned lengthwise down the center, and thus the illustrated section of the cam 1104 illustrates a surface profile of the inner cam surface 1400, introduced above. The cam follower 1106 is also sectioned lengthwise down the center, and thus the illustrated section of the cam follower 1106 illustrates a surface profile of the inner follower surface 1602.

In the position 1800, force applied by the hinge spring 1110 holds the cam follower 1106 against the cam 1104. Further, the interface between the cam follower 1106 and the cam 1104 is such that movement of the kickstand 302 is resisted. For instance, the inner follower surface 1602 presses against an inner cam contact 1804, and the hinge spring 1110 resists rotational movement of the cam follower 1106 on the follower pivot 1502. Thus, absent force applied by a user to the kickstand 302, pressure from the cam follower 1106 against the cam 1104 holds the kickstand 302 in a closed position against the computing device 102.

Figure 19:
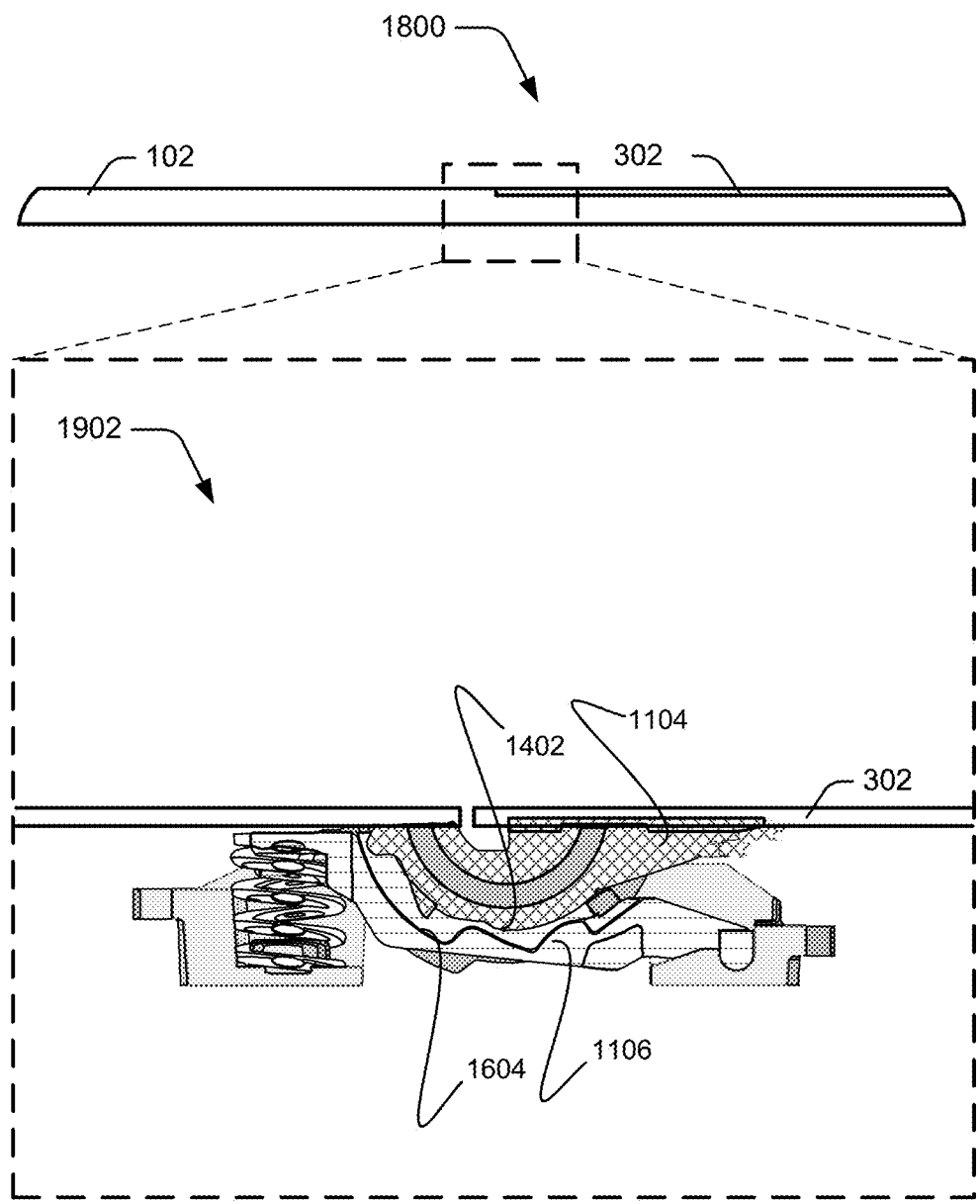
FIG. 19 illustrates a computing device with a support component in a closed position in accordance with one or more embodiments.

FIG. 19 illustrates the computing device 102 with the kickstand 302 in the position 1800, introduced above. Further illustrated is a partial side section view 1902 of the computing device 102, including the kickstand 302 attached to the cam 1104 of the hinge 1100 in a closed position. The section view 1902, for instance, corresponds to the cross-section 1702 illustrated above.

Illustrated as part of the section view 1902 are the outer follower surface 1604 of the cam follower 1106, and the outer cam surface 1402 of the cam 1104. As illustrated, in the position 1800 (e.g., a closed position), the outer follower surface 1604 does not contact the outer cam surface 1402.

Figure 20:
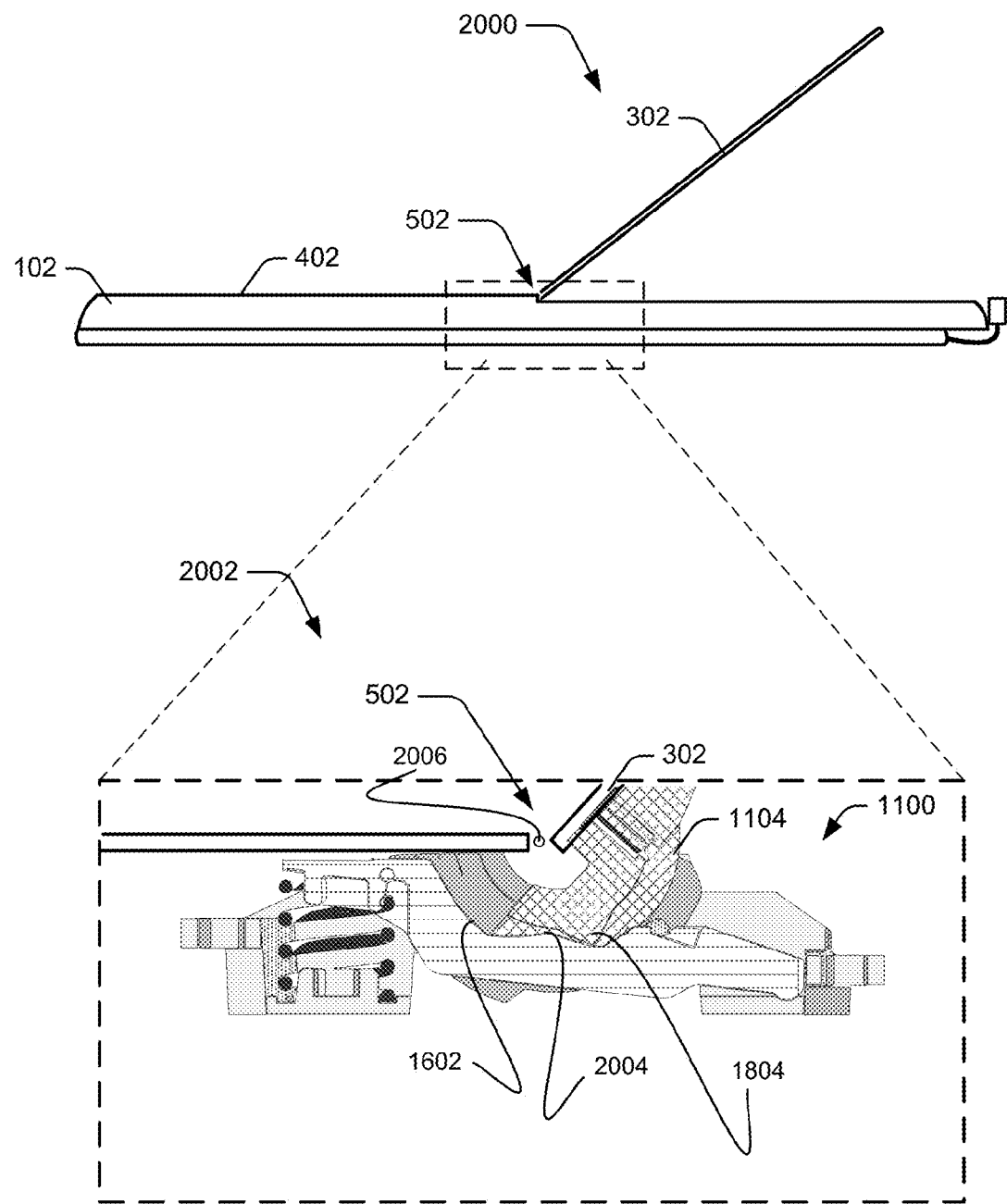
FIG. 20 illustrates a computing device with a support component in a first preset open position in accordance with one or more embodiments.

FIG. 20 illustrates the kickstand 302 in a position 2000. In at least some embodiments, the position 2000 corresponds to a first preset open position for the kickstand 302, such as the position 500 illustrated with reference to FIG. 5. Further illustrated is a partial side section view 2002 of the computing device 102, including the kickstand 302 attached to the cam 1104 of the hinge 1100 in a first open position. The section view 2002, for instance, corresponds to the cross-section 1704 illustrated in FIG. 17.

According to various implementations, movement of the kickstand 302 from the position 1800 to the position 2000 is initially resisted by pressure from the inner follower surface 1602 against the inner cam contact 1804. However, when movement of the inner cam contact 1804 proceeds past an inner follower point 2004, pressure from the inner follower surface 1602 against the inner cam contact 1804 drives the cam 1104 to the position 2000. For instance, if a user begins opening the kickstand 302 from the position 1800 but releases the kickstand 302 before the inner cam contact 1804 proceeds past the inner follower point 2004, the cam 1104 and thus the kickstand 302 will snap back into a closed position, e.g., the position 1800.

However, if the user manipulates the kickstand 302 such that the inner cam contact 1804 proceeds past the inner follower point 2004, pressure from the cam follower 1106 against the cam 1104 drives the cam 1104 into the position 2000, e.g., a first open position. For instance, if the user releases the kickstand 302 after the inner cam contact 1804 proceeds past the inner follower point 2004, the cam 1104 (and thus the kickstand 302) will snap into the position 2000.

According to various implementations, the hinge 1100 has a center of rotation 2006 this is external to the hinge itself. For instance, the center of rotation 2006 substantially coincides with the seam 502 between the kickstand 302 and stationary portions of the rear surface 402 of the computing device 102. Further, in at least some implementations, the center of rotation 2006 is consistent (e.g., does not change) when the hinge 1100 is repositioned among the various preset open positions discussed herein. This enables the kickstand 302 to maintain a consistent rotational profile and causes a width of the seam 502 to remain substantially consistent (e.g., within +/−0.050 millimeters) during rotation of the kickstand 302 among the different preset positions discussed herein.

Figure 21:
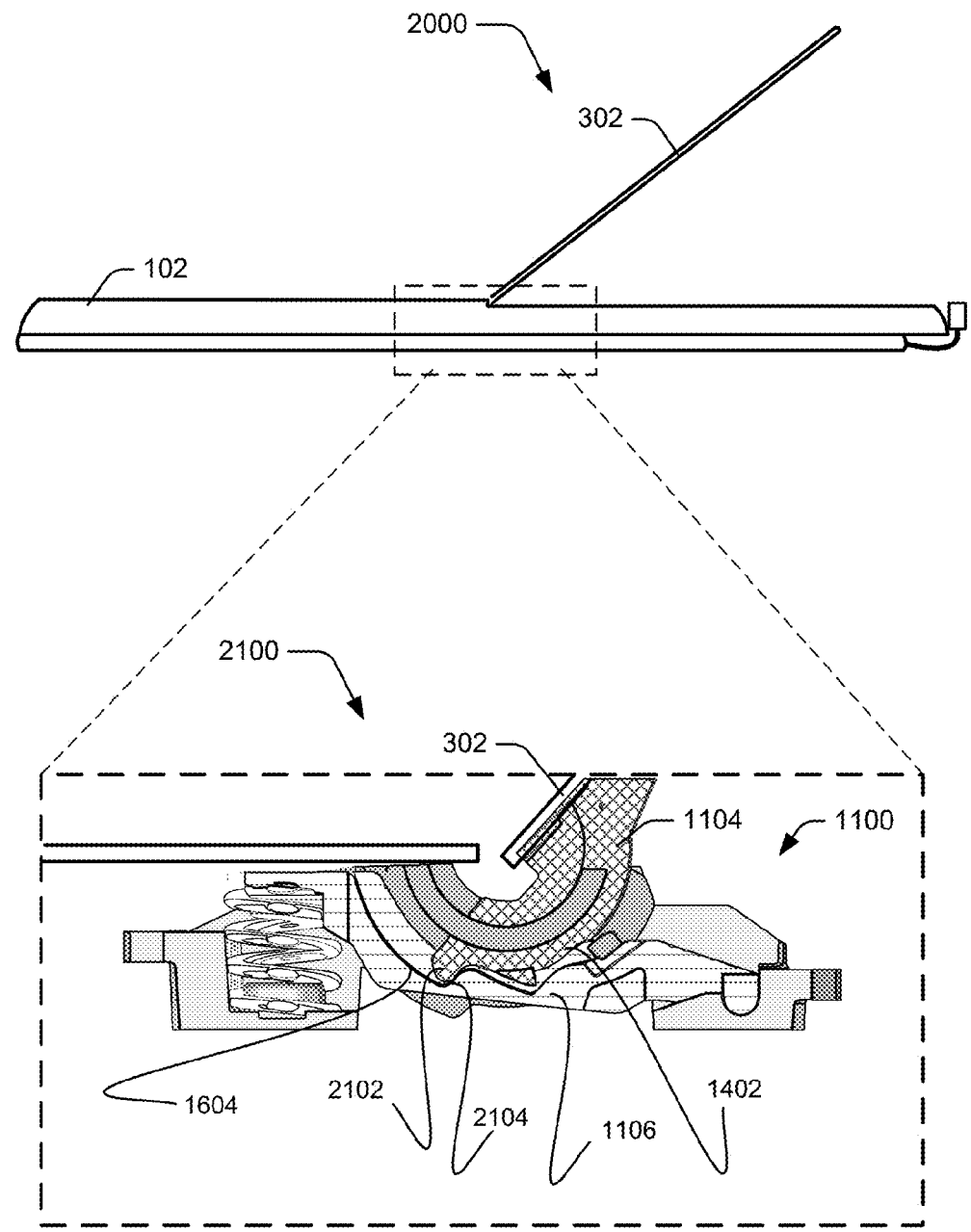
FIG. 21 illustrates a computing device with a support component in a first preset open position in accordance with one or more embodiments.

FIG. 21 illustrates the computing device 102 with the kickstand 302 in the position 2000, introduced above. Further illustrated is a partial side section view 2100 of the computing device 102, including the kickstand 302 attached to the cam 1104 of the hinge 1100 in an open position. The section view 2100, for instance, corresponds to the cross-section 1702 illustrated above. According to various implementations, the section view 2002 (above) and the section view 2100 illustrate different cross-sections of the same position for the hinge 1100, e.g., the position 2000.

Illustrated in the section view 2100 is the outer cam surface 1402 of the cam 1104 and the outer follower surface 1604 of the cam follower 1106. Further illustrated is that a first cam catch 2102 on the outer cam surface 1402 engages with a first follower catch 2104 on the outer follower surface 1604. Generally, the first cam catch 2102 and the first follower catch 2104 represent surface features on the outer cam surface 1402 and the outer follower surface 1604, respectively.

According to various implementations, engagement of the first cam catch 2102 with the first follower catch 2104 enables the kickstand 302 to persist in the position 2000. For instance, spring pressure from the hinge spring 1110 holds the first cam catch 2102 against the first follower catch 2104. In at least some implementations, absent external force directly and/or indirectly applied to the kickstand 302, the first cam catch 2102 will not disengage from the first follower catch 2104.

For example, the hinge 1100 is constructed such that unless a specified threshold force is applied to the kickstand 302, the hinge 1100 will not disengage from the position 2000. In at least some implementations, exceeding a threshold closing force against the kickstand 302 in one direction closes the kickstand, and exceeding a threshold opening force against the kickstand 302 in another direction opens the kickstand 302 further past the position 2000.

According to one or more implementations, contact between the cam 1104 and the cam follower 1106 occurs between the inner cam surface 1400 and the inner follower surface 1602 when the hinge 1100 is in a position from the closed position 1800 and up to the open position 2000. For instance, for a kickstand angle range of 0 degrees (e.g., position 1800) up to the position 2000, the outer cam surface 1402 does not contact the outer follower surface 1604.

However, starting with the position 2000 and continuing to further open positions such as those discussed below, contact between the cam 1104 and the cam follower 1106 transitions to the outer cam surface 1402 and the outer follower surface 1604. In these further open positions, for example, the inner cam surface 1400 is positioned away from and does not contact the inner follower surface 1602. Thus, as detailed herein, responsiveness of the hinge 1100 between at least some positions changes based on surface profiles of the different cam and cam follower surfaces, and also based on which surfaces are engaged at a particular position.

While the discussion herein is presented with reference to a particular outer follower surface 1604 and a particular outer cam surface 1402, it is to be appreciated that according to various implementations, similar features and interactions apply to the other outer follower surface and outer cam surface.

Figure 22:
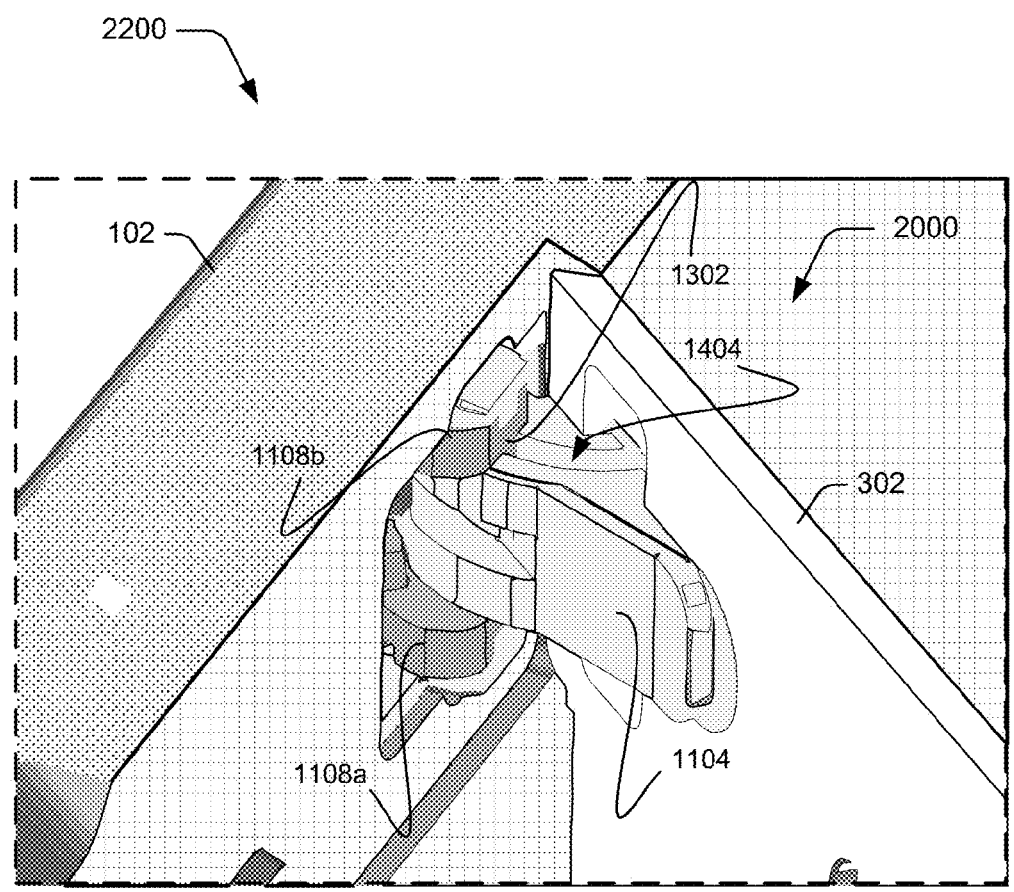
FIG. 22 illustrates a partial rear view of a computing device with a support component in a first preset open position in accordance with one or more embodiments.

FIG. 22 illustrates a partial rear view 2200 of the computing device 102 with the kickstand 302 in the position 2000. The rear view 2200 illustrates that in at least some implementations, the support plates 1108a, 1108b remain recessed within the hinge frame 1102 and the cam 1104 rotates out of the hinge frame 1102 when the kickstand is moved to the position 2000. This is not intended to be limiting, however, and the support plates 1108 may move in response to movement of the cam 1104, e.g., due to contact between the cam guide 1302 and the cam channel 1404.

Figure 23:
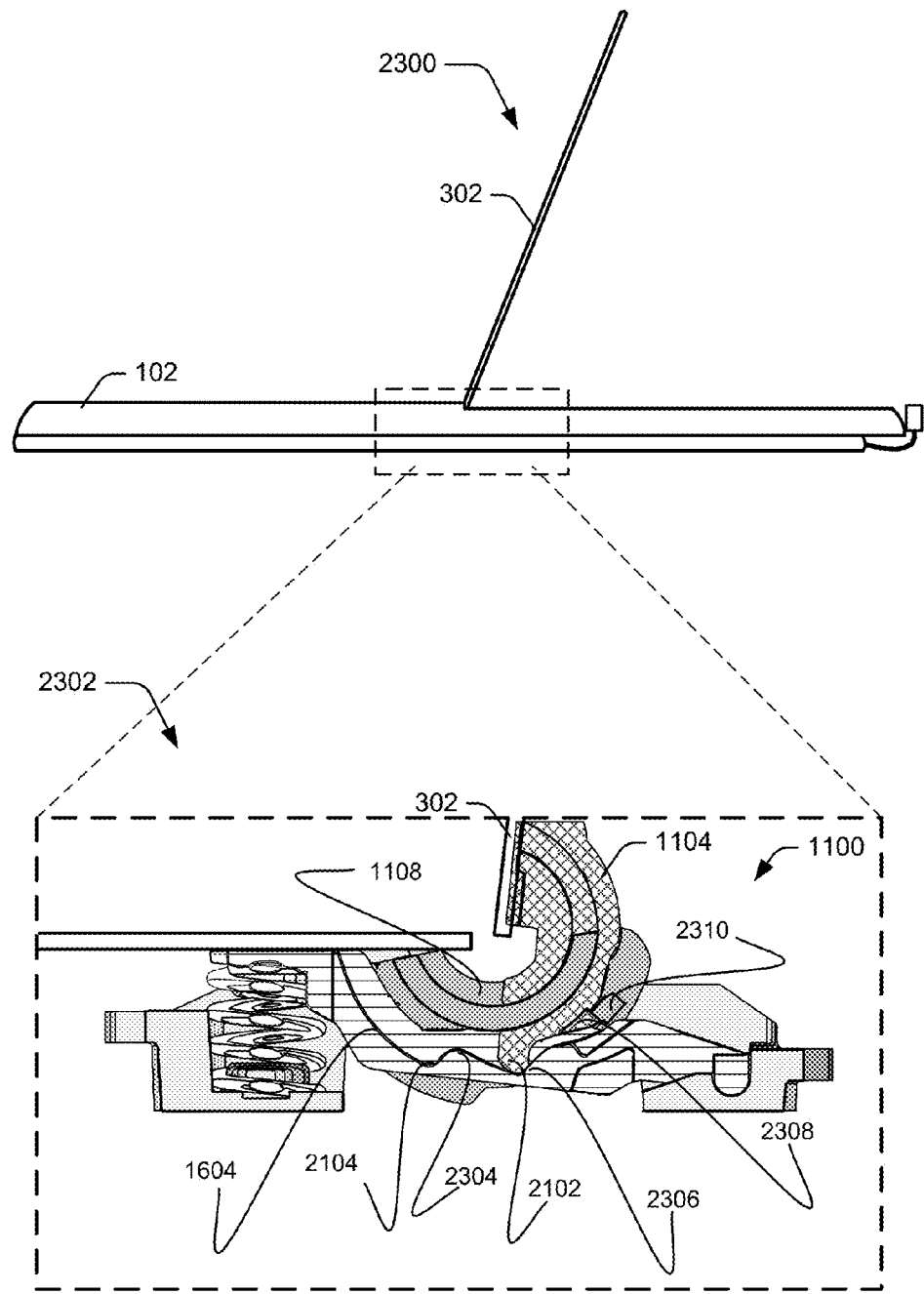
FIG. 23 illustrates a computing device with a support component in a second preset open position in accordance with one or more embodiments.

FIG. 23 illustrates the kickstand 302 in a position 2300. In at least some embodiments, the position 2300 corresponds to a second preset open position for the kickstand 302, such as the position 600 illustrated with reference to FIG. 6. The kickstand 302 is placed in the position 2300, for instance, responsive to a user further opening the kickstand 302 past the position 2000 introduced above. Further illustrated is a partial side section view 2302 of the computing device 102, including the kickstand 302 attached to the cam 1104 of the hinge 1100 in a first open position. The section view 2302, for instance, corresponds to the cross-section 1702 illustrated above.

According to various implementations, movement of the kickstand 302 from the position 2000 to the position 2300 is initially resisted by pressure from the first follower catch 2104 against the first cam catch 2102. However, when movement of the first cam catch 2102 proceeds past an outer follower point 2304, pressure from the outer follower surface 1604 against the first cam catch 2102 drives the cam 1104 to the position 2300. In the position 2300, the first cam catch 2102 engages with a second follower catch 2306.

For instance, if a user begins opening the kickstand 302 further past the position 2000 but releases the kickstand 302 before the first cam catch 2102 proceeds past the outer follower point 2304, the cam 1104 and thus the kickstand 302 will snap back into the position 2000. However, when movement of the kickstand 302 proceeds past the position 2000 such that the first cam catch 2102 proceeds past the outer follower point 2304, the cam 1104 and thus the kickstand 302 will snap into the position 2300. For example, consider that a user releases the kickstand 302 when the first cam catch is between the outer follower point 2304 and the second follower catch 2306. In such a case, the sloped profile of the outer follower surface 1604 is such that pressure from outer cam follower 1604 (provided by the hinge spring 1110) drives the cam 1104 and thus the kickstand 302 into the position 2300 independent of an externally applied (e.g., user-applied) force.

According to various implementations, engagement of the first cam catch 2102 with the second follower catch 2306 enables the kickstand 302 to persist in the position 2300. For instance, spring pressure from the hinge spring 1110 holds the second follower catch 2306 against the first cam catch 2101 and thus prevents the cam 1104 and thus the kickstand 302 from disengaging from the position 2300 unless sufficient external force is applied. Thus, absent force directly and/or indirectly applied to the kickstand 302, the first cam catch 2102 will not disengage from the second follower catch 2306.

For example, the hinge 1100 is constructed such that unless a specified threshold force is applied to the kickstand 302, the hinge 1100 will not disengage from the position 2300. In at least some implementations, exceeding a threshold closing force against the kickstand 302 causes the kickstand 302 to transition back to the position 2000, and exceeding a threshold opening force against the kickstand 302 opens the kickstand 302 further past the position 2300.

Notice that in the position 2300, a second cam catch 2308 engages with a cam stop 2310 of the support plate 1108. As further detailed below, engagement of the second cam catch 2308 with the cam stop 2310 enables movement of the support plate 1108 to support further open positions for the kickstand 302.

Figure 24:
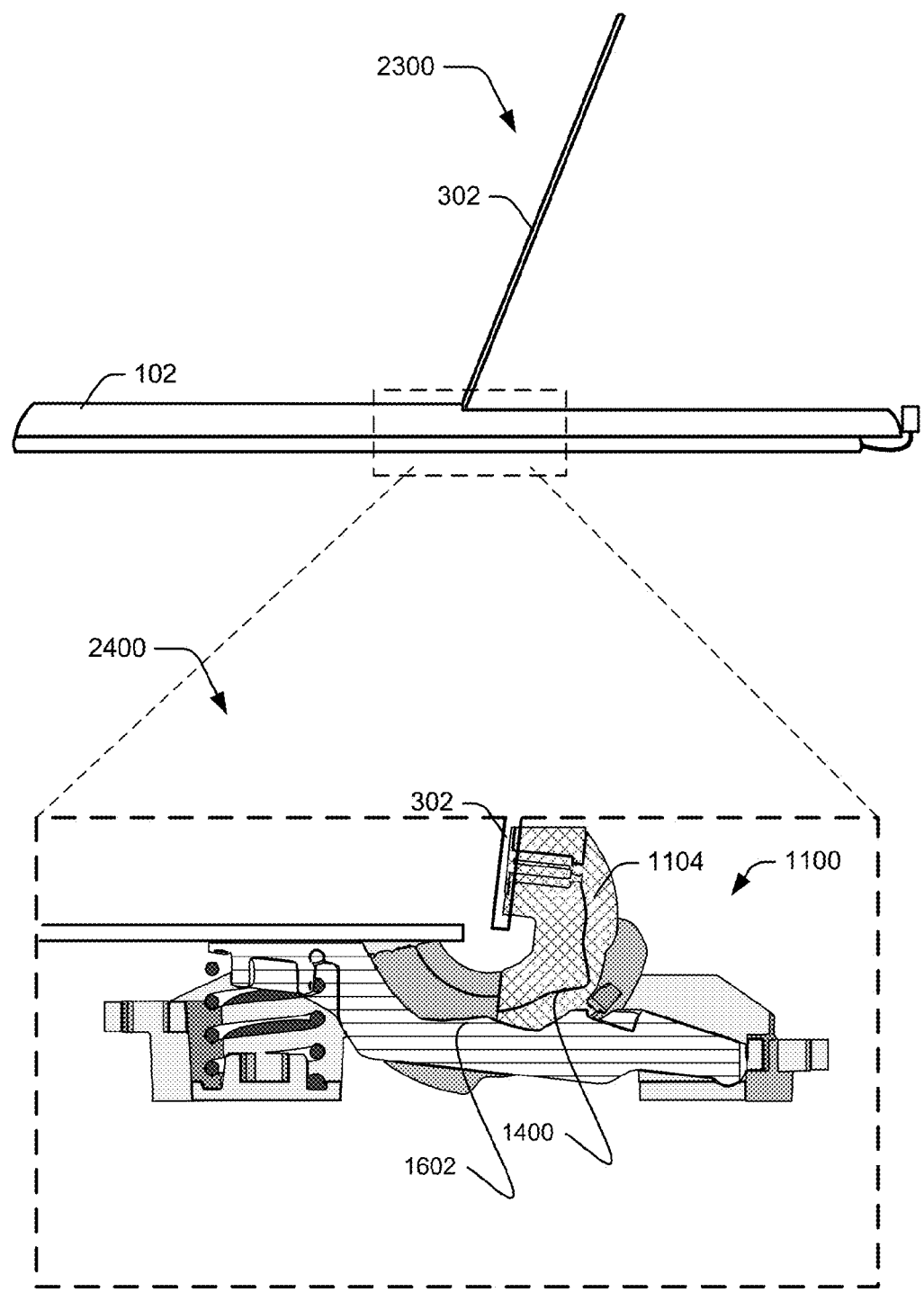
FIG. 24 illustrates a computing device with a support component in a second preset open position in accordance with one or more embodiments.

FIG. 24 illustrates the kickstand 302 in the position 2300, introduced above. Further illustrated is a partial side section view 2400 of the computing device 102, including the kickstand 302 attached to the cam 1104 of the hinge 1100 in a second open position. The section view 2400, for instance, corresponds to the cross-section 1704 illustrated in FIG. 17.

The section view 2400 illustrates that when the kickstand 302 is in the position 2300, the inner cam surface 1400 is not in contact with the inner follower surface 1602. As mentioned above, contact between the cam 1104 and the cam follower 1106 in open positions after the open position 2000 occurs between the outer cam surface 1402 and the outer follower surfaces 1604 (illustrated in other FIGS.), and not between the inner cam surface 1400 and the inner follower surface 1602.

Figure 25:
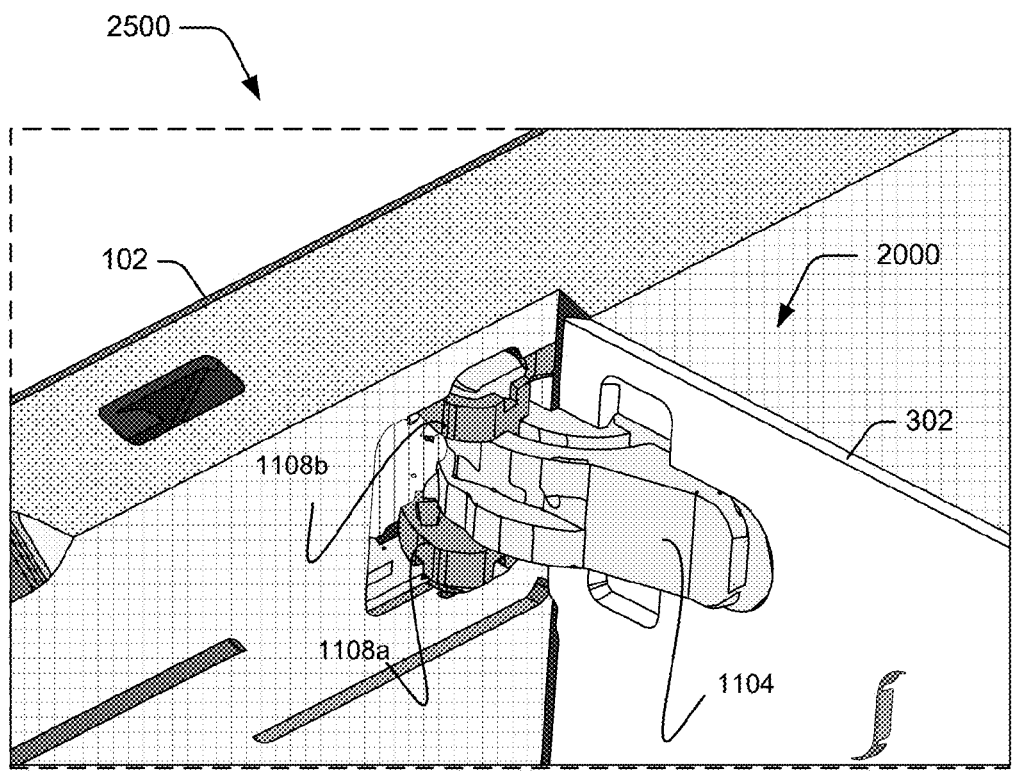
FIG. 25 illustrates a partial rear view of a computing device with a support component in a second preset open position in accordance with one or more embodiments.

FIG. 25 illustrates a partial rear view 2500 of the computing device 102 with the kickstand 302 in the position 2300. Further illustrated are the cam 1104 and the support plates 1108a, 1108b.

Figure 26:
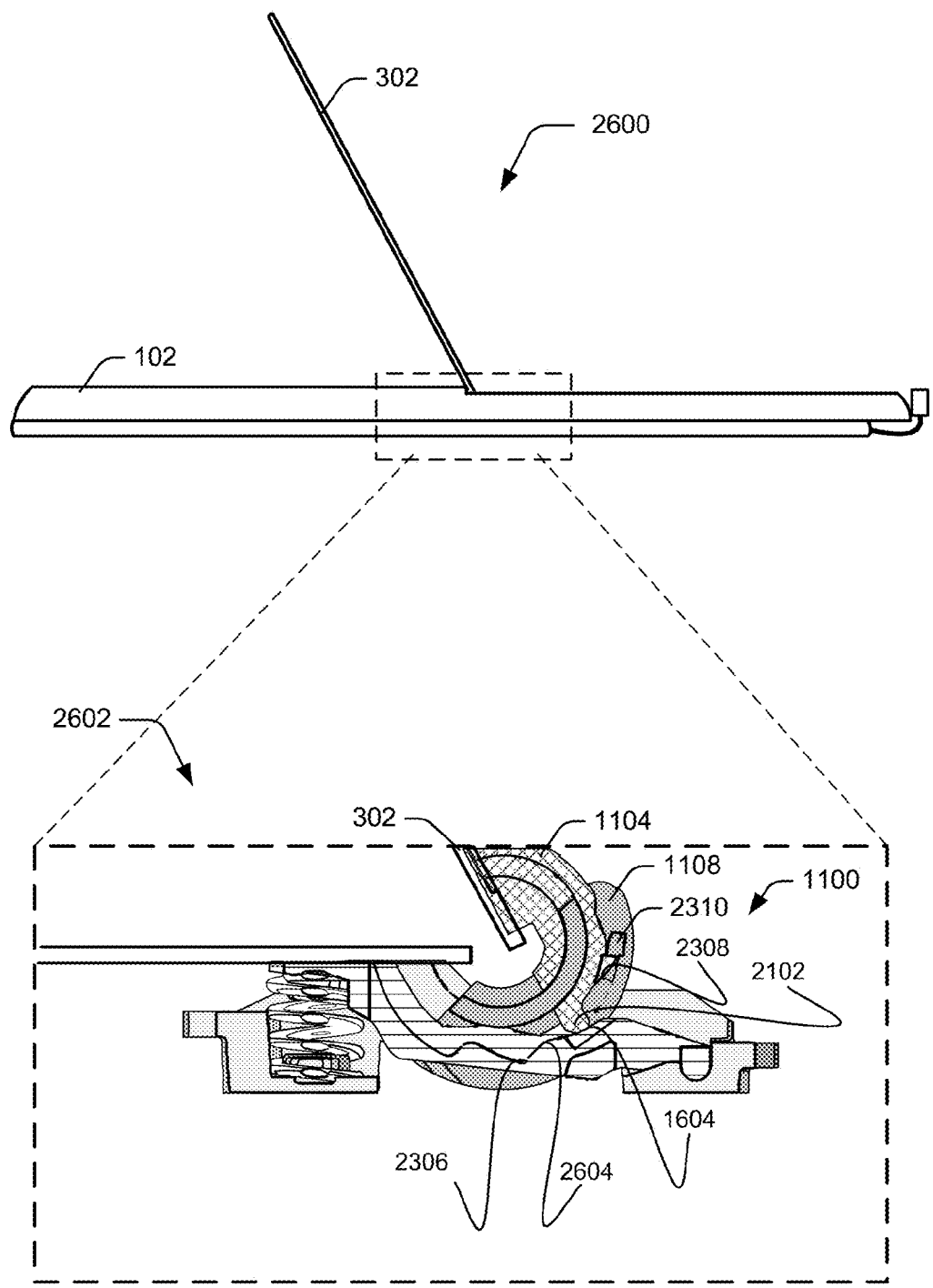
FIG. 26 illustrates a computing device with a support component in a third preset open position in accordance with one or more embodiments.

FIG. 26 illustrates the kickstand 302 in a position 2600. In at least some embodiments, the position 2600 corresponds to a third preset open position for the kickstand 302, such as the position 800 illustrated with reference to FIG. 8. The kickstand 302 is placed in the position 2600, for instance, responsive to a user further opening the kickstand 302 past the position 2300 introduced above. Further illustrated is a partial side section view 2602 of the computing device 102, including the kickstand 302 attached to the cam 1104 of the hinge 1100 in a third open position. The section view 2602, for instance, corresponds to the cross-section 1702 illustrated in FIG. 17.

According to various implementations, movement of the kickstand 302 from the position 2300 to the position 2600 is initially resisted by pressure from the second follower catch 2306 against the first cam catch 2102. However, when movement of the first cam catch 2102 proceeds past an outer follower point 2604, pressure from the outer follower surface 1604 against the first cam catch 2102 drives the cam 1104 to the position 2600. In the position 2600, the first cam catch 2102 engages with the outer follower surface 1604.

For instance, if a user begins opening the kickstand 302 further past the position 2300 but releases the kickstand 302 before the first cam catch 2102 proceeds past the outer follower point 2604, the cam 1104 and thus the kickstand 302 will snap back into the position 2300. However, when movement of the kickstand 302 proceeds past the position 2300 such that the first cam catch 2102 proceeds past the outer follower point 2604, the cam 1104 and thus the kickstand 302 will snap into the position 2600. For example, consider that a user releases the kickstand 302 when the first cam catch 2102 is past outer follower point 2604. In such a case, the sloped profile of the outer follower surface 1604 is such that pressure from outer follower surface 1604 (provided by the hinge spring 1110) against the first cam catch 2102 drives the cam 1104 and thus the kickstand 302 into the position 2600 independent of an externally applied (e.g., user-applied) force.

For example, the hinge 1100 is constructed such that unless a specified threshold force is applied to the kickstand 302, the hinge 1100 will not disengage from the position 2600.

Further illustrated is that in moving from the position 2300 to the position 2600, engagement of the second cam catch 2308 with the cam stop 2310 causes the support plate 1108 to rotate with the cam 1104. Generally, movement of the support plates 1108 enables the hinge 1100 to provide stability to the kickstand 302 when open to various open positions.

Figure 27:
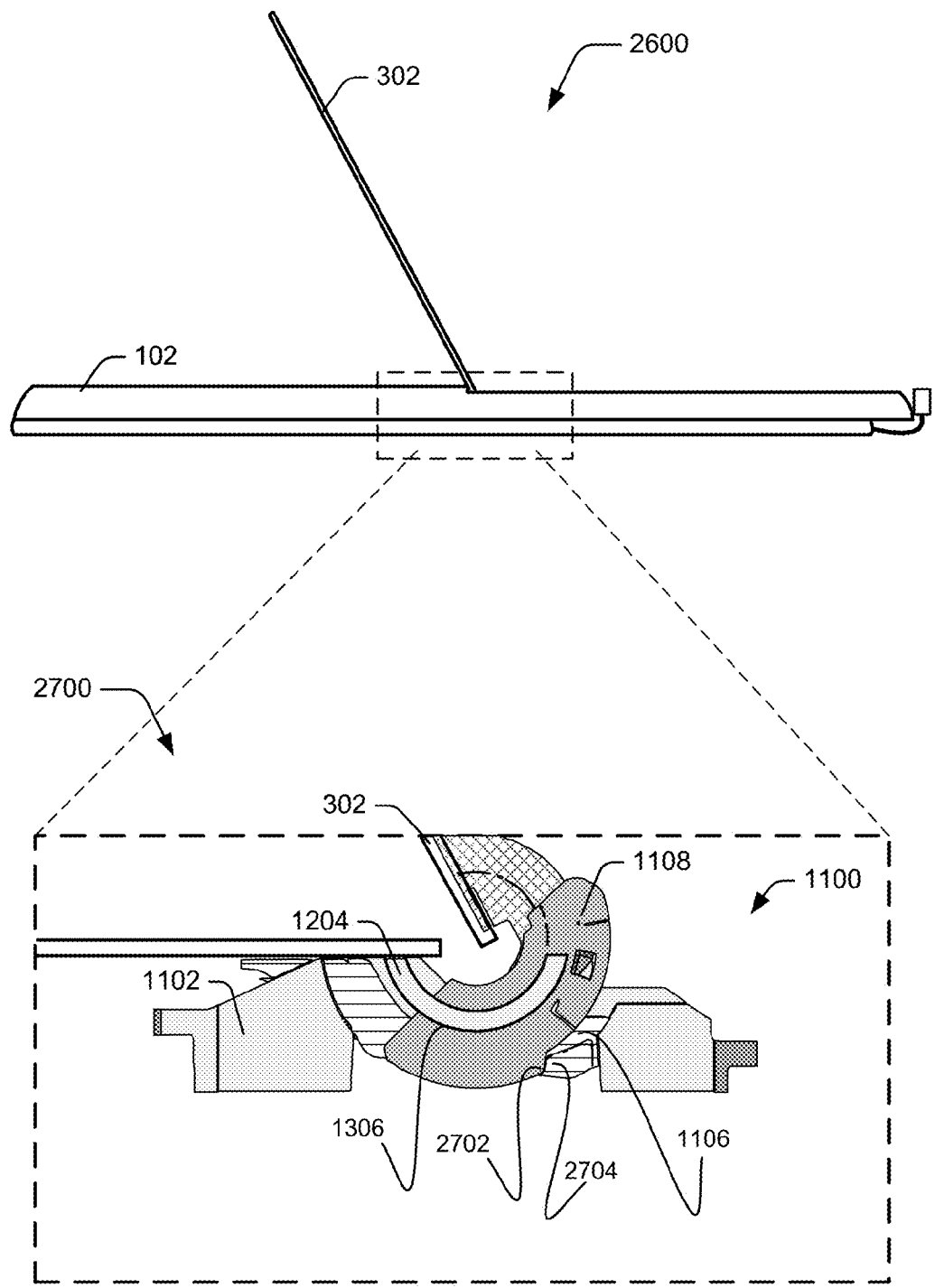
FIG. 27 illustrates a computing device with a support component in a third preset open position in accordance with one or more embodiments.

FIG. 27 illustrates the kickstand 302 in the position 2600 introduced above. Further illustrated is a partial side section view 2700 of the computing device 102, including the kickstand 302 attached to the cam 1104 of the hinge 1100 in a third open position. The section view 2700, for instance, corresponds to the cross-section 1700 illustrated in FIG. 17.

As illustrated here, in the position 2600 the support plate 1108 partially protrudes from the hinge frame 1102. Movement of the support plate 1108 to the position 2600, for instance, is based on the interface between the plate guide 1204 of the hinge frame 1102 and the support channel 1306 of the support plate 1108. Further, a plate catch 2702 of the support plate 1108 engages with a follower contact 2704 of the cam follower 1106. According to various implementations, engagement of the plate catch 2702 with the follower contact 2704 prevents the support plate 1108 from rotating toward a further open position unless sufficient force is applied to the kickstand 302.

For instance, engagement of the plate catch 2702 with the follower contact 2704 enables the kickstand 302 to persist in the position 2600. Spring pressure from the hinge spring 1110, for example, holds outer follower surface 1604 against the first cam catch 2102 and thus prevents the cam 1104 and thus the kickstand 302 from disengaging from the position 2600 unless sufficient external force is applied. Thus, absent force directly and/or indirectly applied to the kickstand 302, the plate catch 2702 will not disengage from the follower contact 2704. For example, the hinge 1100 is constructed such that unless a specified threshold force is applied to the kickstand 302, the hinge 1100 will not disengage from the position 2600.

The position 2600, for instance, is considered a maximum open position for the kickstand 302 under normal operating conditions. A further illustrated below, movement of the hinge 1100 past the position 2600 is possible but is considered to be an emergency escape option that prevents damage to the kickstand 302 when excessive force is applied to the kickstand.

Figure 28:
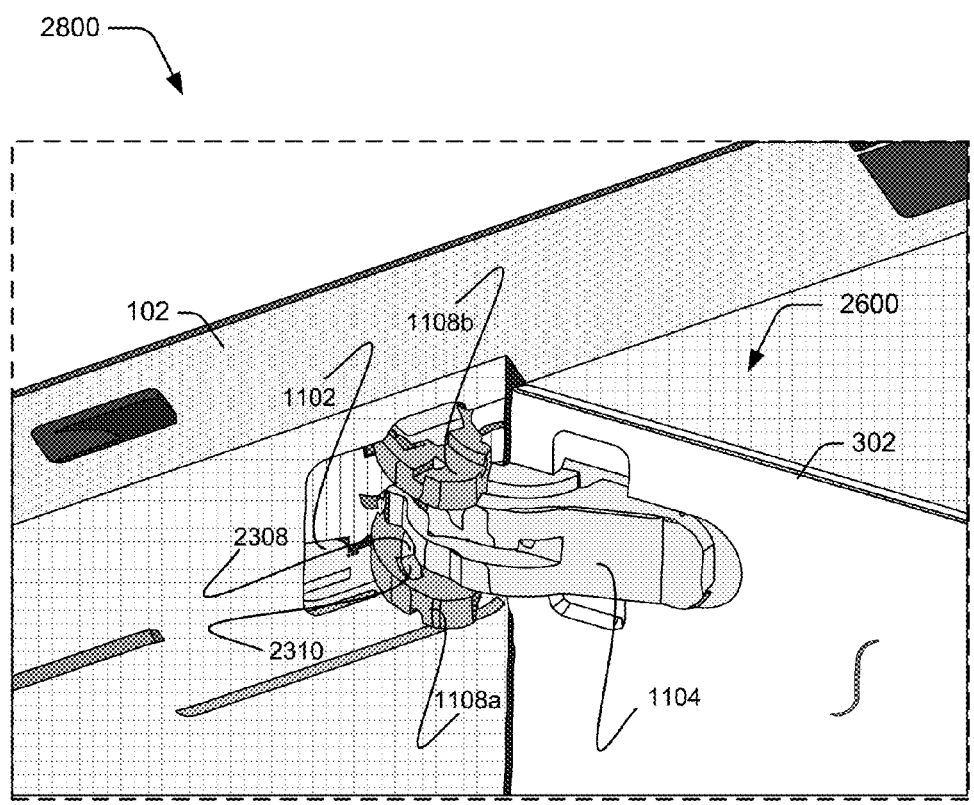
FIG. 28 illustrates a partial rear view of a computing device with a support component in a third preset open position in accordance with one or more embodiments.

FIG. 28 illustrates a partial rear view 2800 of the computing device 102 with the kickstand 302 in the position 2600. The rear view 2800 illustrates that in the position 2600, the support plates 1108a, 1108b partially protrude from the hinge frame 1102. Further shown is the engagement between the second cam catch 2308 of the cam 1104 and cam stop 2310 of the support plate 1108a that enables movement of the support plates 1108 between various open positions.

Figure 29:
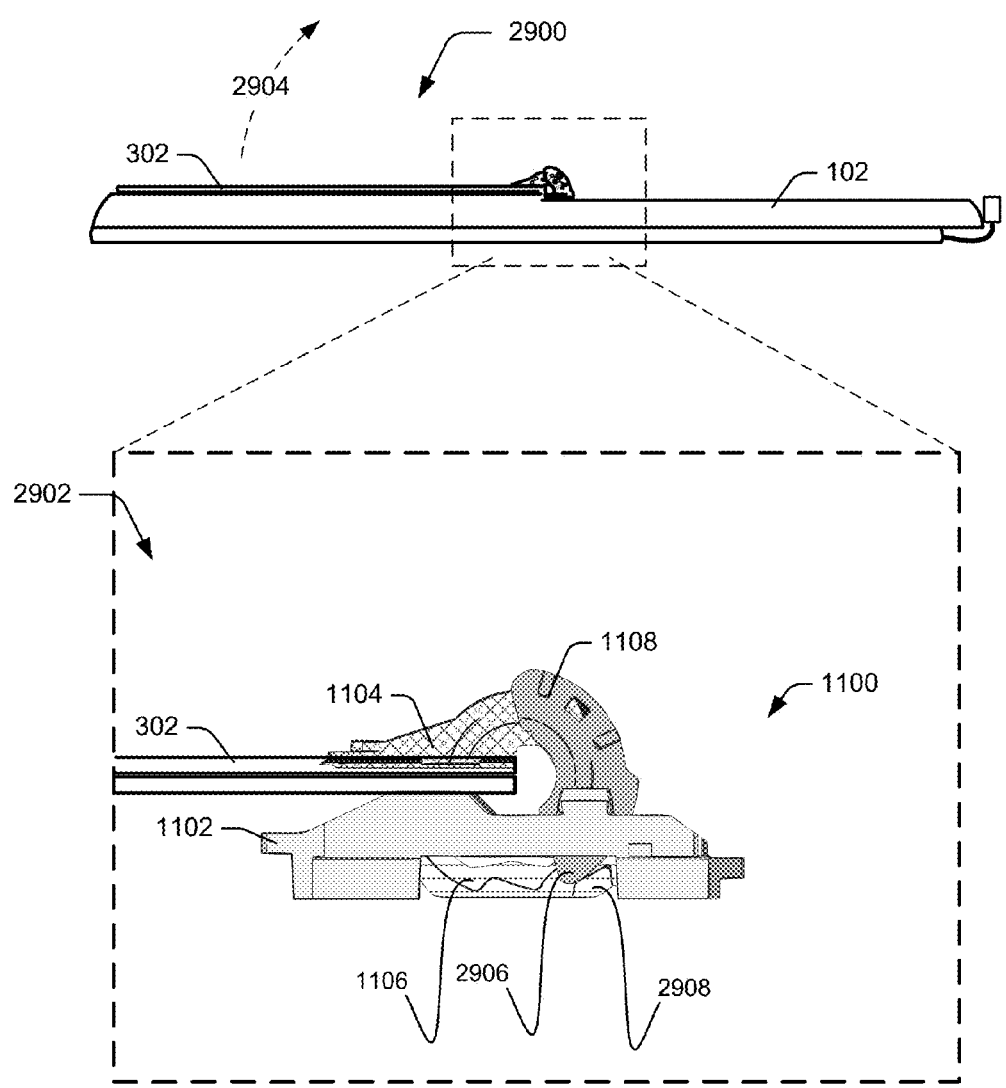
FIG. 29 illustrates a computing device with a support component in an emergency escape position in accordance with one or more embodiments.

FIG. 29 illustrates the kickstand 302 in a position 2900. The position 2900, for instance, represents a 180 degree rotation of the kickstand 302 from a fully closed position, e.g., from the position 1800 discussed above. In at least some embodiments, the position 2900 corresponds to an emergency escape position that is provided to prevent damage to the kickstand 302 and/or other components. For instance, rotation of the kickstand 302 to a further open position past the position 2600 discussed above (e.g., a third preset open position) is not considered to be a normal operating condition. However, such rotation may occur, such as inadvertently in response to various events.

For example, consider that the computing device 102 is resting on a table or other surface with the kickstand in the position 2600. A user may accidentally place an object such as a book on the computing device 102, which exerts sufficient force on the kickstand 302 such that the kickstand 302 disengages from the position 2600 and rotates to the position 2900. As further detailed below, the force required to cause the kickstand 302 to rotate from the position 2600 to the position 2900 is significantly greater than the force required to transition between other open positions discussed above.

Further illustrated in FIG. 29 is a side view 2902 of the hinge 1100 in the position 2900, including the hinge frame 1102, the cam 1104, the cam follower 1106, and the support plate 1108. In the position 2900, the cam 1104 disengages from the cam follower 1106 and the support plate 1108 remains engaged with the cam follower 1106 to enable the hinge 1100 to function as an integrated and interconnected mechanism even in an emergency escape scenario. As further discussed below, this enables a user to return the kickstand 302 to a functioning position (e.g., one of the preset open positions discussed above) with minimal effort. For instance, a user may apply force to the kickstand 302 in a direction 2904 to return the kickstand 302 to one or more of the positions discussed above.

When the hinge 1100 is in the position 2900, the support plate 1108 compresses the cam follower 1108. For instance, a plate point 2906 of the support plate 1108 engages with a follower point 2908 of the cam follower 1106 and applies pressure to the cam follower 1106. According to various implementations, compressing the cam follower 1106 prevents the cam follower 1106 from engaging with the cam 1104 until the kickstand 302 is reset to a normal operating position.

Figure 30:
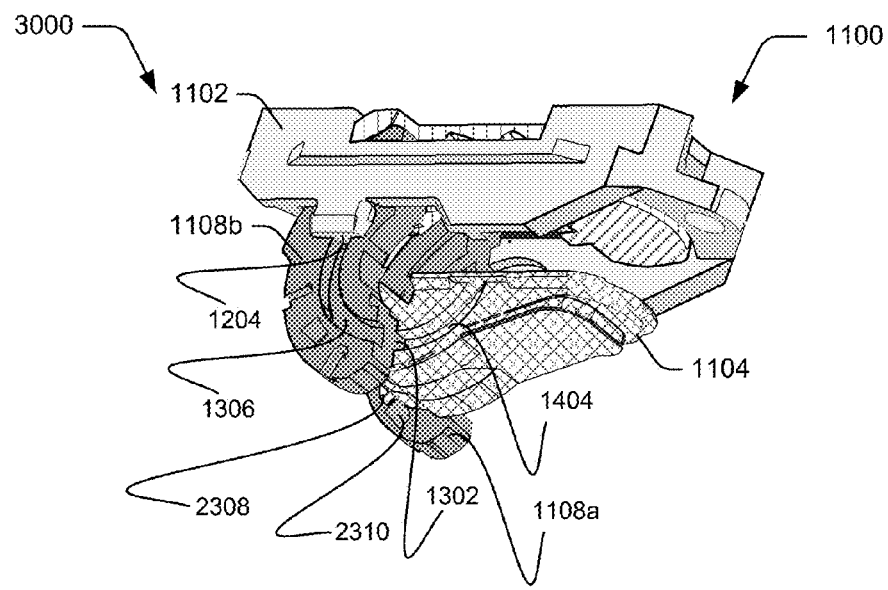
FIG. 30 illustrates a side view of a hinge mechanism in an emergency escape position in accordance with one or more embodiments.

FIG. 30 illustrates a side view 3000 of the hinge 1100 in the position 2900, introduced above. The side view 3000 illustrates that in the position 2900, the cam 1104 is engaged with the support plates 1108a, 1108b via engagement of the cam channel 1404 with the cam guide 1302. Further, the support plates 1108a, 1108b are engaged with the hinge frame 1102 via engagement of the support channel 1306 with the plate guide 1204. This engagement of the cam 1104 with the support plates 1108, and the support plates 1108 with the hinge frame 1102, enables components of the hinge 1100 to remain interconnected in the position 2900. Thus, even with the cam 1104 completely removed from the hinge frame 1102, the kickstand 302 remains connected to the computing device 102 and can be returned to normal operating positions, such as those discussed above.

The side view 3000 further illustrates engagement of the second cam catch 2308 with the cam stop 2310, which as discussed above, pulls the support plates 1108 out of the hinge frame 1102 to various open positions in response to user manipulation of the kickstand 302.

Figure 31:
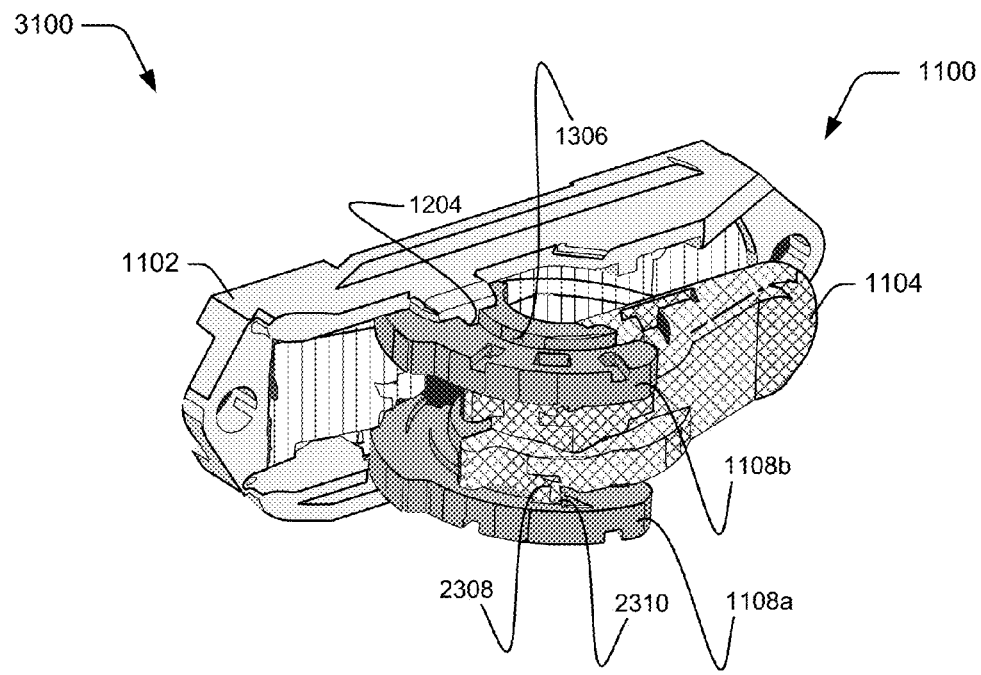
FIG. 31 illustrates a bottom view of a hinge mechanism in an emergency escape position in accordance with one or more embodiments.

FIG. 31 illustrates a bottom view 3100 of the hinge 1100 in the position 2900. The view 3100 illustrates engagement of the support plate 1108b with the hinge frame 1102 via engagement of the support channel 1306 with the plate guide 1204. Further illustrated is engagement of the second cam catch 2308 of the cam 1104 with the cam stop 2310 of the support plate 1108a.

Figure 32:
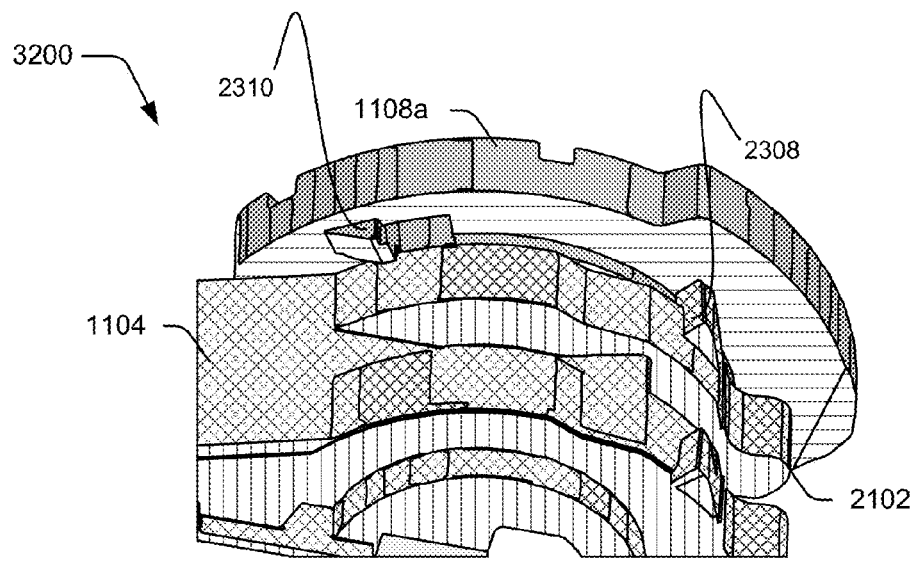
FIG. 32 illustrates a partial view of a cam relative to a support plate in accordance with one or more embodiments.

FIG. 32 illustrates a partial view 3200 of the cam 1104 relative to the support plate 1108a. The view 3200, for instance, represents a position of the cam 1104 relative to the support plate 1108a when the hinge 1100 is in a closed position, e.g., the position 1800 discussed above. Included in the view 3200 are the first cam catch 2102, the second cam catch 2308, and the cam stop 2310.

Figure 33:
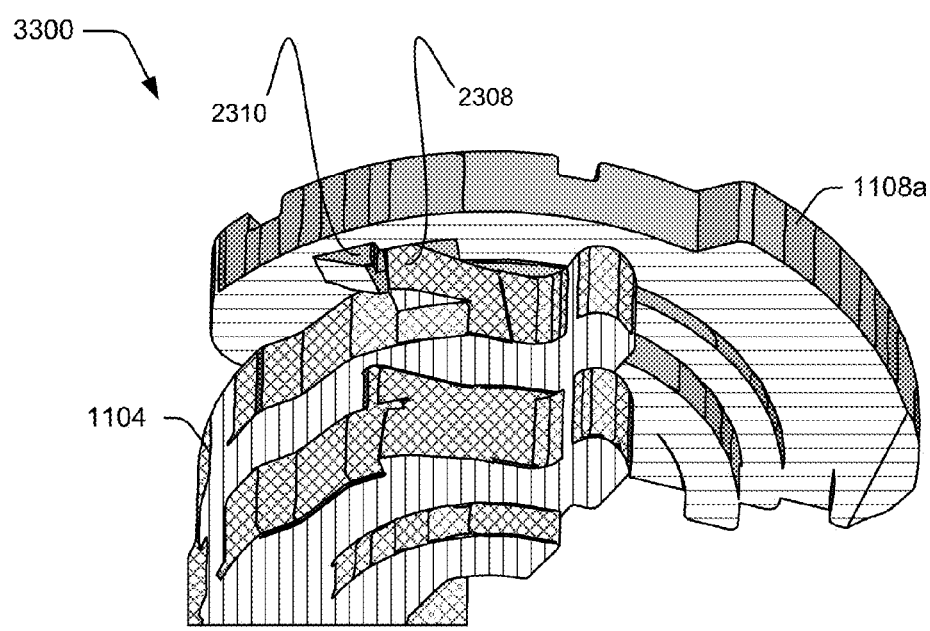
FIG. 33 illustrates a partial view of a cam relative to a support plate in accordance with one or more embodiments.

FIG. 33 illustrates a partial view 3300 of the cam 1104 relative to the support plate 1108a. The view 3300, for instance, represents a position of the cam 1104 relative to the support plate 1108a when the hinge 1100 is in an open position, e.g., the position 2600 discussed above and/or others of the open positions. Further illustrated is engagement between the second cam catch 2308 and the cam stop 2310 of the support plate 1108, which enables movement of the support plates 1108 in response to movement of the cam 1104.

In at least some implementations, the contact surface of the cam stop 2310 that engages with the second cam catch 2308 is angled inward toward the second cam catch 2308, e.g., is not normal to the surface of the support plate 1108. Further, the opposing contact surface of the second cam catch 2308 is angled to provide a flat contact face between the cam stop 2310 and the second cam catch 2308. According to various implementations, this inward angling of the cam stop 2310 causes the second cam catch 2308 to pull the support plate 1108 inward and thus provide for stability of the interconnected components of the hinge 1100.

Having discussed some example kickstand and hinge positions and components, consider now a discussion of an example responsiveness profile associated with movement between the different positions.

Hinge Response Profile

Considering the different positions of the hinge 1100 and the kickstand 302 discussed above, the response profile experienced during movement of the kickstand 302 between the different positions is influenced by various factors. For instance, pressure from the hinge spring 1110 against the cam follower 1106 and thus the cam 1104 provides pressure against the various components. Depending on which position the components are in, the pressure either resists or encourages movement of the components of the hinge 1100.

Further, interaction between the different surfaces of the cam 1104 and the cam follower 1106 contributes to a responsiveness profile of the hinge 1100 and the kickstand 302. For instance, when the kickstand 302 moves from the closed position 1800 to the first open position 2000, responsiveness of the hinge 1100 is determined by contact between the inner cam surface 1400 and the inner follower surface 1602. When the kickstand moves past the first open position 2000 to the positions 2300, 2600, responsiveness of the hinge 1100 is determined by contact between the outer cam surfaces 1402a, 1402b and the outer follower surfaces 1604b, 1604a, respectively. Thus, a transition between guiding surfaces occurs at the first open position 2000.

According to various implementations, opening of the hinge 1100 after the third open position 2600 is based on interaction between the support plates 1108 and the cam follower 1106. For instance, torque required to move the hinge 1100 to the position 2900 (e.g., the emergency escape position) is based on interaction between the support plates 1108 and the cam follower 1106.

In at least some embodiments, responsiveness of the hinge 1100 can be characterized via a torque profile that indicates various forces that occur during movement of the kickstand 302 between various positions. For instance, interaction between the different cam surfaces and the different cam follower surfaces provides a detent mechanism that results in a tactile response profile for movement of the kickstand 302 between different preset positions. Consider, for example, the following example torque profiles.

Figure 34:
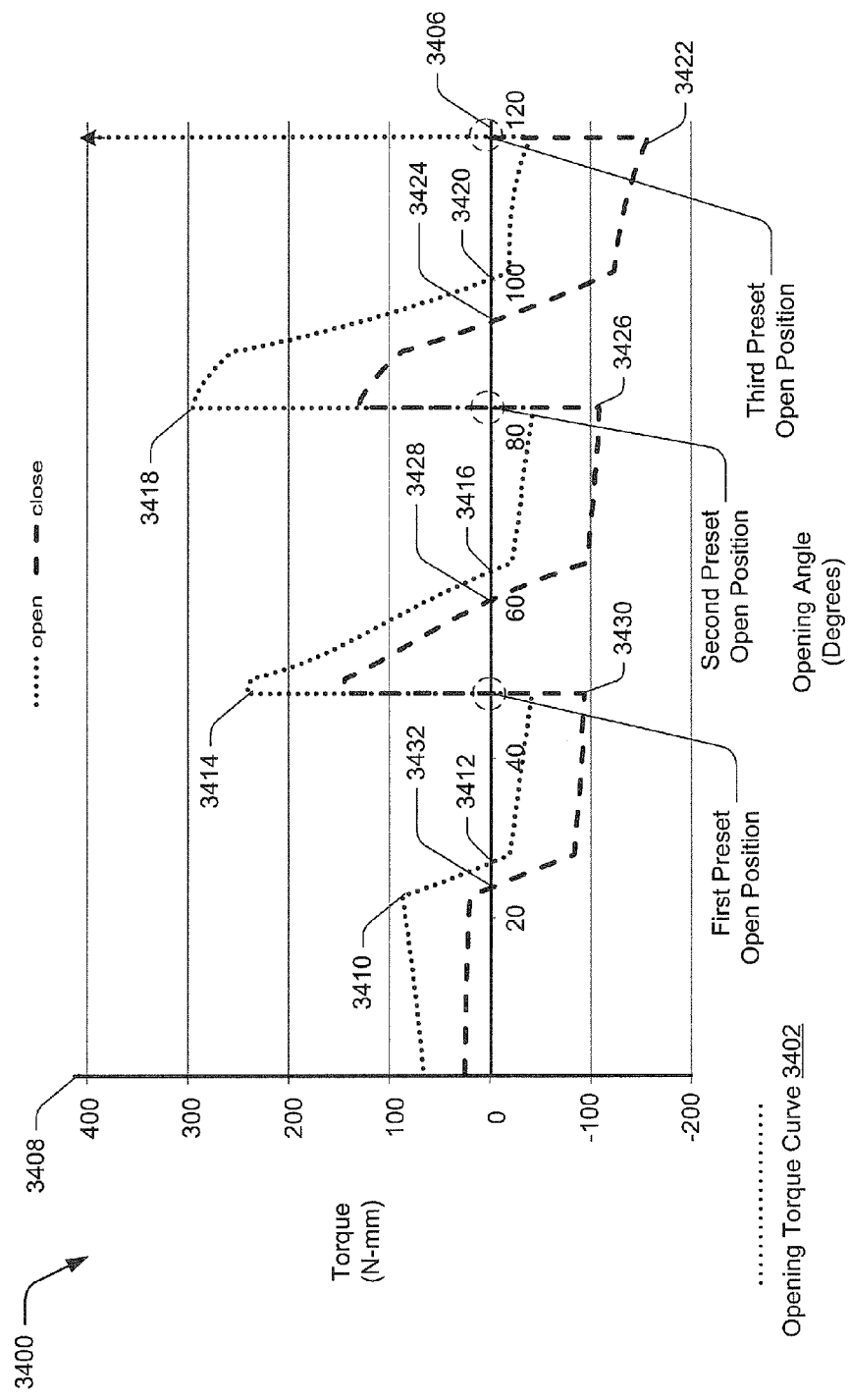
FIG. 34 illustrates a torque graph for a hinge mechanism in accordance with one or more embodiments.

FIG. 34 illustrates a torque graph 3400 that includes an opening torque curve 3402 and a closing torque curve 3404. The torque graph 3400 further includes an angle axis 3406 and a torque axis 3408. The angle axis 3406 (e.g., the x-axis) indicates opening angle values for the kickstand 302 relative to an associated apparatus, e.g., the computing device 102. The torque axis 3408 (e.g., the y-axis) indicates different torque values for the torque graph 3400. In this particular example, the torque values are indicated in Newton-millimeters (N-mm). This is not to be interpreted as limiting, however, and torque values may be measured in a variety of different units. Further, different forces may be measured to characterize the movement of the hinge 1100 and/or the kickstand 302.

According to one or more implementations, the opening torque curve 3402 represents torque transferred from the kickstand 302 to the cam 1104 when the kickstand is opened (e.g., via user manipulation) from a closed position to various open positions. The closing torque curve 3404 represents torque transferred from the kickstand 302 to the cam 1104 when the kickstand is moved (e.g., via user manipulation) from various open positions towards a closed position.

As further detailed below, the different torque curves are associated with certain "action points" or "action regions" that demonstrate the overall responsiveness profile of the hinge mechanisms discussed herein. The opening torque curve 3402, for instance, includes a first opening peak 3410, a first opening threshold 3412, a second opening peak 3414, a second opening threshold 3416, a third opening peak 3418, and a third opening threshold 3420. The closing torque curve 3404 includes, for example, a first closing peak 3422, a first closing threshold 3424, a second closing peak 3426, a second closing threshold 3428, a third closing peak 3430, and a third closing threshold 3432. Example attributes of these different points/regions are now discussed.

As an example implementation, consider that the kickstand 302 is in a closed position, e.g., 0 degrees on the torque graph 3400. A user manipulates the kickstand 302 from the closed position towards an open position. Following the opening torque curve 3402, torque against opening of the kickstand 302 gradually increases until the opening torque curve 3402 reaches the first opening peak 3410 at an open position of about 23 degrees. After the first opening peak 3410, torque values rapidly decrease until the opening torque curve 3402 intersects the angle axis 3406 at the first opening threshold 3412. In this particular example, the first opening threshold 3412 represents an open position of approximately 27 degrees.

According to one or more embodiments, if the kickstand 302 is released prior to reaching the third closing threshold 3432 (e.g., at less than 23 degrees open), the kickstand will snap back to closed, e.g., 0 degrees. Further, if the kickstand 302 is released after the first opening threshold 3412, the kickstand 302 will snap to a first preset open position, e.g., at 48 degrees. Thus, the first opening threshold 3412 represents a threshold open position for the kickstand 302 that when exceeded, allows the kickstand 302 to snap into a first preset open position. The first preset open position, for instance, corresponds to the position 2000 discussed above.

If the third closing threshold 3432 is not exceeded and the kickstand 302 is released, the kickstand will snap back into a closed position. For instance, if a user releases the kickstand at an open angle less than the third closing threshold 3432, torque active on the cam 1104 is characterized by the closing torque curve 3404.

Consider now that a user further manipulates the kickstand from the first open position (e.g., at 48 degrees) towards a further open position. Continuing from 48 degrees on the opening torque curve 2202, it can be seen that torque values rapidly increase to the second opening peak 3414. In at least some embodiments, this increase in torque represents a threshold torque required to move the kickstand from a first preset open position (e.g., the position 2000) to a second preset open position, e.g., the position 2300. For instance, the second opening peak 3414 represents the torque required to disengage the first cam catch 2102 from the first follower catch 2104, as illustrated above with reference to FIGS. 21 and 23. In this particular example, the threshold torque represented by the second opening peak 2214 is approximately 230 N-mm.

If a user manipulates the kickstand 302 past the second opening peak 3414, it can be seen that the torque values of the opening torque curve 3402 rapidly decrease until the opening torque curve 3402 intersects the angle axis 3406 at the second opening threshold 3416. In this particular example, the second opening threshold 3416 represents an open position of approximately 65 degrees. According to one or more embodiments, if the kickstand 302 is released prior to reaching the second closing threshold 3428 (e.g., between the first preset open position and the second closing threshold 3428), the kickstand will snap back to the first preset open position. If the kickstand 302 is released after the second opening threshold 3416, the kickstand 302 will snap to a second preset open position, e.g., at 84 degrees. Thus, the second opening threshold 3416 represents a threshold open position that when exceeded, allows the kickstand 302 to snap into the second preset open position. In at least some embodiments, the second preset open position represents the position 2300 discussed above.

Consider now that a user further manipulates the kickstand from the second open position (e.g., at 84 degrees) towards a further open position. Continuing from 84 degrees on the opening torque curve 3402, it can be seen that torque values rapidly increase to a third opening peak 3418. In at least some embodiments, this increase in torque represents a threshold torque required to move the kickstand from a second preset open position (e.g., the position 2300) to a third preset open position, e.g., the position 2600. For instance, the third opening peak 3418 represents the torque required to disengage the first cam catch 2102 from the second follower catch 2306, as illustrated above with reference to FIGS. 23 and 26. In this particular example, the threshold torque represented by the third opening peak 3418 is approximately 300 N-mm.

If a user manipulates the kickstand 302 past the third opening peak 3418, it can be seen that the torque values of the opening torque curve 3402 rapidly decrease until the opening torque curve 3402 intersects the angle axis 3406 at the third opening threshold 3420. In this particular example, the third opening threshold 3420 represents an open position of approximately 100 degrees. According to one or more implementations, if the kickstand 302 is released prior to reaching the first closing threshold 3424 (e.g., between the second preset open position and the first closing threshold 3424), the kickstand will snap back into the second preset open position. If the kickstand 302 is released after the third opening threshold 3420, the kickstand 302 will snap to a third preset open position, e.g., at 118 degrees. Thus, the third opening threshold 3420 represents a threshold open position that when exceeded, allows the kickstand 302 to snap into the third preset open position. In at least some embodiments, the third preset open position represents the position 2600 discussed above.

Continuing past the third preset open position at 118 degrees, it can be seen that the torque values rapidly increase past the previous opening torque values. In at least some embodiments, this indicates that the kickstand 302 is not intended to be opened past the third preset open position (e.g., 118 degrees) under normal operating scenarios. For instance, opening the kickstand past the third preset open position is based on an emergency release scenario, such as discussed above with reference to FIGS. 29-31.

When closing the kickstand 302 from the open position 2600 and/or other open position, torque acting on the cam 1104 is characterized by the closing torque curve 3404. Generally, the interpretation of the closing torque curve 3404 is opposite that of the opening torque curve 3402 since the direction of motion (e.g., closing vs. opening) is reversed. In at least some embodiments, for example, negative torque values on the closing torque curve 3404 represent closing torque applied by the user, and positive torque values on the closing torque curve 3404 represent the tendency of the kickstand to snap into a position (e.g., an open position or closed) absent resistance and/or force applied from a user.

For instance, consider that a user manipulates the kickstand 302 from the third preset open position of 118 degrees towards a closed position. Traversing the closing torque curve 3404 from the third preset open position, it can be seen that the torque forces that occur when closing the kickstand 302 are less than those that occur when opening the kickstand 302. This difference in torque profiles between opening toque and closing torque is caused at least in part by the differing profiles of the different surfaces of the cam 1104 and the cam follower 1106.

As referenced above, the closing torque curve 3404 includes the first closing peak 3422, which represents a threshold torque force required to move the kickstand 302 from the third preset open position to the second open position. When the kickstand is closed past the first closing peak 3422, the closing torque resistance decreases until the closing torque curve 3404 intersects the angle axis 3406 at the first closing threshold 3424. In this particular example, the first closing threshold 3424 represents an open angle of approximately 95 degrees. According to one or more implementations, if a user releases the kickstand 302 between the third preset open position and prior to reaching the third opening threshold 3420, the kickstand 302 will snap back into the third preset open position. However, if the user releases the kickstand 302 after reaching the first closing threshold 3424 (e.g., at or less than about 95 degrees), the kickstand 302 will snap into the second preset open position.

The second closing peak 3426 represents a threshold torque required to move the kickstand 302 from the second present open position to the first preset open position, e.g., to transition from the position 2300 to the position 2000. When the kickstand is closed past the second closing peak 3426, the closing torque resistance decreases until the closing torque curve 3404 intersects the angle axis 3406 at the second closing threshold 3428. In this particular example, the second closing threshold 3428 represents an open angle of approximately 61 degrees.

In at least some embodiments, if a user releases the kickstand 302 between the second preset open position and prior to reaching the second opening threshold 3416, the kickstand 302 will snap back into the second preset open position. However, if the user releases the kickstand 302 after reaching or exceeding the second closing threshold 3428 (e.g., at or less than about 61 degrees), the kickstand 302 will snap into the first preset open position.

The third closing peak 3430 represents a threshold torque required to move the kickstand 302 from the first present open position to a closed position, e.g., to transition from the position 2000 to the position 1800. When the kickstand is closed past the second closing peak 3430, the closing torque resistance rapidly decreases until the closing torque curve 3404 intersects the angle axis 3406 at the third closing threshold 3432. In this particular example, the third closing threshold 3432 represents an open angle of approximately 24 degrees.

In at least some embodiments, if a user releases the kickstand 302 between the second preset open position and prior to reaching the first opening threshold 3412, the kickstand 302 will snap back into the first preset open position. However, if the user releases the kickstand 302 after reaching or exceeding the third closing threshold 3432 (e.g., at or less than about 24 degrees), the kickstand 302 will snap into the closed position, e.g., 0 degrees.

As illustrated in FIG. 34, the spaces (e.g. differences) between the opening thresholds and the closing thresholds are minimized. For instance, the difference between the first opening threshold 3412 and the third closing threshold 3432 is minimized. Further, the difference between the second opening threshold 3416 and the second closing threshold 3428 is minimized. Still further, the difference between the third opening threshold 3420 and the first closing threshold 3424 is minimized. This contributes to the "snappiness" of the kickstand when moved between different positions, and reduces the likelihood that the kickstand will stick in an unintended position, e.g., outside of one of the preset open positions.

As further illustrated by the torque graph 3400, the hinge mechanism discussed herein is designed to minimize the torque required to maintain the "snappiness" response. In at least some implementations, this minimum torque is approximately 20 N-mm. Further, the opening torque curve 3402 and the closing torque curve 3404 are trapezoidal in shape, for example, as opposed to sinusoidal curves. This illustrates the snappy transition between the different preset hinge positions.

Thus, according to various implementations, the torque curves characterize torque values that apply during movement of the kickstand 302. For instance, the opening torque curve 3402 represents the torque that is applied when opening the kickstand 302 from the closed position 1800 through the various different open positions. Further, the closing torque curve 3404 represents the torque that is applied when closing the kickstand 302 from various open positions to the closed position 1800.

It should be noted that in the closing torque curve 3404, a negative torque represents the user actively applying torque to close the kickstand, e.g., external force applied to the kickstand 302. A positive torque on the closing torque curve 3404 represents the kickstand tending to close itself due to force generated internally to the hinge 1100 (e.g., by the hinge spring 1110) to cause the hinge to "snap" between various positions.

Figure 35:
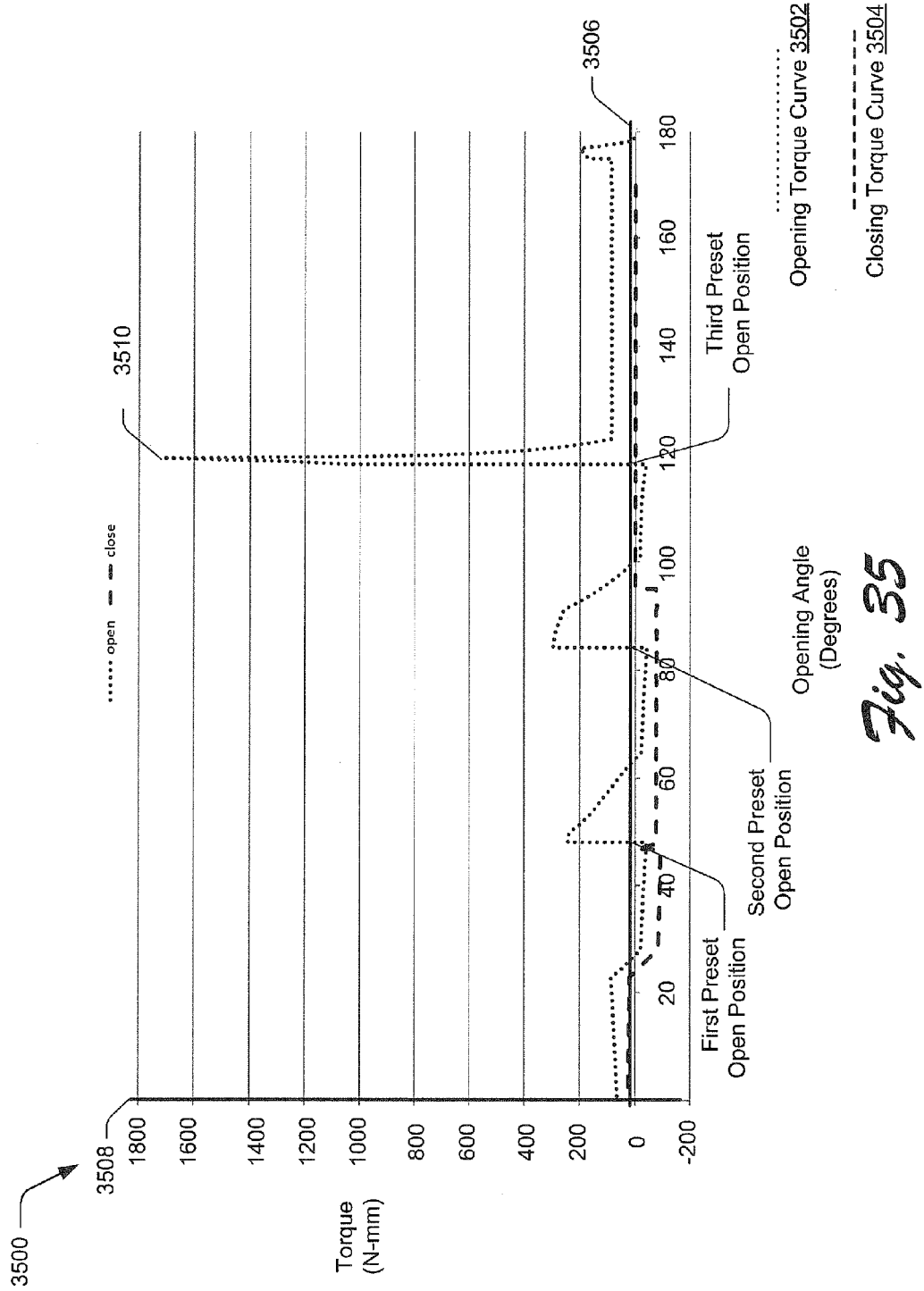
FIG. 35 illustrates a torque graph for a hinge mechanism in accordance with one or more embodiments.

FIG. 35 illustrates a torque graph 3500 that represents different torque forces that occur when the kickstand is opened to the position 2900, e.g., the emergency escape position discussed above. The torque graph includes an opening torque curve 3502, a closing torque curve 3504, an angle axis 3506, and a torque axis 3508. Further illustrated are the preset open positions discussed above.

The torque graph 3500 includes an emergency release peak 3510, which corresponds to an amount of torque required to disengage the kickstand 302 from the third preset open position to a further open position, e.g., to open the kickstand 302 to the position 2900. As discussed above, in at least some implementations the kickstand 302 is not intended to be opened past the third preset open position under normally operating conditions. Thus, the amount of torque required to further open past the third preset open position is considerably greater than the torque values discussed with regard to the previous open positions.

In this particular example, the emergency release peak 3510 indicates that approximately 1700 N-mm are required to open the kickstand 302 past the third preset open position. For instance, the emergency release peak 3510 specifies an amount of opening torque required on the kickstand 302 to disengage the plate catch 2702 form the follower catch 2704, discussed above with reference to FIG. 27. Thus, exceeding the opening torque specified by the emergency release peak 3510 while the kickstand 302 is in third preset open position causes the kickstand to transition to an emergency escape position, e.g., the position 2900.

Notice in the torque graph 3500 that the closing torque curve 3504 differs from the closing torque curve 3404 discussed with reference to FIG. 34. The closing torque curve 3504 demonstrates that when the kickstand 302 is opened past the third preset open position to the emergency escape position, there is little resistance to resetting the hinge 1100 to a normal operating condition.

For instance, refer back to FIG. 29. As illustrated in FIG. 29, when the hinge 1100 is opened to the position 2900, the support plates 1108 hold the cam follower 1106 in a compressed position within the hinge frame 1102. When the kickstand 302 is closed from the position 2900, because the cam follower 1106 is compressed, the cam follower 1106 does not engage with the cam 1104 until the kickstand 302 pushes the support plates 1108 to disengage the support plates 1108 from the cam follower 1106. When the support plates 1108 disengage from the cam follower 1106, the hinge spring 1110 presses the cam follower 1106 to engage with the cam 1104, thus resetting the hinge 1100 to a normal operating condition. In at least some implementations, the hinge reset occurs at an open position of 48 degrees, e.g., the first preset open position and/or the position 2000.

Accordingly, embodiments discussed herein provide a stable hinge mechanism that enables an attached component (e.g., a kickstand) to be adjusted between multiple preset positions. It is to be appreciated that the example device orientations, kickstand positions, hinge positions, hinge preset positions, torque values, and so forth discussed above are presented for purposes of example only. Thus, a wide variety of different device orientations, kickstand positions, hinge positions, hinge preset positions, and torque values not specifically mentioned herein may be implemented within the spirit and scope of the claimed embodiments.

For instance, an attachment mechanism used to attach a kickstand to a computing device (e.g., the hinge 1100 discussed above) can include any number and/or configuration of suitable preset stop positions to enable the kickstand to be opened to a variety of different positions to support various orientations of a computing device. Further, example hinges can be attached at any suitable position and/or portion of a kickstand and/or computing device in accordance with the claimed embodiments.

Example System and Device

Figure 36:
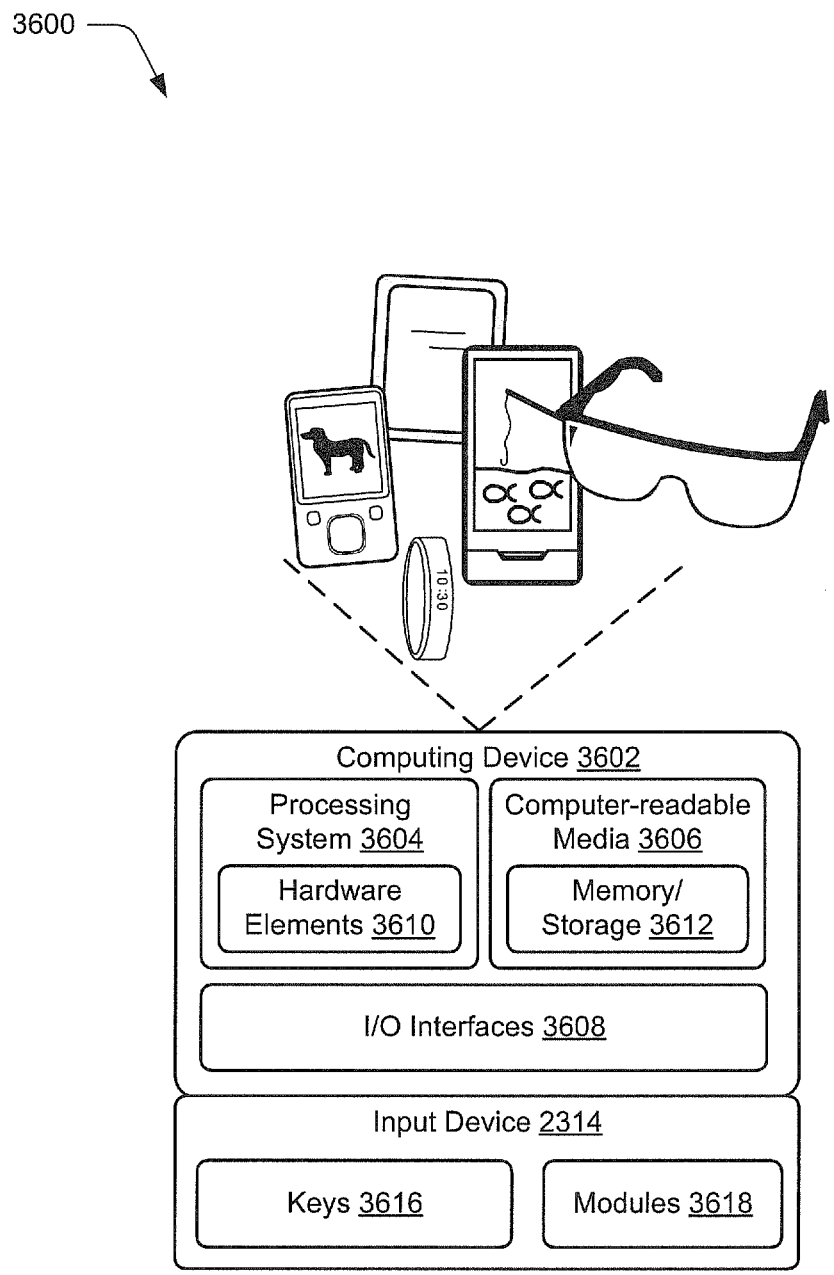
FIG. 36 illustrates an example system including various components of an example device that can be implemented as any type of computing device as described with reference to FIGS. 1-35 to implement embodiments of the techniques described herein.

FIG. 36 illustrates an example system generally at 3600 that includes an example computing device 3602 that is representative of one or more computing systems and/or devices that may implement the various techniques described herein. In at least some implementations, the computing device 3602 represents an implementation of the computing device 102 discussed above. The computing device 3602 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 3602 as illustrated includes a processing system 3604, one or more computer-readable media 3606, and one or more I/O interface 3608 that are communicatively coupled, one to another. Although not shown, the computing device 3602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 3604 is representative of functionality to perform one or more operations using hardware. Accordingly, the processing system 3604 is illustrated as including hardware element 3610 that may be configured as processors, functional blocks, and so forth. This may include implementation in hardware as an application specific integrated circuit or other logic device formed using one or more semiconductors. The hardware elements 3610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 3606 is illustrated as including memory/storage 3612. The memory/storage 3612 represents memory/storage capacity associated with one or more computer-readable media. The memory/storage component 3612 may include volatile media (such as random access memory (RAM)) and/or nonvolatile media (such as read only memory (ROM), Flash memory, optical disks, magnetic disks, and so forth). The memory/storage component 3612 may include fixed media (e.g., RAM, ROM, a fixed hard drive, and so on) as well as removable media (e.g., Flash memory, a removable hard drive, an optical disc, and so forth). The computer-readable media 3606 may be configured in a variety of other ways as further described below.

Input/output interface(s) 3608 are representative of functionality to allow a user to enter commands and information to computing device 3602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 3602 may be configured in a variety of ways to support user interaction.

The computing device 3602 is further illustrated as being communicatively and physically coupled to an input device 3614 that is physically and communicatively removable from the computing device 3602. In this way, a variety of different input devices may be coupled to the computing device 3602 having a wide variety of configurations to support a wide variety of functionality. In this example, the input device 3614 includes one or more keys 3616, which may be configured as pressure sensitive keys, mechanically switched keys, and so forth.

The input device 3614 is further illustrated as include one or more modules 3618 that may be configured to support a variety of functionality. The one or more modules 3618, for instance, may be configured to process analog and/or digital signals received from the keys 3616 to determine whether a keystroke was intended, determine whether an input is indicative of resting pressure, support authentication of the input device 3614 for operation with the computing device 3602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 3602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 3602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 3610 and computer-readable media 3606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 3610. The computing device 3602 may be configured to implement particular instructions and/or functions corresponding to the software and/or hardware modules. Accordingly, implementation of a module that is executable by the computing device 3602 as software may be achieved at least partially in hardware, e.g., through use of computer-readable storage media and/or hardware elements 3610 of the processing system 3604. The instructions and/or functions may be executable/operable by one or more articles of manufacture (for example, one or more computing devices 3602 and/or processing systems 3604) to implement techniques, modules, and examples described herein.

Implementations discussed herein include:

A mobile device comprising: a support component movably attached to a rear portion of the mobile device; and at least one hinge mechanism that attaches a portion of the support component to the mobile device, the hinge mechanism including: multiple preset open positions that enable the support component to be positioned in multiple positions relative to the rear portion of the mobile device; and an emergency escape position that enables the hinge to be positioned beyond the multiple preset open positions, the hinge mechanism being configured such that a torque applied to the support component to cause the hinge mechanism to be positioned in the emergency escape position is greater than a torque applied to the support component to position the hinge mechanism in the multiple preset open positions.

Implementations further include a mobile device as recited above, wherein the hinge mechanism comprises a cam that attaches the support component to the hinge mechanism, the cam being movably engaged with a cam follower within the hinge mechanism to enable the hinge mechanism to assume at least some of the multiple preset open positions.

Implementations further include a mobile device as recited above, wherein the hinge mechanism is configured such that the hinge mechanism is positionable in the emergency escape position without detaching the support component from the mobile device.

Implementations further include a mobile device as recited above, wherein the emergency escape position includes a 180 degree rotation of the support component from a closed position on the rear portion of the mobile device.

Implementations further include a mobile device as recited above, wherein the hinge mechanism comprises: a hinge frame; at least one support plate slidably engaged with the hinge frame; a cam slidably engaged with the at least one support plate, the cam being attached to the support component to enable attachment of the support component to the hinge mechanism; and a cam follower pivotably mounted within the hinge frame and positioned such that in at least some of the multiple preset open positions, the cam follower interfaces with the cam such that variable torque forces occur when transitioning between the at least some of the multiple preset open positions.

Implementations further include a mobile device as recited above, wherein in at least one of the multiple preset open positions, a first surface of the cam follower engages with a first surface of the cam, and wherein in at least one other of the multiple preset open positions, a second surface of the cam follower engages with a second surface of the cam.

Implementations further include a mobile device as recited above, wherein the hinge mechanism is configured such that during movement hinge mechanism from the at least one of the multiple preset open positions to the at least one other of the multiple preset open positions, contact between the cam and the cam follower transitions between contact between the first surface of the cam and the first surface of the cam follower, to contact between the second surface of the cam and the second surface of the cam follower.

Implementations further include a mobile device as recited above, wherein the hinge mechanism is configured such that in an event that a user manipulates the support component and releases the support component with the hinge mechanism not positioned in one of the multiple preset open positions, the hinge mechanism will snap into one of the multiple preset open positions independent of user interaction with the support component.

Implementations further include a hinge mechanism comprising: a hinge frame with at least one support plate slidably mounted on a plate guide on an interior surface of the hinge frame; a cam slidably mounted on a cam guide on an interior surface of the at least one support plate, the cam including an inner cam surface, at least one outer cam surface, and a mounting portion for mounting a moveable component to the cam; a cam follower pivotably mounted within the hinge frame and including an inner follower surface positioned to be engageable with the inner cam surface, and at least one outer follower surface positioned to be engageable with the at least one outer cam surface; and a hinge spring mounted within the hinge frame and that applies force to the cam follower such that the cam follower is held in contact with the cam in at least some positions of the hinge mechanism, the hinge mechanism being configured such that during movement of the cam, contact between the cam and the cam follower transitions between contact between the inner cam surface and the inner follower surface, to contact between the at least one outer cam surface and the at least one outer follower surface, thus enabling the hinge mechanism to snap into different preset open positions.

Implementations further include a hinge mechanism as described above, wherein the moveable component comprises a support component for an apparatus, and wherein the hinge mechanism enables the support component to be positioned at multiple positions relative to the apparatus.

Implementations further include a hinge mechanism as described above, wherein the inner follower surface and the at least one outer follower surface have different surface profiles.

Implementations further include a hinge mechanism as described above, wherein the at least one support plate includes a plate channel that is slidably engaged with the plate guide on the interior surface of the hinge frame.

Implementations further include a hinge mechanism as described above, wherein the hinge mechanism is configured with an emergency escape position that occurs in response to movement of the hinge mechanism beyond the different preset open positions.

Implementations further include a hinge mechanism as described above, wherein a torque applied to the cam to cause the hinge mechanism to transition to the emergency escape position is greater than a torque applied to the cam to transition the hinge mechanism between the different preset open positions.

Implementations further include an apparatus comprising: a chassis; and at least one hinge mechanism that attaches a component to the chassis and that is positionable in multiple preset open positions, the hinge mechanism including: a hinge frame with at least one support plate, a cam, and a cam follower mounted therein, a response profile of the hinge mechanism for at least some of the multiple preset open positions being based on interaction between the cam and the cam follower, and interaction between the at least one support plate and the hinge frame enabling the hinge mechanism to be positioned beyond the at least some of the multiple preset open positions independent of interaction between the cam and the cam follower.

Implementations further include an apparatus as described above, wherein the hinge mechanism is configured such that the component is positionable via the hinge mechanism at the multiple preset open positions, and such that if the component is released between a first preset open position and a second open preset position, the component snaps into one of the first present open position or the second preset open position independent of user interaction with the component.

Implementations further include an apparatus as described above, wherein the hinge mechanism is configured such that the at least one support plate engages with the hinge frame between the cam and the hinge frame, and the cam engages with the at least one support plate.

Implementations further include an apparatus as described above, wherein the hinge mechanism is configured such that positioning the hinge mechanism beyond the at least some of the multiple preset open positions causes the cam to disengage from the cam follower.

Implementations further include an apparatus as described above, wherein the hinge mechanism is configured such that positioning the hinge mechanism beyond the at least some of the multiple preset open positions causes the at least one support plate to compress the cam follower such that the cam follower does not engage the cam until the cam is reset to at least one of the multiple preset open positions.

Implementations further include an apparatus as described above, wherein a torque applied to the cam to cause the hinge mechanism to transition beyond the at least some of the multiple preset open positions is greater than a torque applied to the cam to transition the hinge mechanism between the at least some of the multiple preset open positions.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A hinge mechanism comprising:
   a hinge frame with at least one support plate slidably mounted on an arcuate plate guide on an interior surface of the hinge frame;
   a cam slidably mounted on an arcuate cam guide on an interior surface of the at least one support plate, the cam including an inner cam surface, at least one outer cam surface, and a mounting portion for mounting a moveable component to the cam, the inner cam surface and the at least one outer cam surface having different surface profiles;
   a cam follower pivotably mounted within the hinge frame and including an inner follower surface positioned to be engageable with the inner cam surface, and at least one outer follower surface positioned to be engageable with the at least one outer cam surface, the inner follower surface and the at least one outer follower surface having different surface profiles; and
   a hinge spring mounted within the hinge frame and that applies force to the cam follower such that the cam follower is held in contact with the cam in at least some positions of the hinge mechanism,
   the hinge mechanism being configured such that during movement of the cam, contact between the cam and the cam follower transitions between contact between the inner cam surface and the inner follower surface, to contact between the at least one outer cam surface and the at least one outer follower surface, thus enabling the hinge mechanism to snap into different preset open positions.

2. A hinge mechanism as recited in claim 1, wherein the moveable component comprises a support component for an apparatus, and wherein the hinge mechanism enables the support component to be positioned at multiple positions relative to the apparatus.

3. A hinge mechanism as recited in claim 1, wherein the at least one support plate includes a plate channel that is slidably engaged with the plate guide on the interior surface of the hinge frame.

4. A hinge mechanism as recited in claim 1, wherein the hinge mechanism is configured with an emergency escape position that occurs in response to movement of the hinge mechanism beyond the different preset open positions.

5. A hinge mechanism as recited in claim 4, wherein a torque applied to the cam to cause the hinge mechanism to transition to the emergency escape position is greater than a torque applied to the cam to transition the hinge mechanism between the different preset open positions.

6. An apparatus comprising:
a chassis; and
a hinge mechanism that attaches a support component to the chassis and that is positionable in multiple preset open positions, the hinge mechanism including:
 a hinge frame with at least one support plate slidably mounted on an arcuate plate guide on an interior surface of the hinge frame;
 a cam slidably mounted on an arcuate cam guide on an interior surface of the at least one support plate, the cam including an inner cam surface, at least one outer cam surface, and a mounting portion for mounting a moveable component to the cam, the inner cam surface and the at least one outer cam surface having different surface profiles;
 a cam follower pivotably mounted within the hinge frame and including an inner follower surface positioned to be engageable with the inner cam surface, and at least one outer follower surface positioned to be engageable with the at least one outer cam surface, the inner follower surface and the at least one outer follower surface having different surface profiles; and
 a hinge spring mounted within the hinge frame and that applies force to the cam follower such that the cam follower is held in contact with the cam in at least some positions of the hinge mechanism,
 the hinge mechanism being configured such that during movement of the cam, contact between the cam and the cam follower transitions between contact between the inner cam surface and the inner follower surface, to contact between the at least one outer cam surface and the at least one outer follower surface, thus enabling the hinge mechanism to snap into different preset open positions.

7. An apparatus as recited in claim 6, wherein the hinge mechanism enables the support component to be positioned at multiple positions relative to the apparatus.

8. An apparatus as recited in claim 6, wherein the at least one support plate includes a plate channel that is slidably engaged with the plate guide on the interior surface of the hinge frame.

9. An apparatus as recited in claim 6, wherein the hinge mechanism is configured with an emergency escape position that occurs in response to movement of the hinge mechanism beyond the different preset open positions.

10. An apparatus as recited in claim 9, wherein a torque applied to the cam to cause the hinge mechanism to transition to the emergency escape position is greater than a torque applied to the cam to transition the hinge mechanism between the different preset open positions.

11. A mobile device comprising:
a support component movably attached to a rear portion of the mobile device; and
a hinge mechanism that attaches a portion of the support component to the mobile device, the hinge mechanism including:
 a hinge frame with at least one support plate slidably mounted on an arcuate plate guide on an interior surface of the hinge frame;
 a cam slidably mounted on an arcuate cam guide on an interior surface of the at least one support plate, the cam including an inner cam surface, at least one outer cam surface, and a mounting portion for mounting a moveable component to the cam, the inner cam surface and the at least one outer cam surface having different surface profiles;
 a cam follower pivotably mounted within the hinge frame and including an inner follower surface positioned to be engageable with the inner cam surface, and at least one outer follower surface positioned to be engageable with the at least one outer cam surface, the inner follower surface and the at least one outer follower surface having different surface profiles; and
 a hinge spring mounted within the hinge frame and that applies force to the cam follower such that the cam follower is held in contact with the cam in at least some positions of the hinge mechanism,
 the hinge mechanism being configured such that during movement of the cam, contact between the cam and the cam follower transitions between contact between the inner cam surface and the inner follower surface, to contact between the at least one outer cam surface and the at least one outer follower surface, thus enabling the hinge mechanism to snap into different preset open positions.

12. A mobile device as recited in claim 11, wherein the hinge mechanism enables the support component to be positioned at multiple positions relative to the mobile device.

13. A mobile device as recited in claim 11, wherein the at least one support plate includes a plate channel that is slidably engaged with the plate guide on the interior surface of the hinge frame.

14. A mobile device as recited in claim 11, wherein the hinge mechanism is configured with an emergency escape position that occurs in response to movement of the hinge mechanism beyond the different preset open positions.

15. A mobile device as recited in claim 14, wherein a torque applied to the cam to cause the hinge mechanism to transition to the emergency escape position is greater than a torque applied to the cam to transition the hinge mechanism between the different preset open positions.

* * * * *